(12) United States Patent
Bucknor et al.

(10) Patent No.: US 11,460,698 B2
(45) Date of Patent: Oct. 4, 2022

(54) ELECTROMAGNETIC TRACKING WITH AUGMENTED REALITY SYSTEMS

(71) Applicant: Magic Leap, Inc., Plantation, FL (US)

(72) Inventors: Brian Bucknor, Miramar, FL (US); Christopher Lopez, Davie, FL (US); Michael Janusz Woods, Mountain View, CA (US); Aly H. M. Aly, Coral Springs, FL (US); James William Palmer, Miami, FL (US); Evan Francis Rynk, Boca Raton, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/171,328

(22) Filed: Feb. 9, 2021

(65) Prior Publication Data

US 2021/0165217 A1 Jun. 3, 2021

Related U.S. Application Data

(63) Continuation of application No. 16/670,172, filed on Oct. 31, 2019, now Pat. No. 10,948,721, which is a
(Continued)

(51) Int. Cl.
*G06F 1/16* (2006.01)
*G02B 27/01* (2006.01)
(Continued)

(52) U.S. Cl.
CPC .............. *G02B 27/017* (2013.01); *G01S 1/68* (2013.01); *G01S 1/70* (2013.01); *G01S 1/7038* (2019.08);
(Continued)

(58) Field of Classification Search
CPC .......... G06F 1/163; G06F 3/014; G06F 3/165; G02B 27/017; G02B 27/0093;
(Continued)

(56) References Cited

U.S. PATENT DOCUMENTS 4,007,443 A 2/1977 Bromberg et al.
4,287,809 A 9/1981 Egli et al.
(Continued)

FOREIGN PATENT DOCUMENTS

CN 101093586 12/2007
CN 101093586 A 12/2007
(Continued)

OTHER PUBLICATIONS

European Extended Search Report, re EP Application No. 17790199.8, dated Oct. 18, 2019.
(Continued)

*Primary Examiner* — Adrian S Wilson
(74) *Attorney, Agent, or Firm* — Knobbe, Martens, Olson & Bear, LLP

(57) ABSTRACT

Head-mounted augmented reality (AR) devices can track pose of a wearer's head to provide a three-dimensional virtual representation of objects in the wearer's environment. An electromagnetic (EM) tracking system can track head or body pose. A handheld user input device can include an EM emitter that generates an EM field, and the head-mounted AR device can include an EM sensor that senses the EM field. EM information from the sensor can be analyzed to determine location and/or orientation of the sensor and thereby the wearer's pose. The EM emitter and sensor may utilize time division multiplexing (TDM) or dynamic frequency tuning to operate at multiple frequencies. Voltage gain control may be implemented in the transmitter, rather than the sensor, allowing smaller and lighter weight sensor designs. The EM sensor can implement noise cancellation to reduce the level of EM interference generated by nearby audio speakers.

20 Claims, 54 Drawing Sheets

Related U.S. Application Data continuation of application No. 16/288,856, filed on Feb. 28, 2019, now Pat. No. 10,495,718, which is a continuation of application No. 15/495,597, filed on Apr. 24, 2017, now Pat. No. 10,261,162.

(60) Provisional application No. 62/479,111, filed on Mar. 30, 2017, provisional application No. 62/328,003, filed on Apr. 26, 2016.

(51) Int. Cl.
| | |
|---|---|
| G06F 3/01 | (2006.01) |
| H01H 9/02 | (2006.01) |
| G02B 27/00 | (2006.01) |
| G01S 1/68 | (2006.01) |
| G01S 5/02 | (2010.01) |
| G01S 1/70 | (2006.01) |
| G06F 3/16 | (2006.01) |

(52) U.S. Cl.
CPC .......... *G01S 5/0247* (2013.01); *G01S 5/0284* (2013.01); *G02B 27/0093* (2013.01); *G06F 1/163* (2013.01); *G06F 3/014* (2013.01); *H01H 9/0228* (2013.01); *H01H 9/0235* (2013.01); *G02B 27/0179* (2013.01); *G02B 2027/0138* (2013.01); *G02B 2027/0178* (2013.01); *G02B 2027/0187* (2013.01); *G06F 3/165* (2013.01)

(58) Field of Classification Search
CPC .... G02B 2027/0178; G02B 2027/0187; G01S 1/70; H01H 9/0235
See application file for complete search history.

(56) References Cited

U.S. PATENT DOCUMENTS

| | | | |
|---|---|---|---|
| 4,346,384 A | 8/1982 | Raab | |
| D322,244 S | 12/1991 | Bishai | |
| 5,207,426 A | 5/1993 | Inoue et al. | |
| 5,485,171 A | 1/1996 | Copper et al. | |
| 5,579,026 A | 11/1996 | Tabata | |
| 5,670,988 A | 9/1997 | Tickle | |
| 5,685,776 A | 11/1997 | Stambolic et al. | |
| D387,352 S | 12/1997 | Kaneko et al. | |
| 5,847,976 A | 12/1998 | Lescourret | |
| 5,987,349 A | 11/1999 | Schulz | |
| 6,005,548 A | 12/1999 | Latypov et al. | |
| D424,553 S | 5/2000 | Larian | |
| 6,222,675 B1 | 4/2001 | Mall et al. | |
| 6,377,401 B1 | 4/2002 | Bartlett | |
| 6,383,079 B1 | 5/2002 | Takeda et al. | |
| 6,484,118 B1 | 11/2002 | Govari | |
| 6,774,624 B2 | 8/2004 | Anderson et al. | |
| 6,850,221 B1 | 2/2005 | Tickle | |
| 6,990,453 B2 | 1/2006 | Wang et al. | |
| 7,184,147 B2 | 2/2007 | Sperling | |
| 7,443,154 B1 | 10/2008 | Merewether et al. | |
| 7,542,869 B2 | 6/2009 | Gandelsman et al. | |
| 7,627,477 B2 | 12/2009 | Wang et al. | |
| 8,121,812 B2 | 2/2012 | Higgins | |
| 8,208,719 B2 | 6/2012 | Gordon et al. | |
| 8,571,636 B2 | 10/2013 | Wu | |
| 8,700,376 B2 | 4/2014 | Ophir et al. | |
| 8,743,051 B1 | 6/2014 | Moy | |
| 8,854,798 B1 | 10/2014 | Mullet et al. | |
| 8,950,867 B2 | 2/2015 | Macnamara | |
| 8,958,599 B1 | 2/2015 | Starner | |
| 9,081,426 B2 | 7/2015 | Armstrong | |
| 9,215,293 B2 | 12/2015 | Miller | |
| 9,310,559 B2 | 4/2016 | Macnamara | |
| 9,344,673 B1 | 5/2016 | Buchheit | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,261,162 B2 * | 4/2019 | Bucknor ................. G01S 1/70 |
| 10,430,985 B2 | 10/2019 | Harrises et al. | |
| 10,495,718 B2 * | 12/2019 | Bucknor ............... G01S 1/7038 |
| 10,948,721 B2 * | 3/2021 | Bucknor ................. G01S 1/70 |
| 11,244,485 B2 | 2/2022 | Harrises et al. | |
| 2002/0030483 A1 * | 3/2002 | Gilboa ................. G01S 13/874 |
| | | | 324/207.17 |
| 2003/0092448 A1 | 5/2003 | Forstrom et al. | |
| 2004/0201857 A1 | 10/2004 | Foxlin | |
| 2004/0247327 A1 | 12/2004 | Kamali et al. | |
| 2006/0012571 A1 | 1/2006 | Rodgers et al. | |
| 2006/0028436 A1 | 2/2006 | Armstrong | |
| 2007/0018649 A1 * | 1/2007 | Prsha ..................... G01V 3/088 |
| | | | 324/326 |
| 2007/0081123 A1 | 4/2007 | Lewis | |
| 2008/0106488 A1 | 5/2008 | Okuno | |
| 2008/0159447 A1 | 7/2008 | Bucknor et al. | |
| 2009/0005166 A1 * | 1/2009 | Sato ..................... A63F 13/211 |
| | | | 463/37 |
| 2009/0024050 A1 | 1/2009 | Jung et al. | |
| 2009/0096714 A1 | 4/2009 | Yamada et al. | |
| 2010/0220867 A1 | 9/2010 | Frerking et al. | |
| 2011/0199088 A1 | 8/2011 | Bittar | |
| 2011/0216192 A1 | 9/2011 | Leung et al. | |
| 2011/0216961 A1 | 9/2011 | Ishige et al. | |
| 2011/0221656 A1 * | 9/2011 | Haddick ............... H04N 5/2254 |
| | | | 345/156 |
| 2011/0227820 A1 * | 9/2011 | Haddick ................. G06F 1/1673 |
| | | | 345/156 |
| 2011/0238399 A1 | 9/2011 | Ophir et al. | |
| 2011/0241976 A1 | 10/2011 | Boger et al. | |
| 2012/0056847 A1 | 3/2012 | Milford | |
| 2012/0092368 A1 | 4/2012 | Paek et al. | |
| 2012/0127062 A1 | 5/2012 | Bar-Zeev et al. | |
| 2012/0162549 A1 | 6/2012 | Gao et al. | |
| 2012/0218301 A1 * | 8/2012 | Miller ..................... G06Q 30/02 |
| | | | 345/633 |
| 2012/0259966 A1 | 10/2012 | Ishii et al. | |
| 2013/0064328 A1 | 3/2013 | Adnani et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0128230 A1 | 5/2013 | Macnamara | |
| 2013/0194389 A1 | 8/2013 | Vaught et al. | |
| 2013/0208234 A1 | 8/2013 | Lewis | |
| 2013/0242262 A1 | 9/2013 | Lewis | |
| 2014/0003762 A1 | 1/2014 | Macnamara | |
| 2014/0052401 A1 | 2/2014 | Riley et al. | |
| 2014/0071539 A1 | 3/2014 | Gao | |
| 2014/0078283 A1 | 3/2014 | Nistico et al. | |
| 2014/0177023 A1 | 6/2014 | Gao et al. | |
| 2014/0207570 A1 | 7/2014 | Cancro et al. | |
| 2014/0218468 A1 | 8/2014 | Gao et al. | |
| 2014/0267004 A1 | 9/2014 | Brickner | |
| 2014/0267420 A1 | 9/2014 | Schowengerdt | |
| 2014/0306866 A1 | 10/2014 | Miller | |
| 2015/0002507 A1 | 1/2015 | Ambrus et al. | |
| 2015/0016777 A1 | 1/2015 | Abovitz et al. | |
| 2015/0058319 A1 | 2/2015 | Miyajima | |
| 2015/0077336 A1 | 3/2015 | Elangovan | |
| 2015/0103306 A1 | 4/2015 | Kaji et al. | |
| 2015/0123991 A1 | 5/2015 | Yarosh et al. | |
| 2015/0177831 A1 | 6/2015 | Chan et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0235435 A1 | 8/2015 | Miller et al. | |
| 2015/0248169 A1 | 9/2015 | Abovitz et al. | |

(56) References Cited

U.S. PATENT DOCUMENTS

| | | | |
|---|---|---|---|
| 2015/0248170 A1 | 9/2015 | Abovitz et al. | |
| 2015/0248788 A1 | 9/2015 | Abovitz et al. | |
| 2015/0248793 A1 | 9/2015 | Abovitz et al. | |
| 2015/0258431 A1 | 9/2015 | Stafford et al. | |
| 2015/0268415 A1 | 9/2015 | Schowengerdt et al. | |
| 2015/0301797 A1* | 10/2015 | Miller | G06F 3/013 345/156 |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2015/0356781 A1 | 12/2015 | Miller | |
| 2016/0005233 A1 | 1/2016 | Fraccaroli et al. | |
| 2016/0011419 A1 | 1/2016 | Gao | |
| 2016/0026253 A1 | 1/2016 | Bradski et al. | |
| 2016/0041391 A1* | 2/2016 | Van Curen | A63F 13/211 345/633 |
| 2016/0091920 A1 | 3/2016 | Belogolovy | |
| 2016/0259404 A1 | 9/2016 | Woods | |
| 2016/0353078 A1 | 12/2016 | Zhou et al. | |
| 2017/0024885 A1 | 1/2017 | Miyazaki | |
| 2017/0098139 A1 | 4/2017 | Protter et al. | |
| 2017/0184846 A1 | 6/2017 | Lu | |
| 2017/0206691 A1 | 7/2017 | Harrises et al. | |
| 2017/0307891 A1* | 10/2017 | Bucknor | G06F 3/014 |
| 2019/0195979 A1 | 6/2019 | Bucknor | |
| 2019/0371028 A1 | 12/2019 | Harrises et al. | |
| 2020/0064431 A1 | 2/2020 | Bucknor et al. | |

FOREIGN PATENT DOCUMENTS

| | | |
|---|---|---|
| CN | 201508788 U | 6/2010 |
| CN | 102194254 | 9/2011 |
| CN | 102194254 A | 9/2011 |
| CN | 102567617 | 7/2012 |
| CN | 102567617 A | 7/2012 |
| CN | 102656474 | 9/2012 |
| CN | 102656474 A | 9/2012 |
| CN | 102893236 | 1/2013 |
| CN | 102893236 A | 1/2013 |
| CN | 103792661 | 5/2014 |
| CN | 103792661 A | 5/2014 |
| CN | 104407700 | 3/2015 |
| CN | 104407700 A | 3/2015 |
| EP | 2 338 286 | 6/2017 |
| JP | 11-110114 A | 4/1999 |
| JP | H11-110114 A | 4/1999 |
| JP | 2004-056272 | 2/2004 |
| JP | 2004-056272 A | 2/2004 |
| JP | 2007-272067 A | 10/2007 |
| JP | 2008-009646 A | 1/2008 |
| JP | 2011-41872 | 3/2011 |
| JP | 2011-041872 A | 3/2011 |
| JP | 2011-085868 | 4/2011 |
| JP | 2011-085868 A | 4/2011 |
| JP | 2012-221186 | 11/2012 |
| JP | 2012-221186 A | 11/2012 |
| JP | 2013-521576 A | 6/2013 |
| JP | 2015-204033 | 11/2015 |
| JP | 2015-210797 | 11/2015 |
| JP | 2015-210797 A | 11/2015 |
| WO | WO 2014/160342 | 10/2014 |
| WO | WO 2014/164901 | 10/2014 |
| WO | WO 2015/159533 | 10/2015 |
| WO | WO 2016/141373 | 9/2016 |
| WO | WO 2017/127571 | 7/2017 |
| WO | WO 2017/189450 | 11/2017 |

OTHER PUBLICATIONS

International Search Report and Written Opinion for PCT Application No. PCT/US2017/29189, dated Jun. 30, 2017.
International Preliminary Report on Patentability for PCT Application No. PCT/US2017/29189, dated Oct. 30, 2018.
"Core Technology", Mantis Vision, printed Feb. 24, 2017, in 4 pages. URL: http://www.mantis-vision.com/technology.php.
"DepthSense Sensors", SoftKinetic, printed Feb. 24, 2017, in 1 page. URL: https://www.softkinetic.com/Products/DepthSenseSensors.
"Digital Mirror Fashion", GibamVision, retrieved Sep. 22, 2016, in 2 pages. URL: http://www.gibamvision.com/en/digital-mirror-fashion.
"Digital mirror reveals what lies under your skin", NewScientist, Apr. 19, 2014, in 3 pages. URL: https://www.newscientist.com/article/mg22229653-800-digital-mirror-reveals-what-lies-under-your-skin/.
"Magic Mirror" (homepage), Magic Mirror, accessed Apr. 17, 2018, in 4 pages. URL: http://www.magicmirror.me/.
"Overview" (homepage), Memomi—Memory Mirror, accessed Apr. 17, 2018, in 6 pages. URL: http://memorymirror.com.
"Products Overview", Advanced Scientific Concepts, Inc., printed Feb. 24, 2017, in 4 pages. URL: http://www.advancedscientificconcepts.com/products/products.htmi.
"True Mirror®: See Yourself™", True Mirror, The True Mirror Company, Inc., 2015, accessed Jun. 30, 2016, in 3 pages. URL: http://www.truemirror.com/.
"Eye Spectral Response", Telescope-Optics.net, retrieved Jul. 11, 2017, in 9 pages. URL: http://www.telescope-optics.net/eye_spectral_response.htm.
"G4 Brochure", Polhemus, Sep. 2015, in 2 pages. URL: http://polhemus.com/_assets/img/G4_Brochure.pdf.
"Market ready 3D sensors—completed with pmd intelligence", PMD Technologies, printed Feb. 24, 2017, in 2 pages. URL: http://www.pmdtec.com/company/realized_visions.php.
"The Virtual Reality Locomotion Simulator—Virtusphere", Polhemus, printed Feb. 10, 2017, in 3 pages. URL: http://polhemus.com/_assets/img/Virtusphere_Case_Study.pdf.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hili, NC, Feb. 1995.
Big Tree Measuring Methods, in 5 pages, Retrieved May 9, 2019. URL: http://www.nature1st.net/naturens/files/tree_measure.html.
Bimber, et al., "Spatial Augmented Reality—Merging Real and Virtual Worlds," 2005 https://web.media.mit.edu/~raskar/book/BimberRaskarAugmentedRealityBook.pdf.
Biosense Webster: "CARTO 3 System", printed Feb. 10, 2017, in 3 pages. URL: https://www.biosensewebster.com/documents/carto3-fact-sheet.pdf?Cache=1%2F19%2F2015+3%3A56%3A28+PM.
Butler, D. et al., "Mirror, Mirror, on the Wall, How Does My Brain Recognize My Image at All?" PLoS One, vol. 7, Issue 2, 2012, published online Feb. 16, 2012, in 11 pages. URL: http://www.ncbi.nlm.nih.gov/pmc/articles/PMC3281068.
CNRS, "Learning to read: Tricking the brain," ScienceDaily, Aug. 28, 2014, in 3 pages. URL: http://www.sciencedaily.com/releases/2014/08/140828115248.htm.
Digital Kiosk for Fashion Stores, "Interactive Kiosk and Digital Signage," Runs an array of applications at once with rich responsive multimedia and virtual reality experience. Apr. 17, 2018, www.magicmirror.me, 4 pages.
Economic and Social Research Council, "How can we still read words when the letters are jumbled up?" ScienceDaily, Mar. 15, 2013, in 2 pages. URL: https://www.sciencedaily.com/releases/2013/03/130315074613.htm.
Fotopoulou, A. et al., "Mirror-view reverses somatoparaphrenia: dissociation between first- and third-person perspectives on body ownership", Neuropsychologia, vol. 49, Dec. 2011, in 10 pages. URL: http://www.ncbi.nlm.nih.gov/pubmed/22023911.

(56) References Cited

OTHER PUBLICATIONS

Intel: "Retail Solution Configuration: Memory Mirror Solution", Intel, printed Sep. 25, 2015, in 3 pages. URL: http://www.intel.com/content/www/us/en/retail/nrf-2014/memory.html?wapkw=mi.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Kindratenko, V., "Calibration of electromagnetic tracking devices", Virtual Reality, vol. 4, Jun. 1999, in 19 pages.

Li, M. et al., "FPGA based electromagnetic tracking system for fast catheter navigation", International Journal of Scientific & Engineering Research, vol. 4, Iss. 9, Sep. 2013, in 5 pages.

Milde, C. et al., "Do Mirror Glasses Have the Same Effect on Brain Activity as a Mirror Bo ? Evidence from a Functional Magnetic Resonance Imaging Study with Healthy Subjects", PLoS One, vol. 10, Issue. 5, published online May 27, 2015, in 13 pages. URL: http://www.ncbi.nlm.nih.gov/pmc/articles/PMC4446290/.

MillenniumDroid, "True Mirror—Android Apps on Google Play", Google Play Store, retrieved Jun. 30, 2016, in 2 pages. URL: https://piay.google.com/store/apps/details?id=com.blogspot.mdroid.mymirror&hl=en.

NDI: "Aurora", NDI Measurement Sciences, printed Feb. 10, 2017, in 3 pages. URL:https://www.ndigital.com/msci/products/aurora/.

Newcombe, R. et al., "KinectFusion: Real-Team Dense Surface Mapping and Tracking," IEEE ISMAR, Oct. 2011, in 10 pages.

Plataforma SINC, "Through the looking glass: Research into brain's ability to understand mirror-image words sheds light on dysle ia," ScienceDaily, Mar. 31, 2011, in 3 pages. URL: https://www.sciencedaily.com/releases/2011/03/110331080037.htm.

Preston, C. et al., "Owning the body in the mirror: The effect of visual perspective and mirror view on the full-body illusion", Scientific Reports, vol. 5, published online Dec. 17, 2015, in 13 pages. URL: http://www.ncbi.nlm.nih.gov/pmc/artictes/PMC4683587/.

Rutkin, A., "Digital mirror reveals what lies under your skin", New Scientist, Apr. 15, 2014, in 3 pages. URL: https://www.newscientist.com/article/mg22229653-800-digital-mirror-reveals-what-lies-under-your-skin/.

Searle, R., "10 Crazy Facts About Mirrors," ListVerse, Dec. 30, 2013, in 11 pages. URL: http://listverse.com/2013/12/30/10-crazy-facts-about-mirrors/.

Strickland, J., "How Virtual Reality Gear Works", HowStuffWorks, printed Apr. 19, 2017, in 18 pages. URL: http://electronics.howstuffworks.com/gadgets/other-gadgets/VR-gear.htm/printable.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wikipedia: "Atomic Mirror", Wikipedia, printed Dec. 13, 2016, in 2 pages. URL: http/en.wikipedia.org/wiki/Atomic_mirror.

Wikipedia: "Atomic Mirror", Wikipedia, printed Dec. 13, 2016, in 4 pages. URL: http/en.wikipedia.org/wiki/Atomic_mirror.

Wikipedia: "Mirror Neuron", Wikipedia, printed Jun. 30, 2016, in 17 pages. URL: https://en.wikipedia.org/wiki/Mirror_neuron.

Wikipedia: "Non-reversing mirror," Wikipedia, printed Jun. 30, 2016, in 2 pages. URL: https://en.wikipedia.org/wiki/Non-reversing_mirror.

Wikipedia: "Simultaneous localization and mapping", Wikipedia, accessed Oct. 22, 2015, in 7 pages. URL: https://en.wikipedia.org/wiki/Simultaneous_localization_and_mapping.

Wikipedia: "Forced perspective," in 10 pages, Retrieved May 9, 2019. URL: https://en.wikipedia.org/wiki/Forced_perspective. 2015.

Zult, T. et al., "Mirror illusion reduces motor cortical inhibition in the ipsilateral primary motor corte during forceful unilateral muscle contractions", Journal of Neurophysiology, vol. 113, Issue 7, Apr. 2015, published online Jan. 28, 2015, in 14 pages. URL: http://www.ncbi.nlm.nih.gov/pmc/articles/PMC4416555/.

"Eye Chromatism", Telescope-Optics.net, archived Mar. 10, 2016, in 5 pages. URL: http://web.archive.org/web/20160310131809/http://www.telescopeoptics.net/eye_chromatism.htm.

Tracking Systems for VR—SGN-5406 Virtual Reality Autumn 2010, power point 80 pages.

* cited by examiner

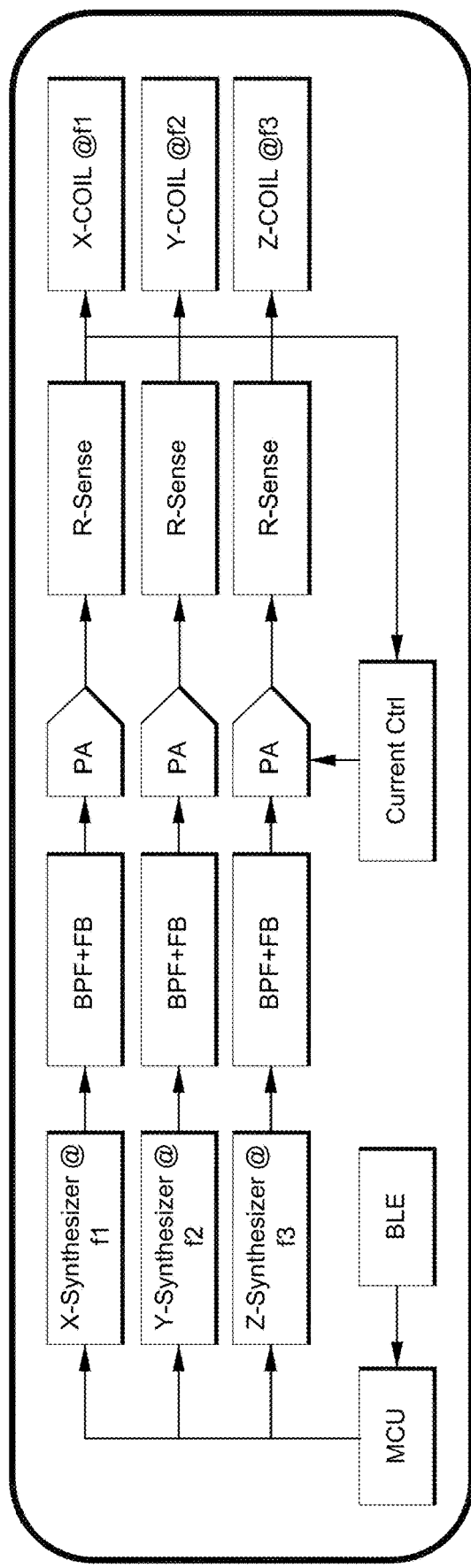
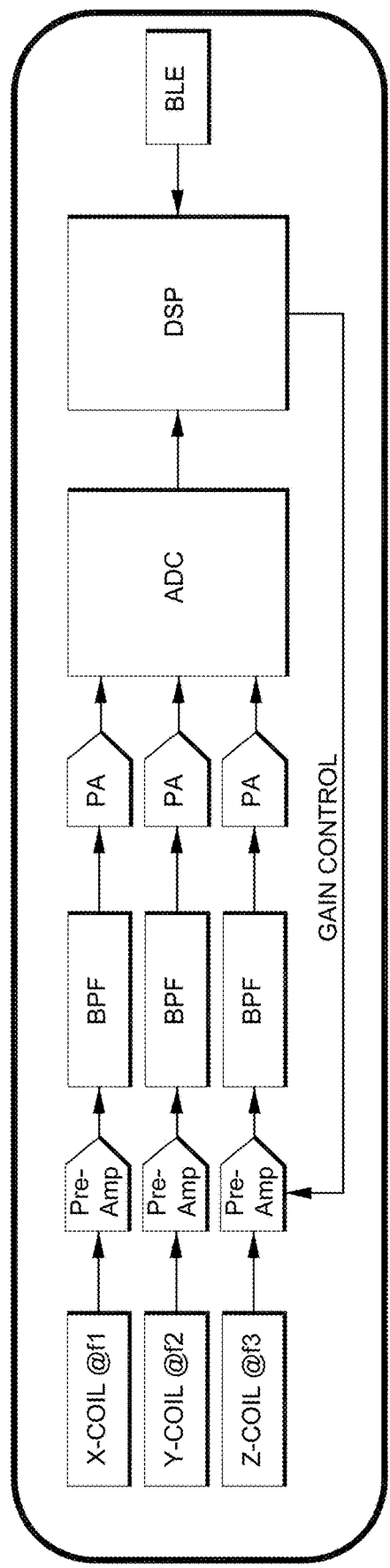
FIG. 13A
FIG. 13B

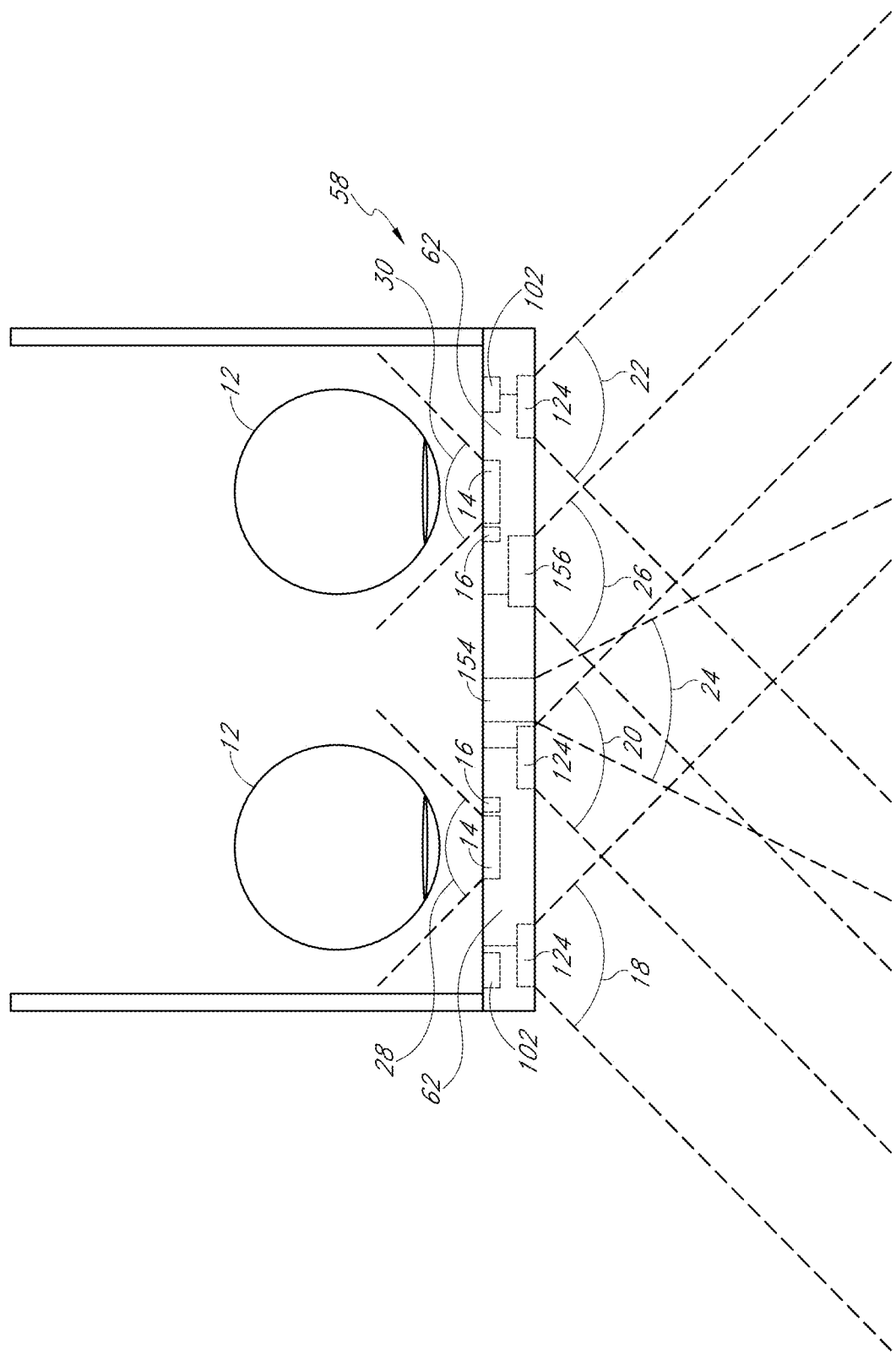

ELECTROMAGNETIC TRACKING WITH AUGMENTED REALITY SYSTEMS

CROSS-REFERENCE TO RELATED APPLICATIONS

This application is a continuation of U.S. patent application Ser. No. 16/670,172, filed Oct. 31, 2019, entitled ELECTROMAGNETIC TRACKING WITH AUGMENTED REALITY SYSTEMS, which is a continuation of U.S. patent application Ser. No. 16/288,856, filed Feb. 28, 2019, entitled ELECTROMAGNETIC TRACKING WITH AUGMENTED REALITY SYSTEMS, which is a continuation of U.S. patent application Ser. No. 15/495,597, filed Apr. 24, 2017, now U.S. Pat. No. 10,261,162, entitled ELECTROMAGNETIC TRACKING WITH AUGMENTED REALITY SYSTEMS, which claims the benefit of priority to U.S. Patent Application No. 62/328,003, filed Apr. 26, 2016, entitled SYSTEMS AND METHODS FOR AUGMENTED REALITY, and to U.S. Patent Application No. 62/479,111, filed Mar. 30, 2017, entitled ELECTROMAGNETIC TRACKING WITH AUGMENTED REALITY SYSTEMS; all of the foregoing are hereby incorporated by reference herein in their entireties.

BACKGROUND

Field

The present disclosure relates to systems and methods to localize position or orientation of one or more objects in the context of augmented reality systems.

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY

Head-mounted augmented reality (AR) devices can track the pose of the wearer's head (or other body part) to be able to provide a three-dimensional virtual representation of objects in the wearer's environment. Embodiments of an electromagnetic (EM) tracking system can be used to track head pose or body gestures. For example, a handheld user input device can include an EM emitter and the head-mounted AR device can include an EM sensor. In some implementations, the EM emitter generates an EM field that can be sensed by the EM sensor. EM information from the sensor can be analyzed to determine location and/or orientation of the sensor and thereby the wearer's head pose. The EM emitter and sensor may utilize time division multiplexing (TDM) or dynamic frequency tuning that allows the tracking system to operate at multiple frequencies. Voltage gain control can be implemented in the transmitter, rather than the sensor, allowing smaller and light weight sensor designs. The EM sensor can implement noise cancellation to reduce the level of EM interference generated by nearby audio speakers.

An embodiment of a head-mounted display system comprises a display positionable in front of eyes of a wearer; an electromagnetic (EM) field emitter configured to generate a magnetic field having a frequency; an EM sensor configured to sense the magnetic field at the frequency; and a processor programmed to: receive signals from the EM sensor indicative of a sensed magnetic field; and analyze the received signals to determine a position or an orientation of the EM sensor.

An embodiment of an electromagnetic (EM) tracking system comprises an EM field emitter comprising a first transmitter coil configured to generate a first magnetic field having a first frequency, a second transmitter coil configured to generate a second magnetic field having a second frequency, and a third transmitter coil configured to generate a third magnetic field having a third frequency, the EM field emitter comprising a first time division multiplexed (TDM) circuit configured to switch power among the first transmitter coil, the second transmitter coil, and the third transmitter coil. A head-mounted augmented reality display device can comprise embodiments of the EM tracking system.

An embodiment of an electromagnetic (EM) tracking system comprises an EM field emitter comprising an automatic gain control (AGC) circuit and a transmitter coil; and an EM sensor without an AGC circuit, the EM sensor comprising a sensor coil. A head-mounted augmented reality display device can comprise embodiments of the EM tracking system.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 13A is a block diagram that schematically illustrates an example of an EM transmitter circuit (EM emitter) that is frequency division multiplexed (FDM).

FIG. 13B is a block diagram that schematically illustrates an example of an EM receiver circuit (EM sensor) that is frequency division multiplexed.

FIGS. 16A and 16B schematically illustrates examples of components of other embodiments of an AR system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of AR, VR and Localization Systems

Figure 1:
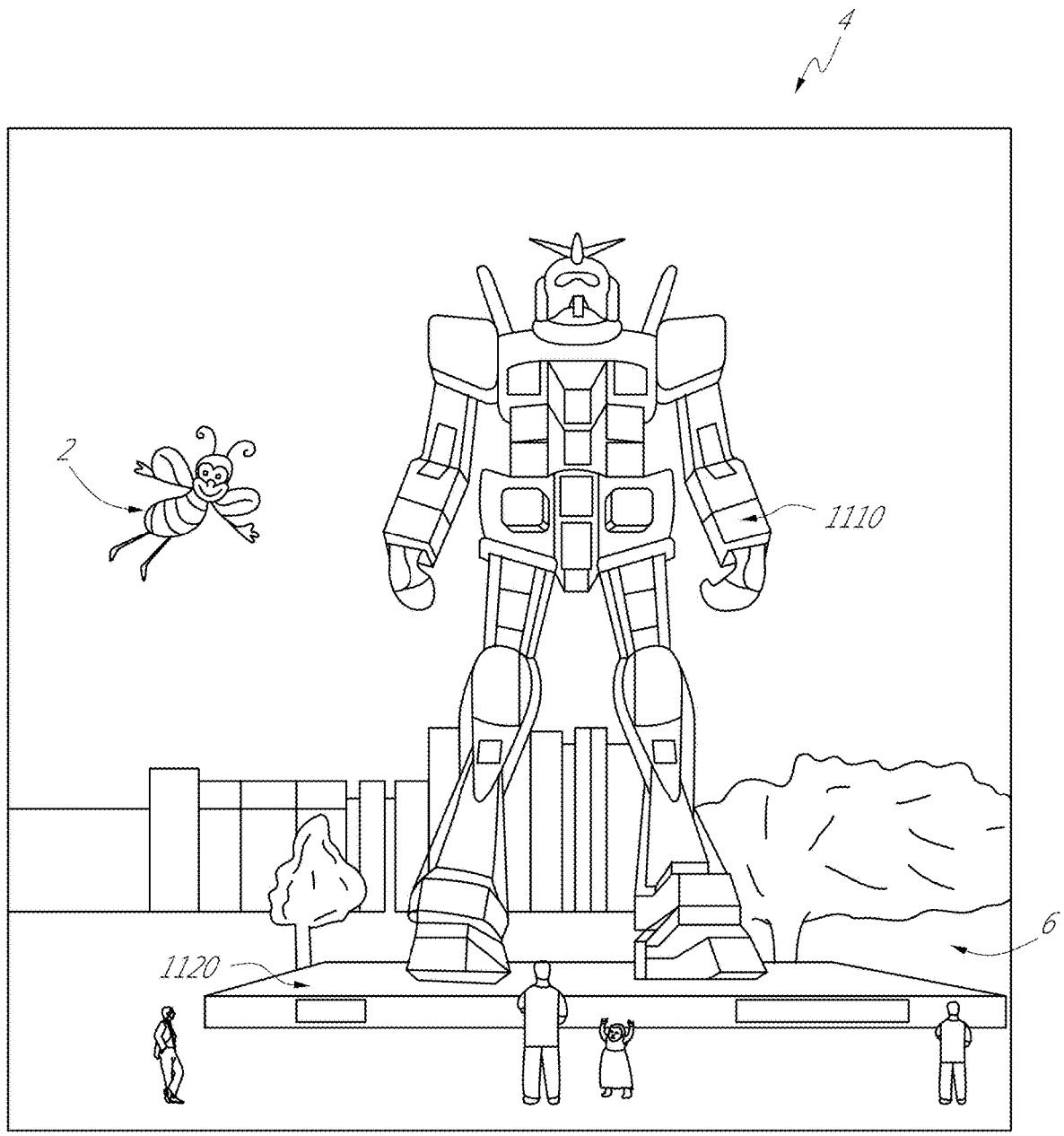
FIG. 1 depicts an illustration of an augmented reality scenario with certain virtual reality objects, and certain physical objects viewed by a person.

In FIG. 1 an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (e.g., the elapsed time between when the user moves his or her head and the time when the image gets updated and displayed to the user) have been challenges for VR and AR systems. Especially for display systems that fill a substantial portion of the user's visual field with virtual elements, it is advantageous if the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, but are difficult to achieve. In other words, the AR system can recognize a physical location of a real object (e.g., user's head, totem, haptic device, wearable component, user's hand, etc.) and correlate the physical coordinates of the real object to virtual coordinates corresponding to one or more virtual objects being displayed to the user. This generally requires highly accurate sensors and sensor recognition systems that track a position and orientation of one or more objects at rapid rates. Current approaches do not perform localization at satisfactory speed or precision standards.

Thus, there is a need for a better localization system in the context of AR and VR devices.

Example AR and VR Systems and Components

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
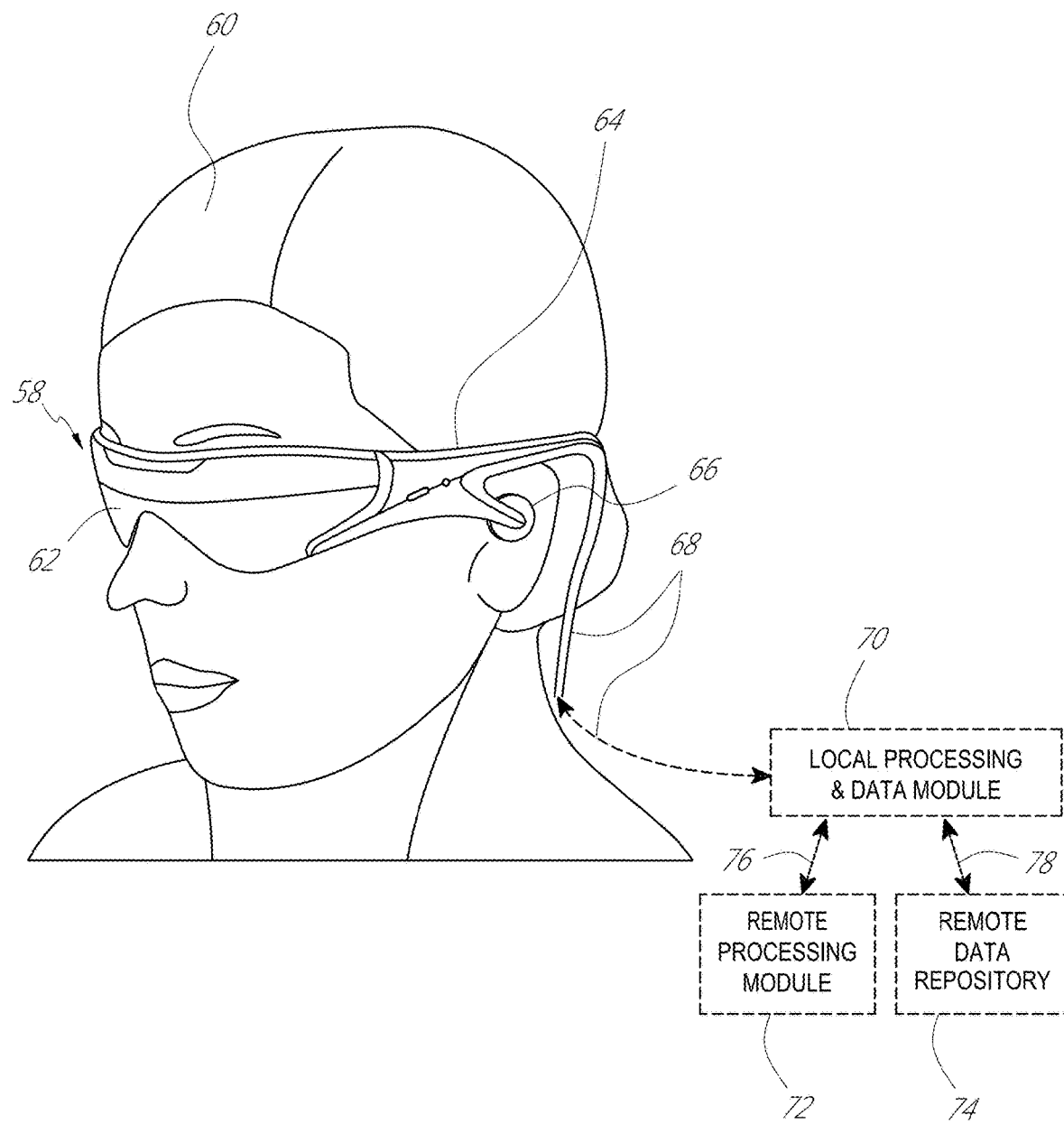
FIGS. 2A-2D schematically illustrate examples of a wearable system.
Figure 2B:
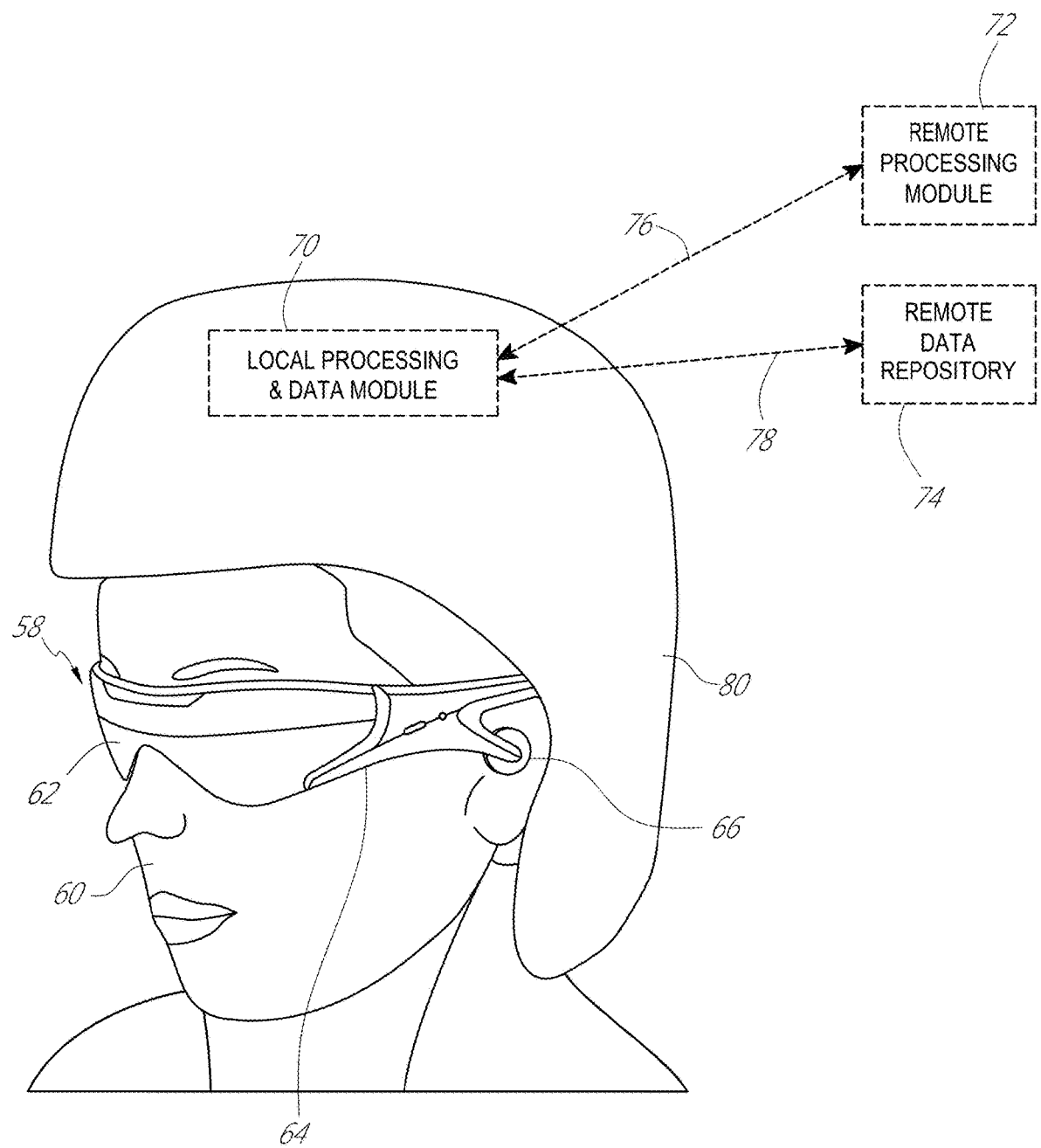
Figure 2C:
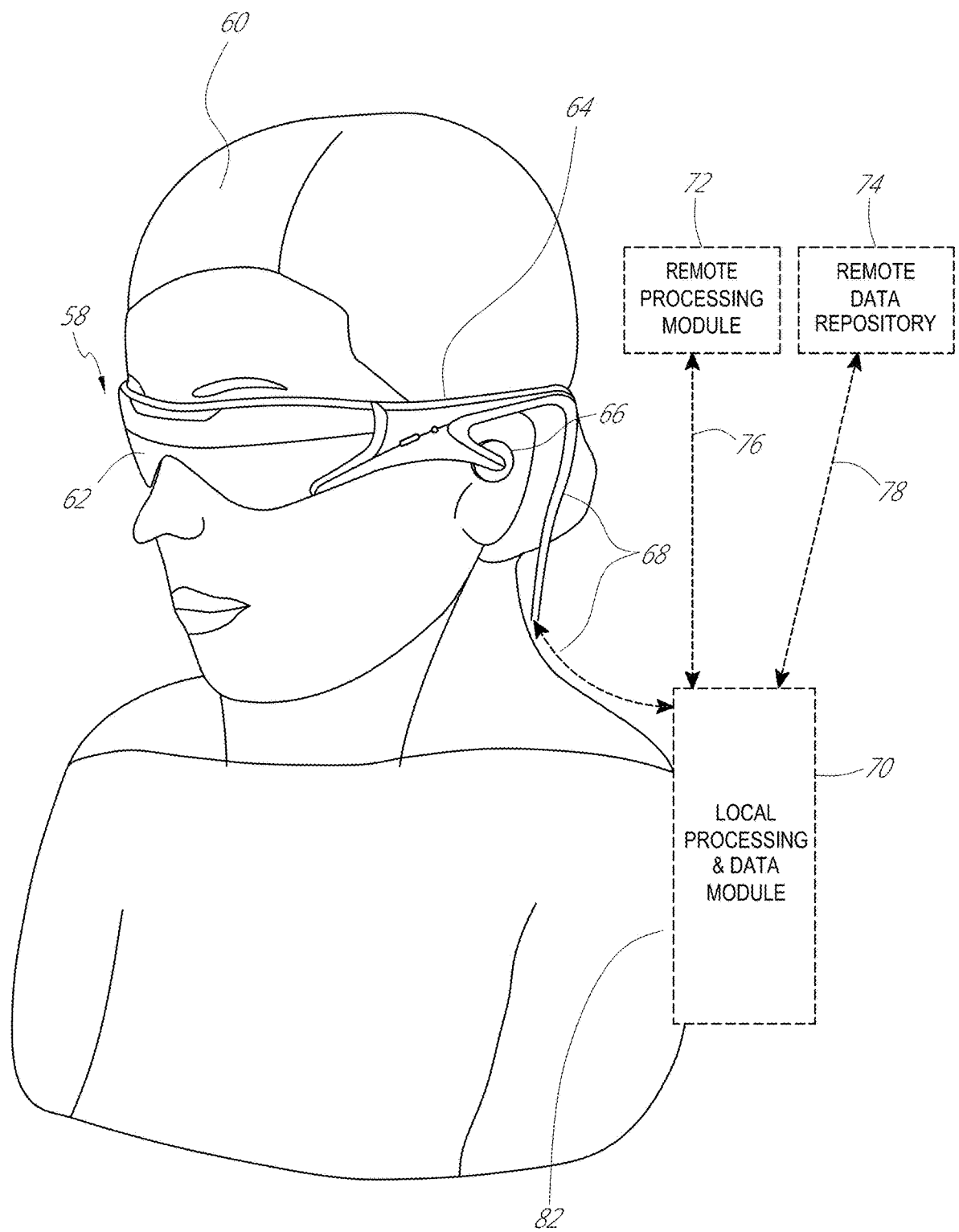
Figure 2D:
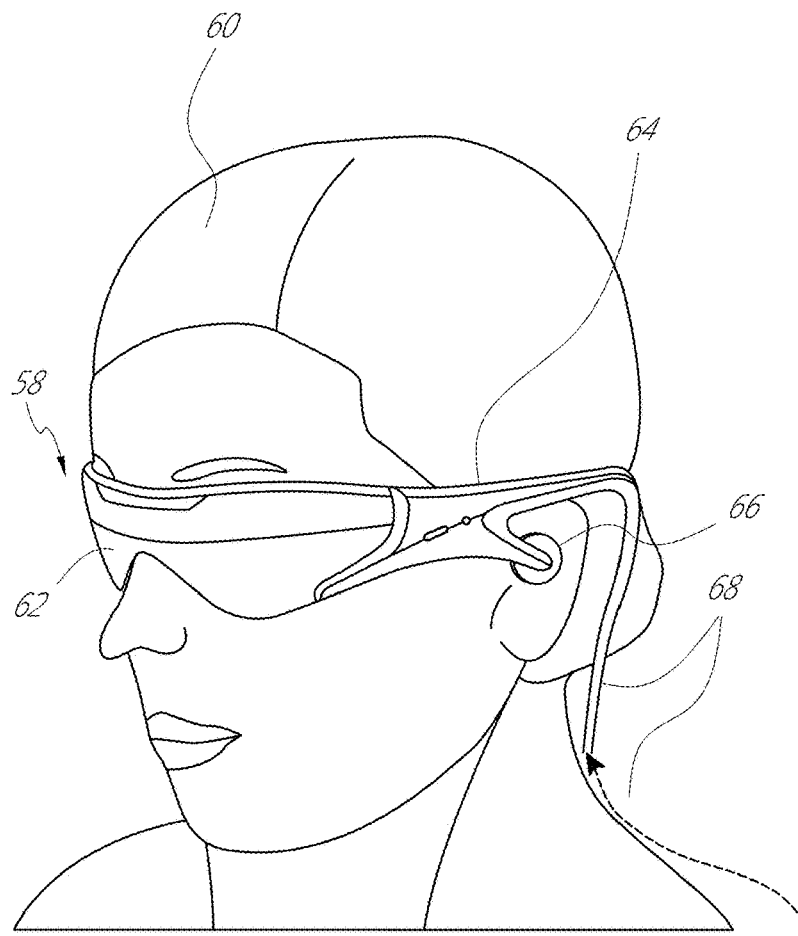
Figure 2D:
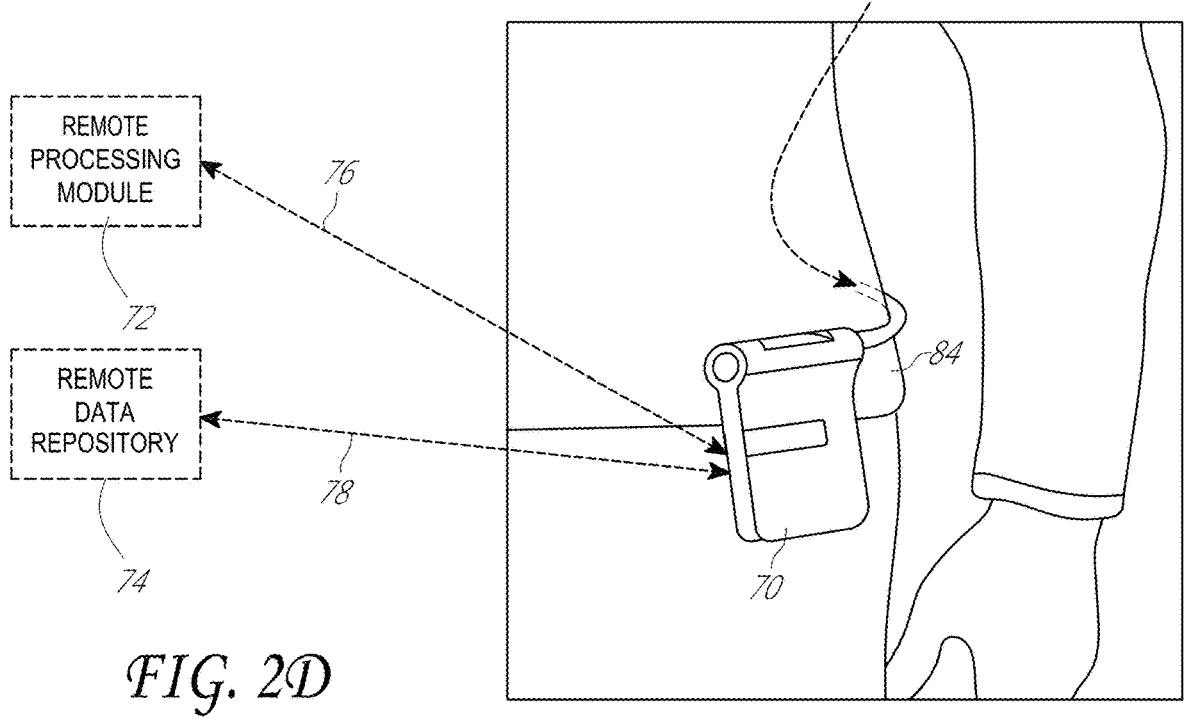

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
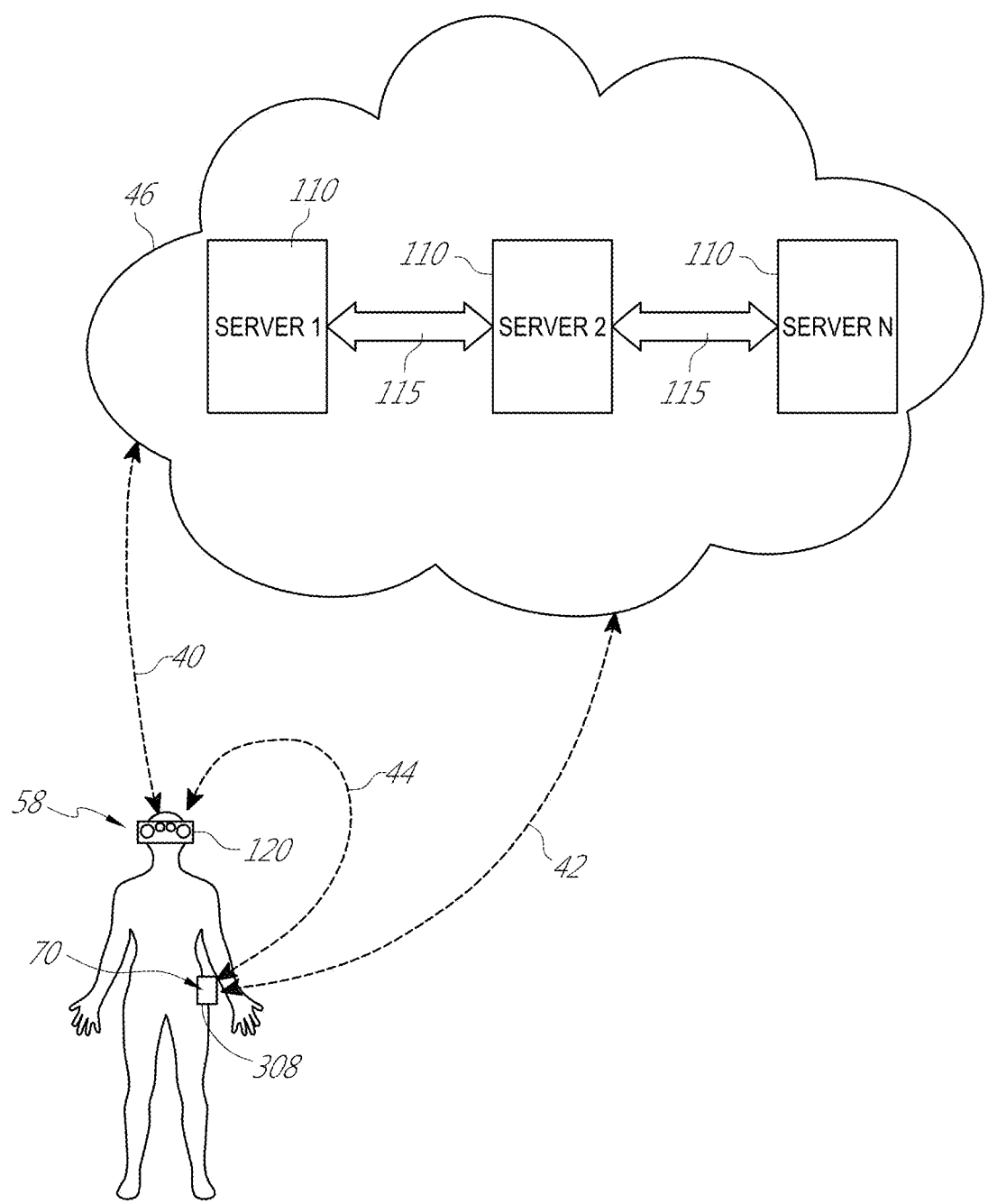
FIG. 3 schematically illustrates coordination between cloud computing assets and local processing assets.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Three-dimensional (3-D) points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. Patent Pub. No. 2014/0306866, entitled "System and method for augmented and virtual reality", which is incorporated by reference in its entirety herein, along with the following additional disclosures, which related to augmented and virtual reality systems such as those developed by Magic Leap, Inc. of Plantation, Fla.: U.S. Patent Pub. No. 2015/0178939; U.S. Patent Pub. No. 2015/0205126; U.S. Patent Pub. No. 2014/0267420; U.S. Patent Pub. No. 2015/0302652; U.S. Patent Pub. No. 2013/0117377; and U.S. Patent Pub. No. 2013/0128230, each of which is hereby incorporated by reference herein in its entirety.

GPS and other localization information may be utilized as inputs to such processing. Highly accurate localization of the user's head, totems, hand gestures, haptic devices etc. may be advantageous in order to display appropriate virtual content to the user.

The head-mounted device (58) may include displays positionable in front of the eyes of the wearer of the device. The displays may comprise light field displays. The displays may be configured to present images to the wearer at a plurality of depth planes. The displays may comprise planar waveguides with diffraction elements. Examples of displays, head-mounted devices, and other AR components usable with any of the embodiments disclosed herein are described in U.S. Patent Publication No. 2015/0016777. U.S. Patent Publication No. 2015/0016777 is hereby incorporated by reference herein in its entirety.

Examples of Electromagnetic Localization

One approach to achieve high precision localization may involve the use of an electromagnetic (EM) field coupled with electromagnetic sensors that are strategically placed on the user's AR head set, belt pack, and/or other ancillary devices (e.g., totems, haptic devices, gaming instruments, etc.). Electromagnetic tracking systems typically comprise at least an electromagnetic field emitter and at least one electromagnetic field sensor. The electromagnetic field emitter generates an electromagnetic field having a known spatial (and/or temporal) distribution in the environment of wearer of the AR headset. The electromagnetic filed sensors measure the generated electromagnetic fields at the locations of the sensors. Based on these measurements and knowledge of the distribution of the generated electromagnetic field, a pose (e.g., a position and/or orientation) of a field sensor relative to the emitter can be determined. Accordingly, the pose of an object to which the sensor is attached can be determined.

Figure 4:
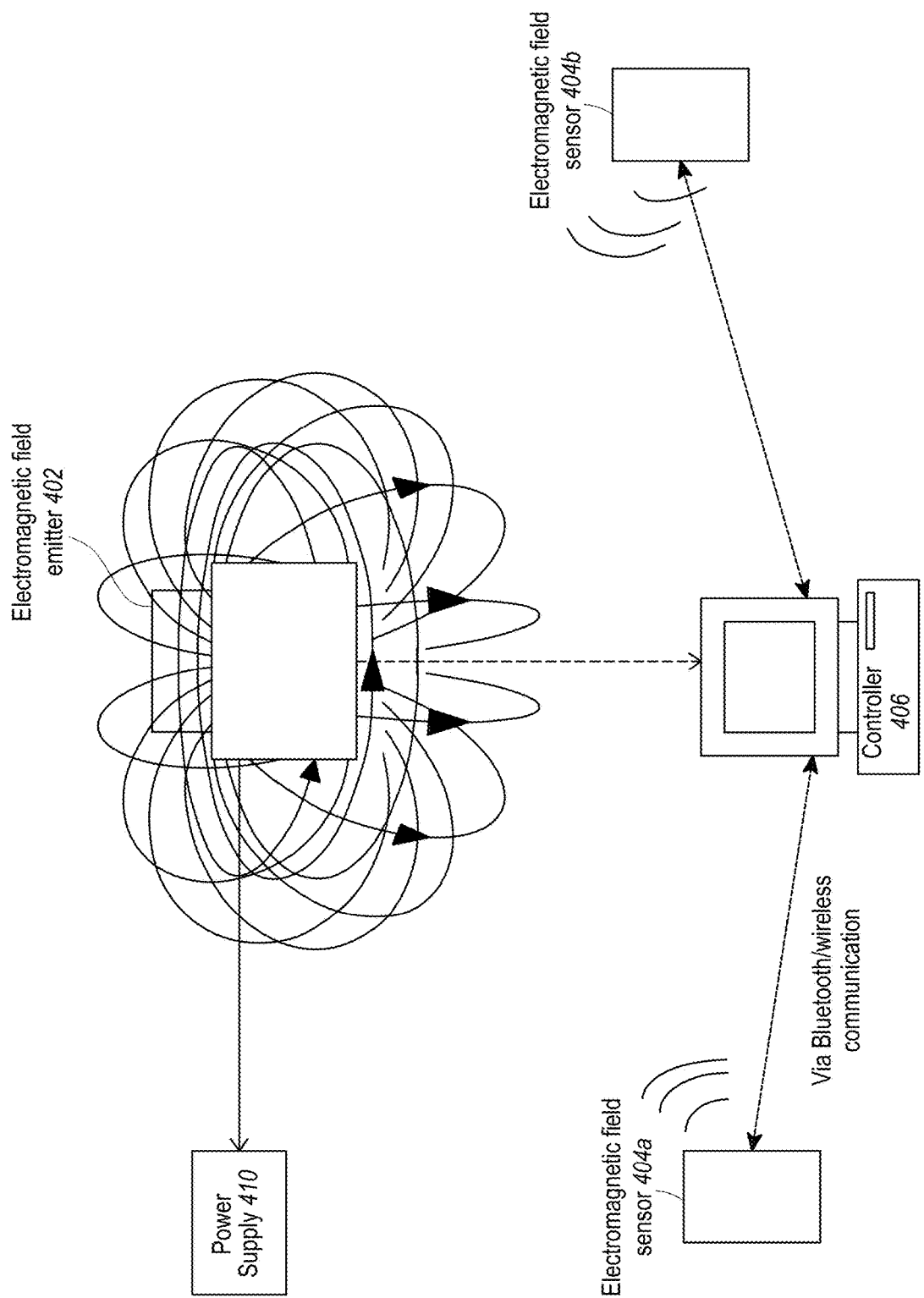
FIG. 4 schematically illustrates an example system diagram of an electromagnetic (EM) tracking system.

Referring now to FIG. 4, an example system diagram of an electromagnetic tracking system (e.g., such as those developed by organizations such as the Biosense division of Johnson & Johnson Corporation, Polhemus, Inc. of Colchester, Vt., manufactured by Sixense Entertainment, Inc. of Los Gatos, Calif., and other tracking companies) is illustrated. In one or more embodiments, the electromagnetic tracking system comprises an electromagnetic field emitter 402 which is configured to emit a known magnetic field. As shown in FIG. 4, the electromagnetic field emitter may be coupled to a power supply (e.g., electric current, batteries, etc.) to provide power to the emitter 402.

In one or more embodiments, the electromagnetic field emitter 402 comprises several coils (e.g., at least three coils positioned perpendicular to each other to produce field in the X, Y and Z directions) that generate magnetic fields. This magnetic field is used to establish a coordinate space (e.g., an X-Y-Z Cartesian coordinate space). This allows the system to map a position of the sensors (e.g., an (X,Y,Z) position) in relation to the known magnetic field, and helps determine a position and/or orientation of the sensors. In one or more embodiments, the electromagnetic sensors 404a, 404b, etc. may be attached to one or more real objects. The electromagnetic sensors 404 may comprise smaller coils in which current may be induced through the emitted electromagnetic field. Generally the "sensor" components (404) may comprise small coils or loops, such as a set of three differently-oriented (e.g., such as orthogonally oriented relative to each other) coils coupled together within a small structure such as a cube or other container, that are positioned/oriented to capture incoming magnetic flux from the magnetic field emitted by the emitter (402), and by comparing currents induced through these coils, and knowing the relative positioning and orientation of the coils relative to each other, relative position and orientation of a sensor relative to the emitter may be calculated.

Figure 6:
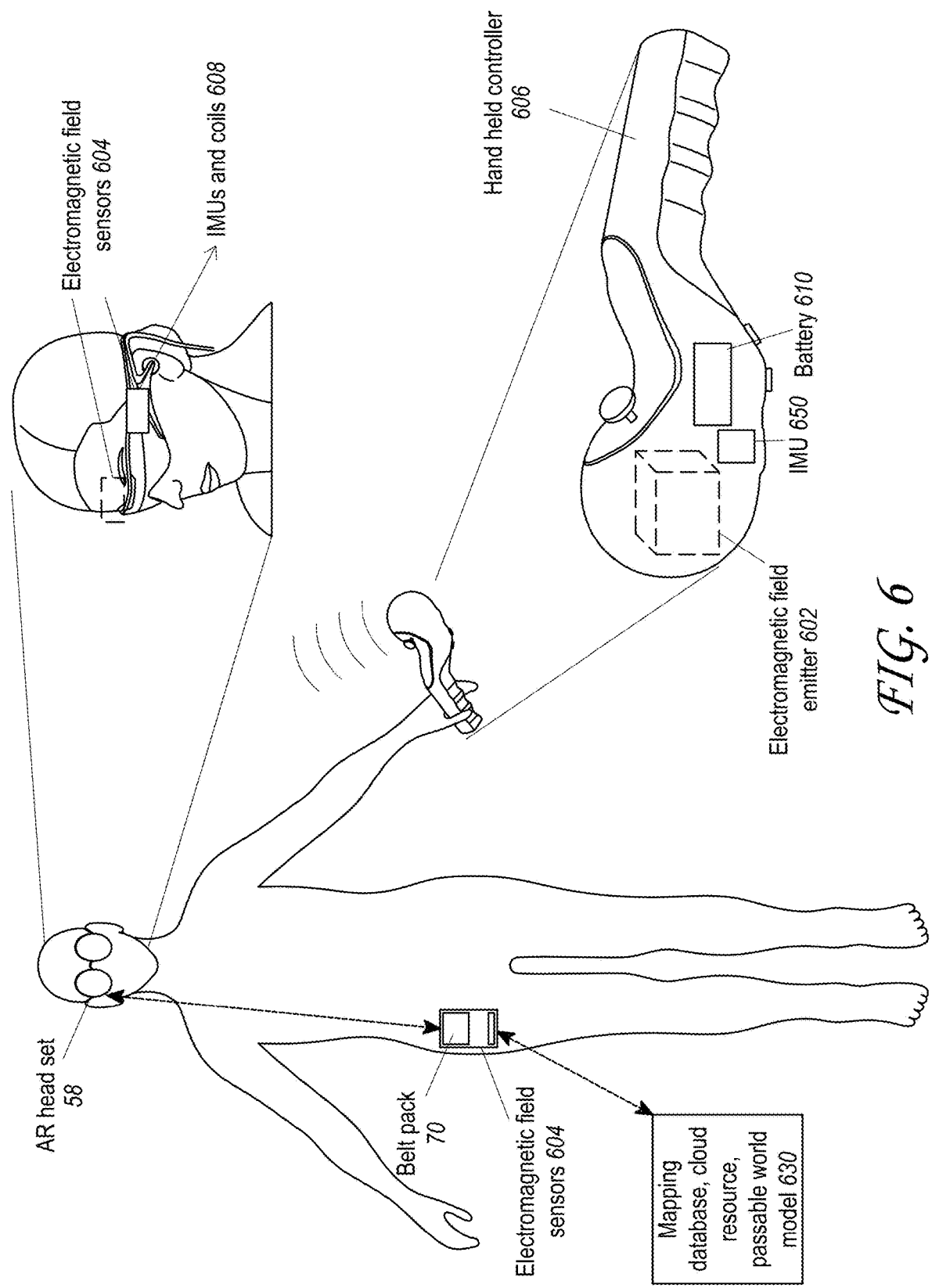
FIG. 6 schematically illustrates an example of an electromagnetic tracking system incorporated with an AR system.

One or more parameters pertaining to a behavior of the coils and inertial measurement unit ("IMU") components operatively coupled to the electromagnetic tracking sensors may be measured to detect a position and/or orientation of the sensor (and the object to which it is attached to) relative to a coordinate system to which the electromagnetic field emitter is coupled. In one or more embodiments, multiple sensors may be used in relation to the electromagnetic emitter to detect a position and orientation of each of the sensors within the coordinate space. The electromagnetic tracking system may provide positions in three directions (e.g., X, Y and Z directions), and further in two or three orientation angles. In one or more embodiments, measurements of the IMU may be compared to the measurements of the coil to determine a position and orientation of the sensors. In one or more embodiments, both electromagnetic (EM) data and IMU data, along with various other sources of data, such as cameras, depth sensors, and other sensors, may be combined to determine the position and orientation. This information may be transmitted (e.g., wireless communication, Bluetooth, etc.) to the controller 406. In one or more embodiments, pose (or position and orientation) may be reported at a relatively high refresh rate in conventional systems. Conventionally an electromagnetic field emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 6, various features of the electromagnetic tracking system may be employed to produce a configuration wherein changes or deltas in position and/or orientation between two objects that move in space relative to a more stable global coordinate system may be tracked; in other words, a configuration is shown in FIG. 6 wherein a variation of an electromagnetic tracking system may be utilized to track position and orientation delta between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the system.

The controller 406 may control the electromagnetic field generator 402, and may also capture data from the various electromagnetic sensors 404. It should be appreciated that the various components of the system may be coupled to each other through any electro-mechanical or wireless/Bluetooth means. The controller 406 may also comprise data regarding the known magnetic field, and the coordinate space in relation to the magnetic field. This information is then used to detect the position and orientation of the sensors in relation to the coordinate space corresponding to the known electromagnetic field.

One advantage of electromagnetic tracking systems is that they produce highly accurate tracking results with minimal latency and high resolution. Additionally, the electromagnetic tracking system does not necessarily rely on optical trackers, and sensors/objects not in the user's line-of-vision may be easily tracked.

It should be appreciated that the strength of the electromagnetic field v drops as a cubic function of distance r from a coil transmitter (e.g., electromagnetic field emitter 402). Thus, an algorithm may be used based on a distance away from the electromagnetic field emitter. The controller 406 may be configured with such algorithms to determine a position and orientation of the sensor/object at varying distances away from the electromagnetic field emitter. Given the rapid decline of the strength of the electromagnetic field as the sensor moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

Figure 5:
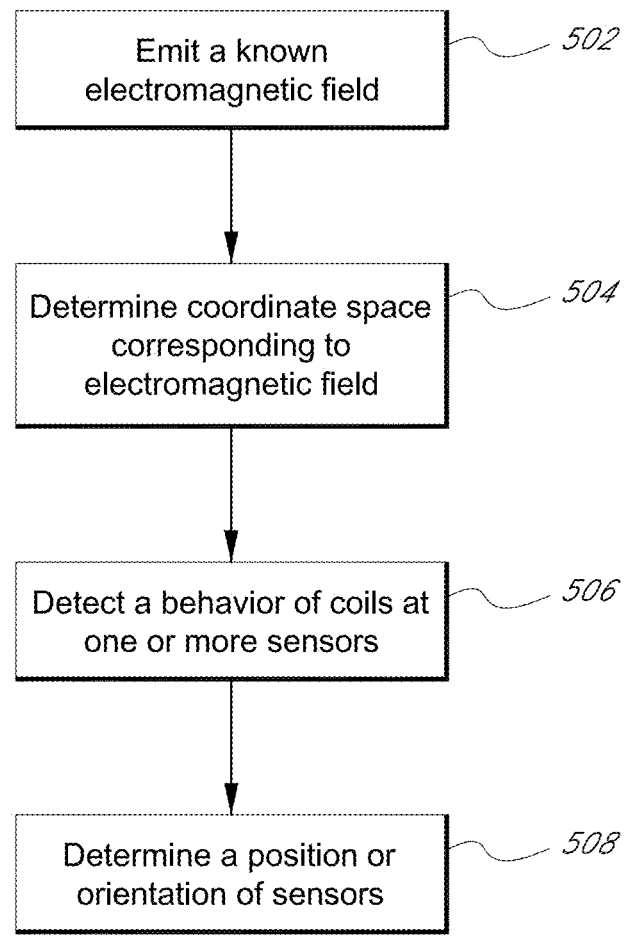
FIG. 5 is a flowchart describing example functioning of an embodiment of an electromagnetic tracking system.

Referring now to FIG. 5, an example flowchart describing a functioning of a typical electromagnetic tracking system is briefly described. At 502, a known electromagnetic field is emitted. In one or more embodiments, the magnetic field emitter may generate magnetic fields each coil may generate an electric field in one direction (e.g., X, Y or Z). The magnetic fields may be generated with an arbitrary waveform. In one or more embodiments, the magnetic field component along each of the axes may oscillate at a slightly different frequency from other magnetic field components along other directions. At 504, a coordinate space corresponding to the electromagnetic field may be determined. For example, the control 406 of FIG. 4 may automatically determine a coordinate space around the emitter based on the electromagnetic field. At 506, a behavior of the coils at the sensors (which may be attached to a known object) may be detected. For example, a current induced at the coils may be calculated. In other embodiments, a rotation of coils, or any other quantifiable behavior may be tracked and measured. At 508, this behavior may be used to detect a position or orientation of the sensor(s) and/or known object. For example, the controller 406 may consult a mapping table that correlates a behavior of the coils at the sensors to various positions or orientations. Based on these calculations, the position in the coordinate space along with the orientation of the sensors may be determined.

In the context of AR systems, one or more components of the electromagnetic tracking system may need to be modified to facilitate accurate tracking of mobile components. As described above, tracking the user's head pose and orientation may be desirable in many AR applications. Accurate determination of the user's head pose and orientation allows the AR system to display the right virtual content to the user. For example, the virtual scene may comprise a monster hiding behind a real building. Depending on the pose and orientation of the user's head in relation to the building, the view of the virtual monster may need to be modified such that a realistic AR experience is provided. Or, a position and/or orientation of a totem, haptic device or some other means of interacting with a virtual content may be important in enabling the AR user to interact with the AR system. For example, in many gaming applications, the AR system can detect a position and orientation of a real object in relation to virtual content. Or, when displaying a virtual interface, a position of a totem, user's hand, haptic device or any other real object configured for interaction with the AR system can be known in relation to the displayed virtual interface in order for the system to understand a command, etc. Conventional localization methods including optical tracking and other methods are typically plagued with high latency and low resolution problems, which makes rendering virtual content challenging in many augmented reality applications.

In one or more embodiments, the electromagnetic tracking system, discussed in relation to FIGS. 4 and 5 may be adapted to the AR system to detect position and orientation of one or more objects in relation to an emitted electromagnetic field. Typical electromagnetic systems tend to have a large and bulky electromagnetic emitters (e.g., 402 in FIG. 4), which is problematic for head-mounted AR devices. However, smaller electromagnetic emitters (e.g., in the millimeter range) may be used to emit a known electromagnetic field in the context of the AR system.

Referring now to FIG. 6, an electromagnetic tracking system may be incorporated with an AR system as shown, with an electromagnetic field emitter 602 incorporated as part of a hand-held controller 606. The controller 606 can be movable independently relative to the AR headset (or the belt pack 70). For example, the user can hold the controller 606 in his or her hand, or the controller could be mounted to the user's hand or arm (e.g., as a ring or bracelet or as part of a glove worn by the user). In one or more embodiments, the hand-held controller may be a totem to be used in a gaming scenario (e.g., a multi-degree-of-freedom controller) or to provide a rich user experience in an AR environment or to allow user interaction with an AR system. In other embodiments, the hand-held controller may be a haptic device. In yet other embodiments, the electromagnetic field emitter may simply be incorporated as part of the belt pack 70. The hand-held controller 606 may comprise a battery 610 or other power supply that powers that electromagnetic field emitter 602. It should be appreciated that the electromagnetic field emitter 602 may also comprise or be coupled to an IMU 650 component configured to assist in determining positioning and/or orientation of the electromagnetic field emitter 602 relative to other components. This may be especially advantageous in cases where both the field emitter 602 and the sensors (604) are mobile. Placing the electromagnetic field emitter 602 in the hand-held controller rather than the belt pack, as shown in the embodiment of FIG. 6, helps ensure that the electromagnetic field emitter is not competing for resources at the belt pack, but rather uses its own battery source at the hand-held controller 606. In yet other embodiments, the electromagnetic field emitter 602 can be disposed on the AR headset and the sensors 604 can be disposed on the controller 606 or belt pack 70.

In one or more embodiments, the electromagnetic sensors 604 may be placed on one or more locations on the user's headset, along with other sensing devices such as one or more IMUs or additional magnetic flux capturing coils 608. For example, as shown in FIG. 6, sensors (604, 608) may be placed on one or both sides of the head set (58). Since these sensors are engineered to be rather small (and hence may be less sensitive, in some cases), having multiple sensors may improve efficiency and precision. In one or more embodiments, one or more sensors may also be placed on the belt pack 70 or any other part of the user's body. The sensors (604, 608) may communicate wirelessly or through Bluetooth to a computing apparatus that determines a pose and orientation of the sensors (and the AR headset to which it is attached). In one or more embodiments, the computing apparatus may reside at the belt pack 70. In other embodiments, the computing apparatus may reside at the headset itself, or even the hand-held controller 606. The computing apparatus may in turn comprise a mapping database (e.g., passable world model, coordinate space, etc.) to detect pose, to determine the coordinates of real objects and virtual objects, and may even connect to cloud resources and the passable world model, in one or more embodiments.

As described above, conventional electromagnetic emitters may be too bulky for AR devices. Therefore the electromagnetic field emitter may be engineered to be compact, using smaller coils compared to traditional systems. However, given that the strength of the electromagnetic field decreases as a cubic function of the distance away from the field emitter, a shorter radius between the electromagnetic sensors 604 and the electromagnetic field emitter 602 (e.g., about 3 to 3.5 ft) may reduce power consumption when compared to conventional systems such as the one detailed in FIG. 4.

This aspect may either be utilized to prolong the life of the battery 610 that may power the controller 606 and the electromagnetic field emitter 602, in one or more embodiments. Or, in other embodiments, this aspect may be utilized to reduce the size of the coils generating the magnetic field at the electromagnetic field emitter 602. However, in order to get the same strength of magnetic field, the power may be need to be increased. This allows for a compact electromagnetic field emitter unit 602 that may fit compactly at the hand-held controller 606.

Several other changes may be made when using the electromagnetic tracking system for AR devices. Although this pose reporting rate is rather good, AR systems may require an even more efficient pose reporting rate. To this end, IMU-based pose tracking may (additionally or alternatively) be used in the sensors. Advantageously, the IMUs may remain as stable as possible in order to increase an efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10 to 20 Hz. By keeping the IMUs stable at a reasonable rate, the rate of pose updates may be dramatically decreased to 10 to 20 Hz (as compared to higher frequencies in conventional systems).

If the electromagnetic tracking system can be run at, for example, a 10% duty cycle (e.g., only pinging for ground truth every 100 milliseconds), this would be another way to save power at the AR system. This would mean that the electromagnetic tracking system wakes up every 10 milliseconds out of every 100 milliseconds to generate a pose estimate. This directly translates to power consumption savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multi-player game, for example.

Figure 7:
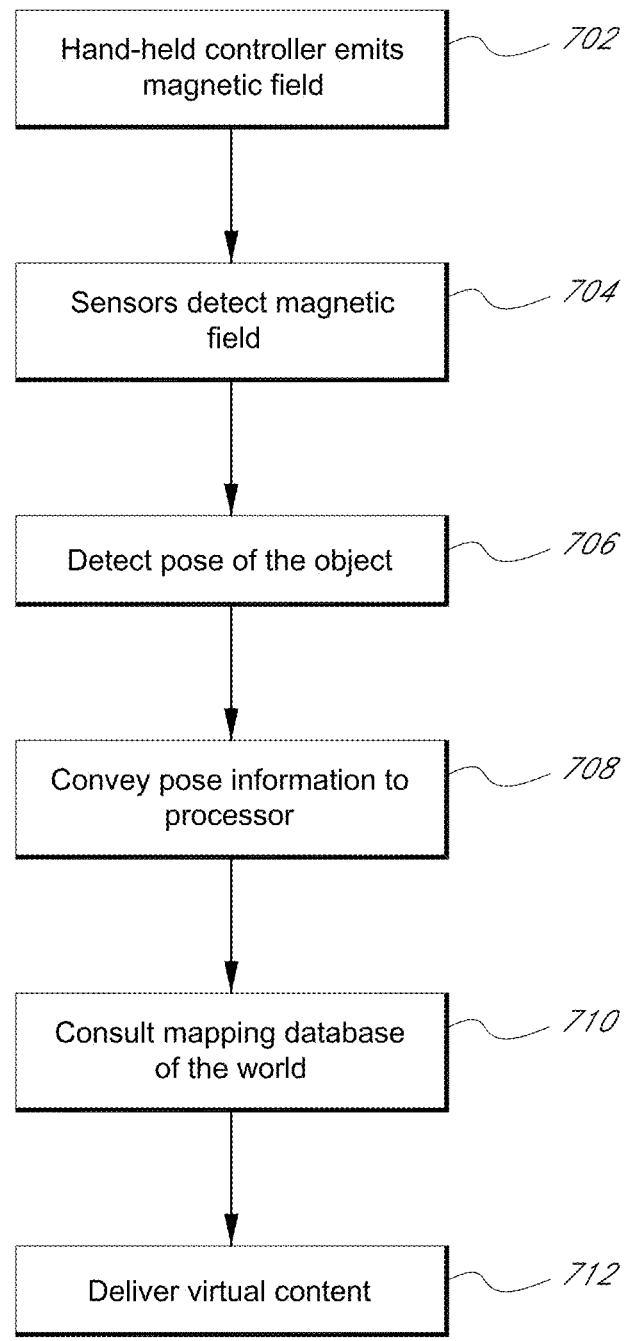
FIG. 7 is a flowchart describing functioning of an example of an electromagnetic tracking system in the context of an AR device.

Referring now to FIG. 7, an example flow chart describing the electromagnetic tracking system in the context of AR devices is described. At 702, a portable (e.g., hand-held) controller emits a magnetic field. At 704, the electromagnetic sensors (placed on headset, belt pack, etc.) detect the magnetic field. At 706, a pose (e.g., position or orientation) of the headset/belt is determined based on a behavior of the coils/IMUs at the sensors. At 708, the pose information is conveyed to the computing apparatus (e.g., at the belt pack or headset). At 710, optionally, a mapping database (e.g., passable world model) may be consulted to correlate the real world coordinates (e.g., determined for the pose of the headset/belt) with the virtual world coordinates. At 712, virtual content may be delivered to the user at the AR headset and displayed to the user (e.g., via the light field displays described herein). It should be appreciated that the flowchart described above is for illustrative purposes only, and should not be read as limiting.

Advantageously, using an electromagnetic tracking system similar to the one outlined in FIG. 6 enables pose tracking (e.g., head position and orientation, position and orientation of totems, and other controllers). This allows the AR system to project virtual content (based at least in part on the determined pose) with a higher degree of accuracy, and very low latency when compared to optical tracking techniques.

Figure 8:
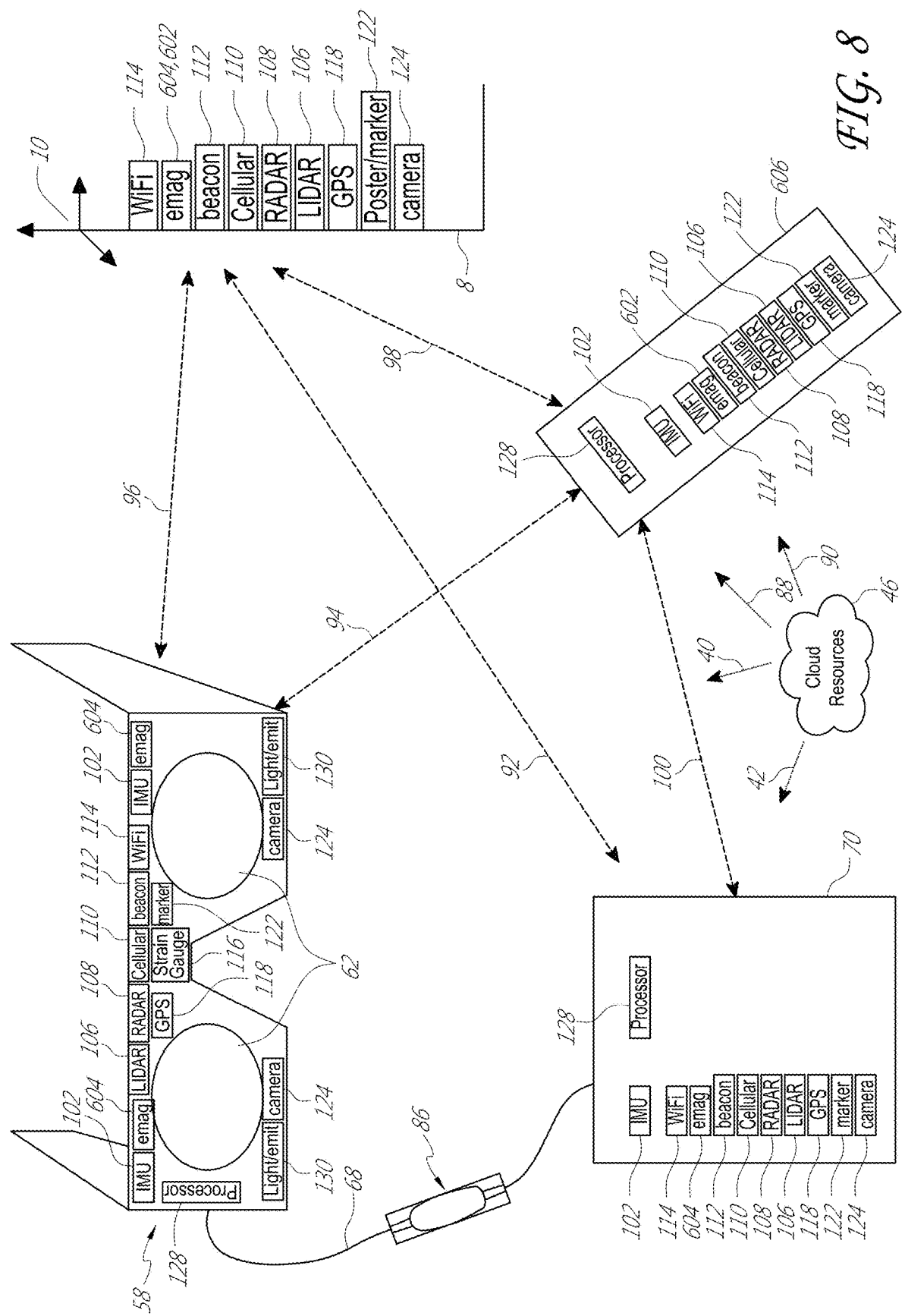
FIG. 8 schematically illustrates examples of components of an embodiment of an AR system.

Referring to FIG. 8, a system configuration is illustrated wherein featuring many sensing components. A head mounted wearable component (58) is shown operatively coupled (68) to a local processing and data module (70), such as a belt pack, here using a physical multicore lead which also features a control and quick release module (86) as described below in reference to FIGS. 9A-9F. The local processing and data module (70) is operatively coupled (100) to a hand held component (606), here by a wireless connection such as low power Bluetooth; the hand held component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8).

Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a wireless transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124).

The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (62), wherein it may be valuable to understand if bending of the platform has occurred, such as at a thinned portion of the platform, such as the portion above the nose on the eyeglasses-like platform depicted in FIG. 8.

The head mounted wearable component (58) also features a processor (128) and one or more IMUs (102). Each of the components preferably are operatively coupled to the processor (128). The hand held component (606) and local processing and data module (70) are illustrated featuring similar components. As shown in FIG. 8, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking (as described herein), RADAR, and LIDAR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

Figure 9A:
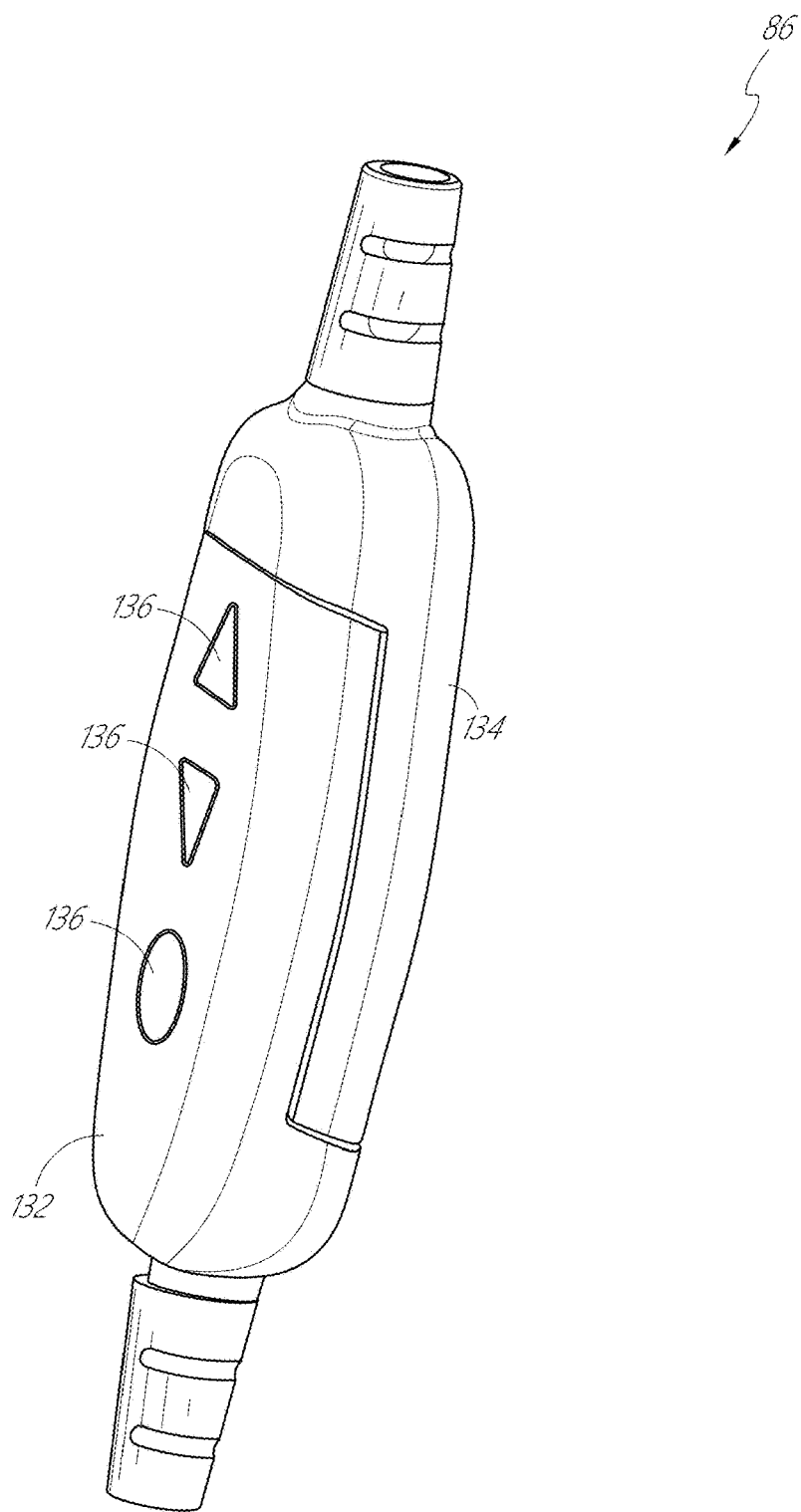
FIGS. 9A-9F schematically illustrate examples of a quick release module.

Referring to FIGS. 9A-9F, various aspects of the control and quick release module (86) are depicted. Referring to FIG. 9A, two outer housing components (132, 134) are coupled together using a magnetic coupling configuration which may be enhanced with mechanical latching. Buttons (136) for operation of the associated system may be included, for example, an on/off button (circular button) and up/down volume controls (triangular buttons). Opposing ends of the module 86 can be connected to electrical leads running between the local processing and data module (70) and the display (62) as shown in FIG. 8.

Figure 9B:
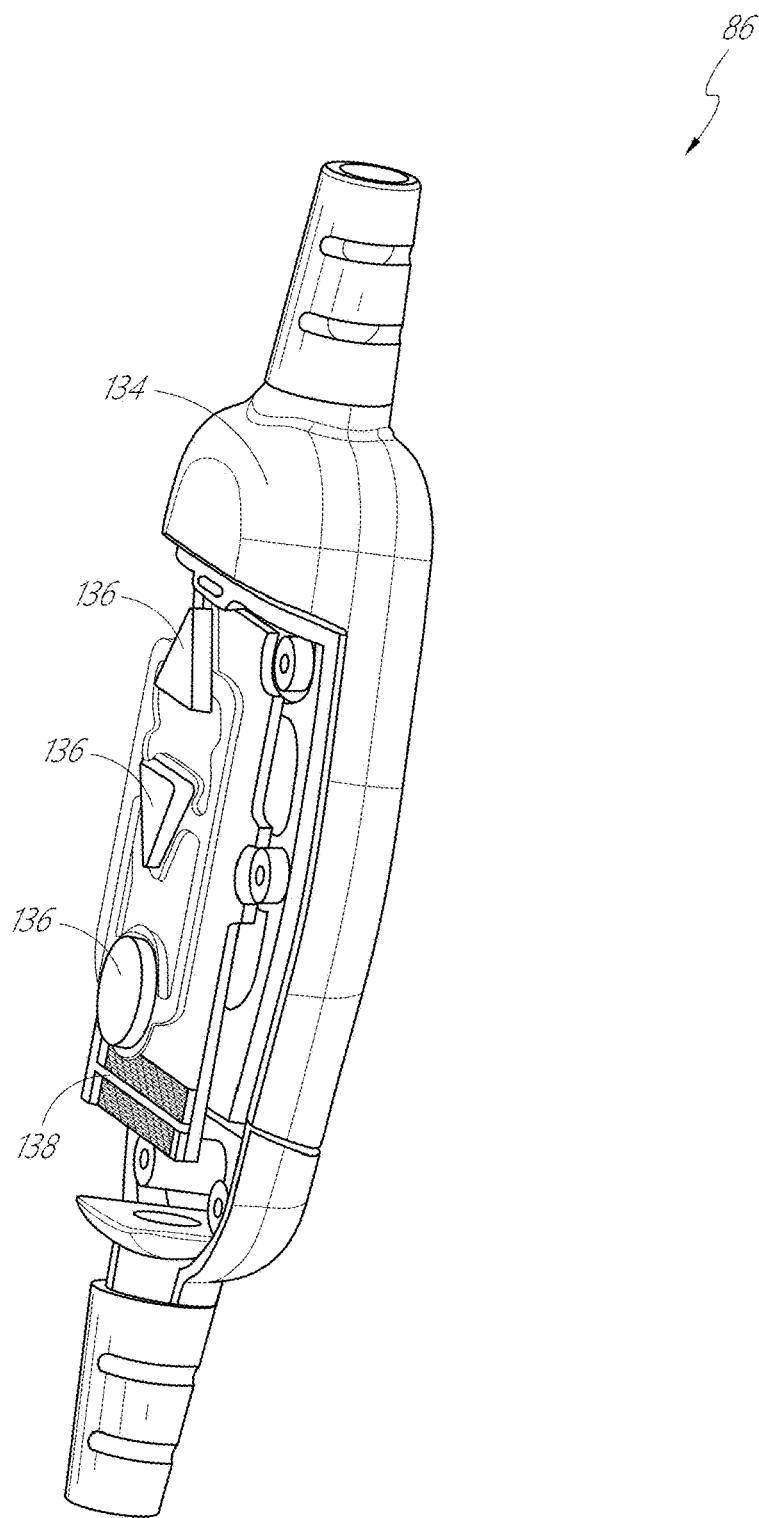
Figure 9C:
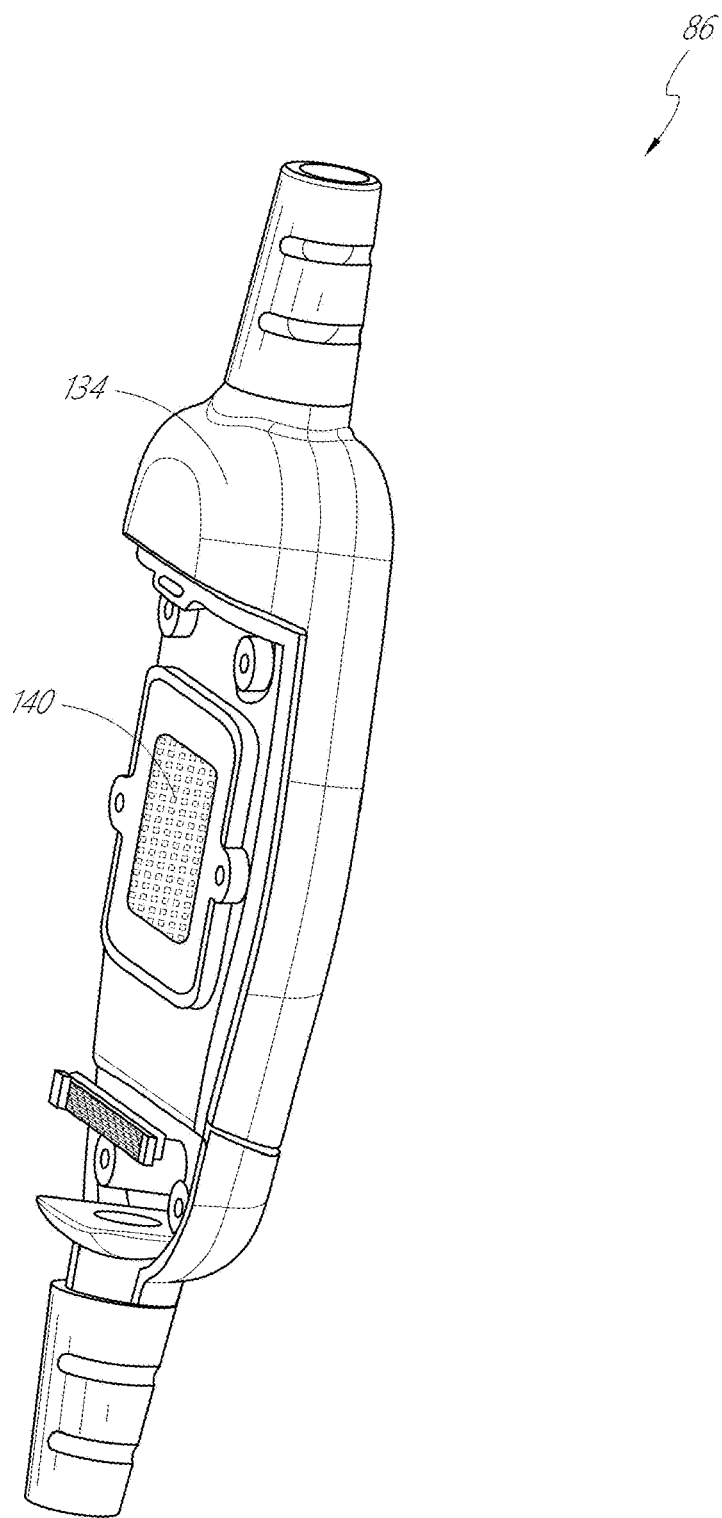
Figure 9D:
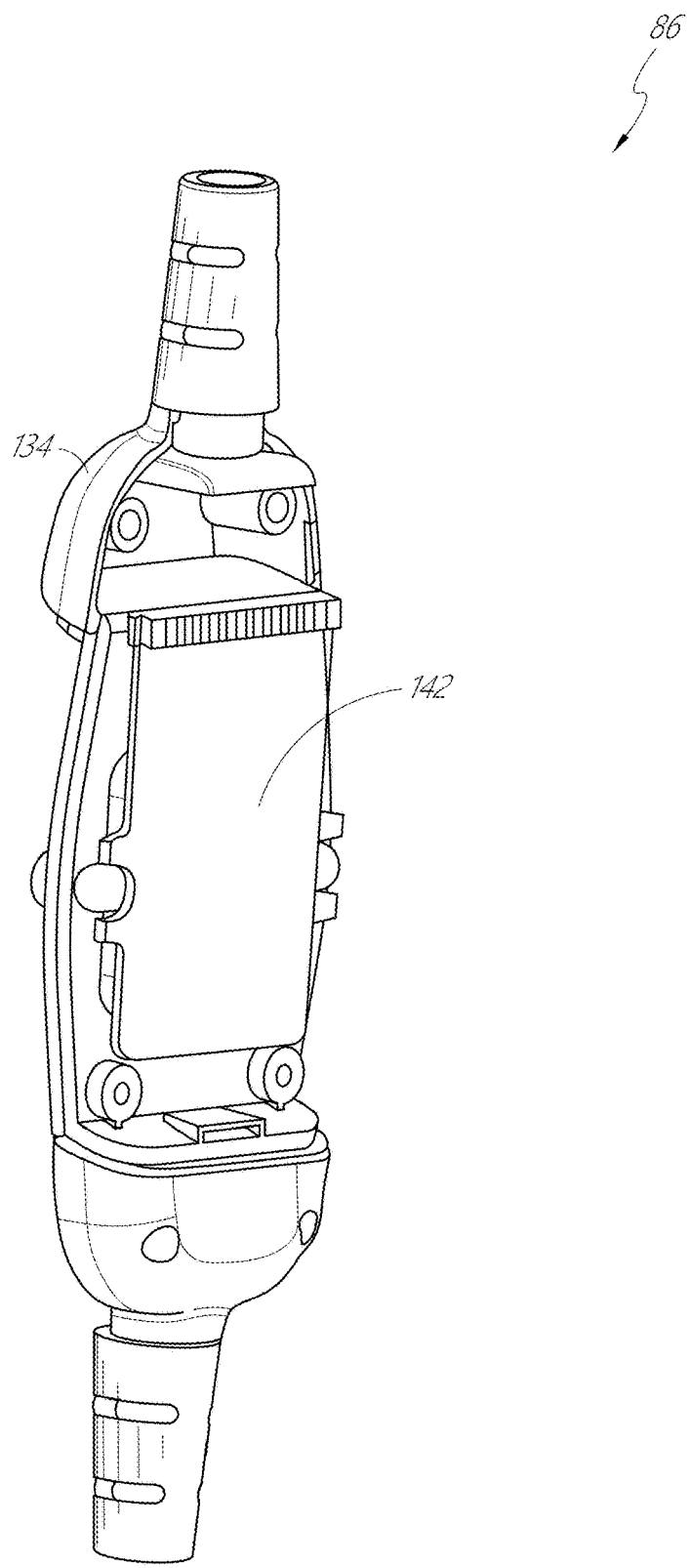
Figure 9E:
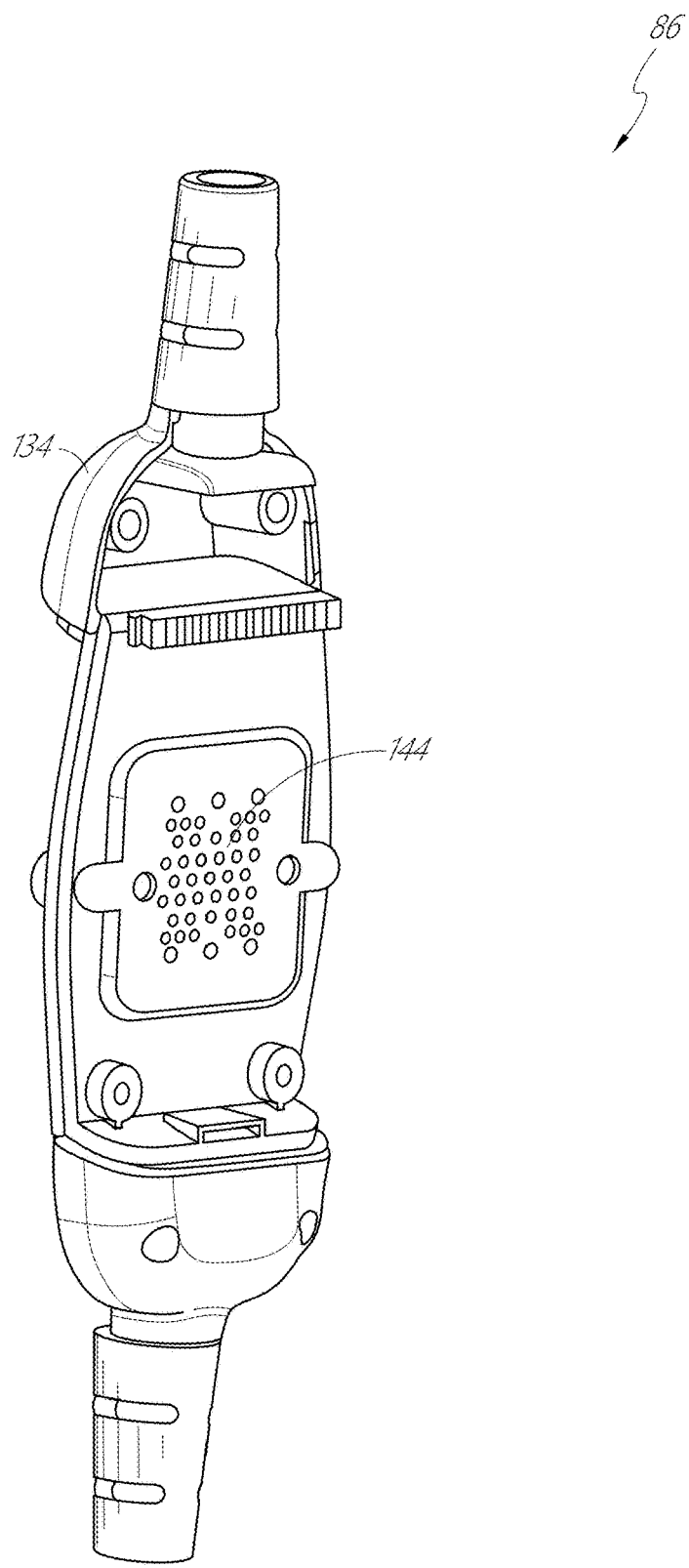

FIG. 9B illustrates a partial cutaway view with the outer housing (132) removed showing the buttons (136) and the underlying top printed circuit board (138). Referring to FIG. 9C, with the buttons (136) and underlying top printed circuit board (138) removed, a female contact pin array (140) is visible. Referring to FIG. 9D, with an opposite portion of housing (134) removed, the lower printed circuit board (142) is visible. With the lower printed circuit board (142) removed, as shown in FIG. 9E, a male contact pin array (144) is visible.

Figure 9F:
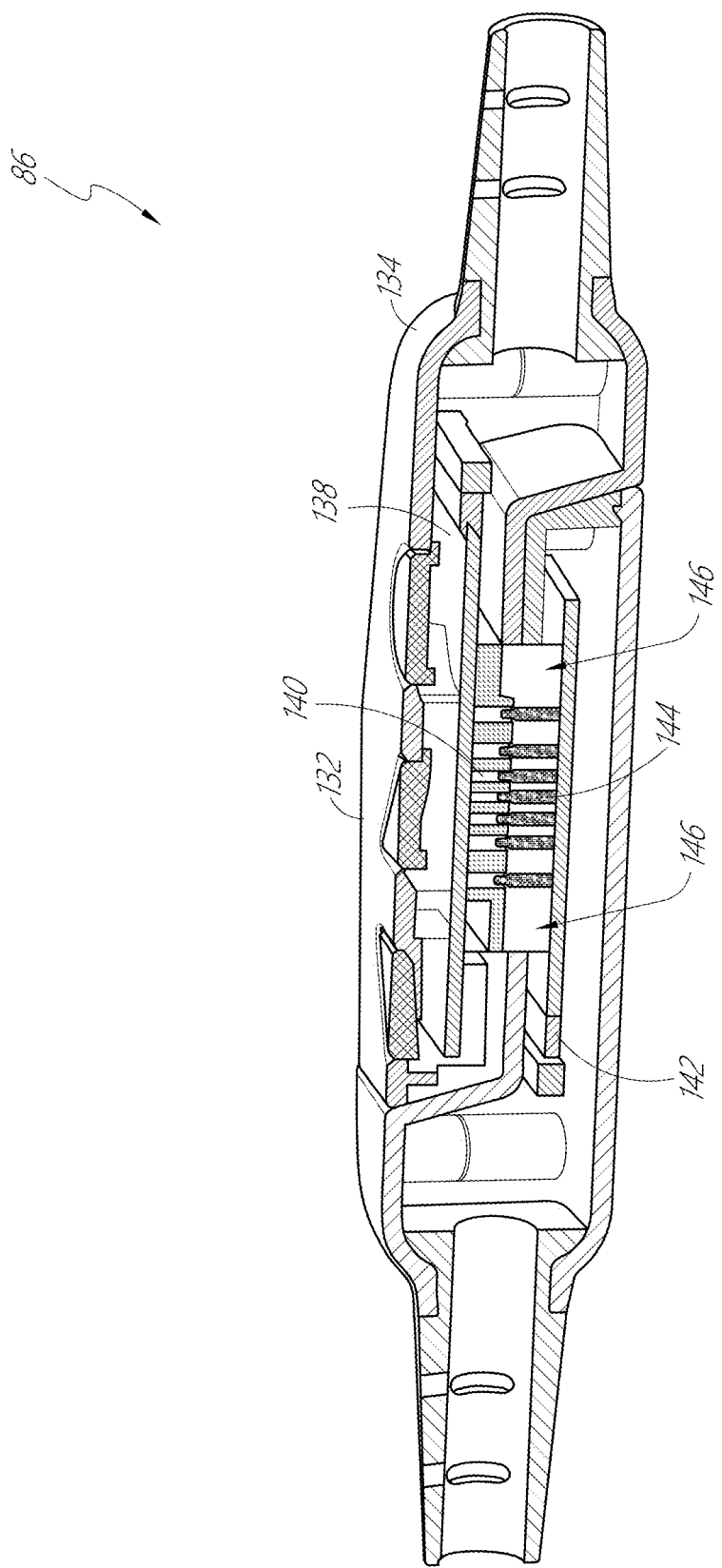

Referring to the cross-sectional view of FIG. 9F, at least one of the male pins or female pins are configured to be spring-loaded such that they may be depressed along each pin's longitudinal axis; the pins may be termed "pogo pins" and generally comprise a highly conductive material, such as copper or gold. The conductive material may be plated onto the pins (e.g., immersion or electroplating) and the width of the conductive material may be, e.g., at least 25 μm of gold in some cases. When assembled, the illustrated configuration mates 46 male pins with 46 corresponding female pins, and the entire assembly may be quick-release decoupled by manually pulling the two housings (132, 134) apart and overcoming a magnetic interface (146) load which may be developed using north and south magnets oriented around the perimeters of the pin arrays (140, 144). In one embodiment, an approximate 2 kg load from compressing the 46 pogo pins is countered with a closure maintenance force of about 4 kg provided by the magnetic interface (146). The pins in the array may be separated by about 1.3 mm, and the pins may be operatively coupled to conductive lines of various types, such as twisted pairs or other combinations to support interfaces such as USB 3.0, HDMI 2.0 (for digital video), and I2S (for digital audio), transition-minimized differential signaling (TMDS) for high speed serial data, general purpose input/output (GPIO), and mobile interface (e.g., MIPI) configurations, battery/power connections, and high current analog lines and grounds configured for up to about 4 amps and 5 volts in one embodiment.

In one embodiment, the magnetic interface (146) is generally rectangular and surrounds the pin arrays (140, 144) and is about 1 mm wide and 4.8 mm high. The inner diameter of the rectangular magnet is about 14.6 mm. The magnet surrounding the male pin array (144) may have a first polarity (e.g., north), and the magnet surrounding the female pin array (140) may have a second (opposite) polarity (e.g., south). In some cases, each magnet comprises a mixture of north and south polarities, with the opposing magnet having corresponding opposite polarities, to provide a magnetic attraction to assist holding the housings (132, 134) together.

The pogo pins in the arrays (140, 144) have heights in a range of 4.0 to 4.6 mm and diameters in a range of 0.6 to 0.8 mm. Different pins in the array can have different heights, diameters, and pitches. For example, in one implementation, the pin arrays (140, 144) have a length of about 42 to 50 mm, a width of about 7 to 10 mm, and a height of about 5 mm. The pitch of the pin array for USB 2.0 and other signals can be about 1.3 mm, and the pitch of the pin array for high speed signals can be about 2.0 to 2.5 mm.

Figure 10:
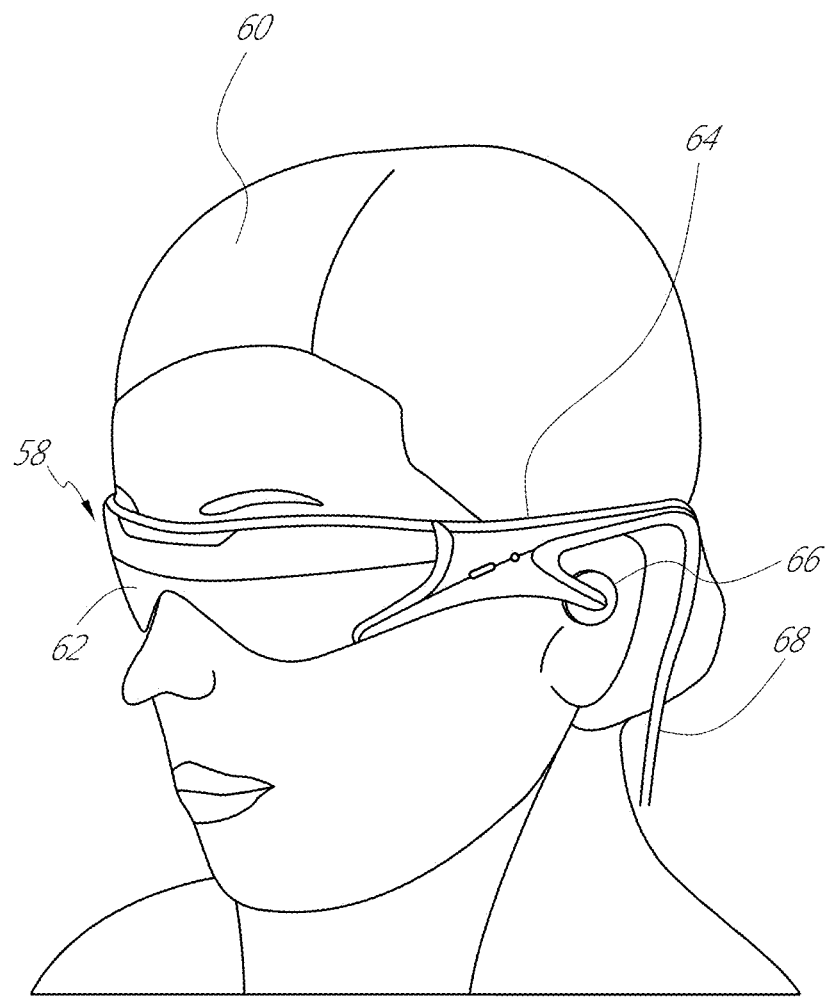
FIG. 10 schematically illustrates a head-mounted display system.

Referring to FIG. 10, it can be helpful to have a minimized component/feature set to be able to reduce or minimize the weight or bulk of the various components, and to arrive at a relatively slim head mounted component, for example, such as that (58) featured in FIG. 10. Thus various permutations and combinations of the various components shown in FIG. 8 may be utilized.

Example Electromagnetic Sensing Components in an AR System

Figure 11A:
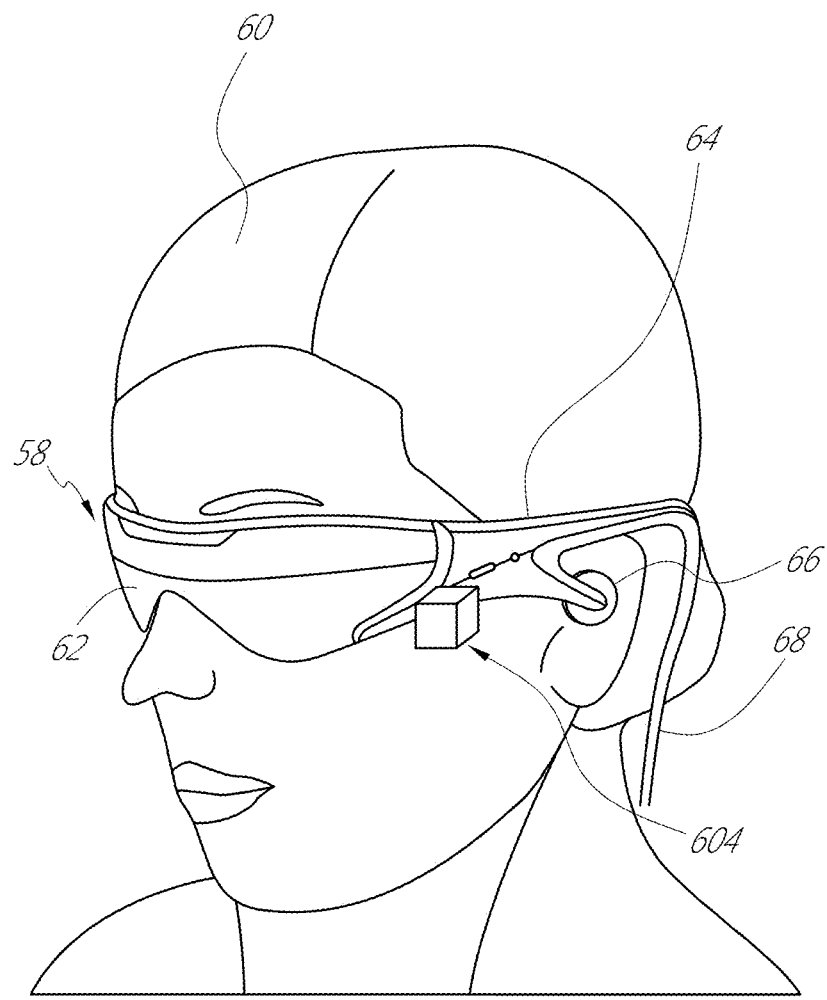
FIGS. 11A and 11B schematically illustrate examples of electromagnetic sensing coils coupled to a head-mounted display.
Figure 11B:
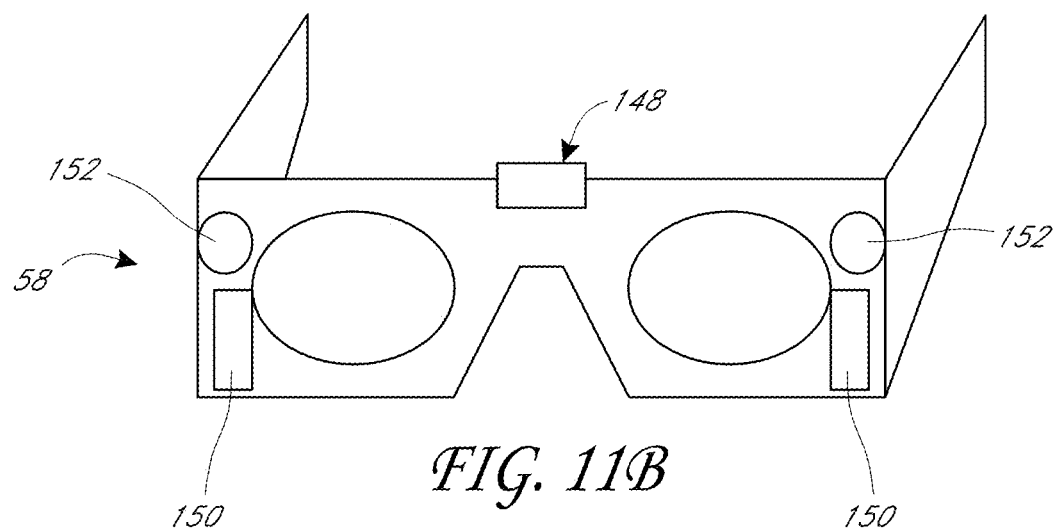

Referring to FIG. 11A, an electromagnetic sensing coil assembly (604, e.g., 3 individual coils coupled to a housing) is shown coupled to a head mounted component (58); such a configuration adds additional geometry to the overall assembly which may not be desirable. Referring to FIG. 11B, rather than housing the coils in a box or single housing 604 as in the configuration of FIG. 11A, the individual coils may be integrated into the various structures of the head mounted component (58), as shown in FIG. 11B. FIG. 11B shows examples of locations on the head-mounted display 58 for X-axis coils (148), Y-axis coils (150), and Z-axis coils (152). Thus, the sensing coils can be distributed spatially on or about the head-mounted display (58) to provide a desired spatial resolution or accuracy of the localization and/or orientation of the display (58) by the electromagnetic tracking system.

Figure 12E:
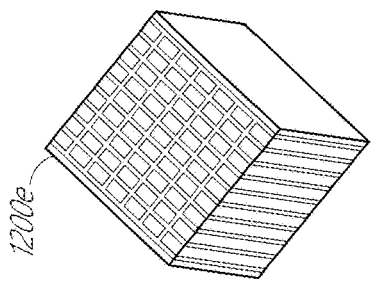
FIGS. 12A-12E schematically illustrate example configurations of a ferrite core that can be coupled to an electromagnetic sensor.
Figure 12D:
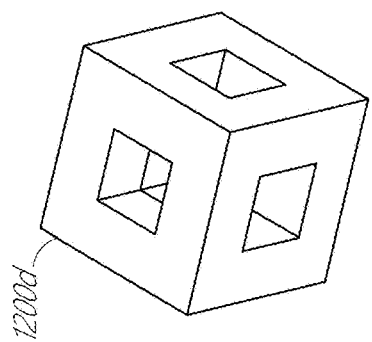
Figure 12C:
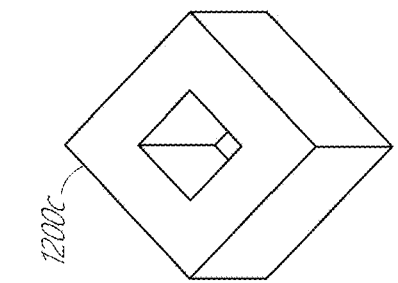
Figure 12B:
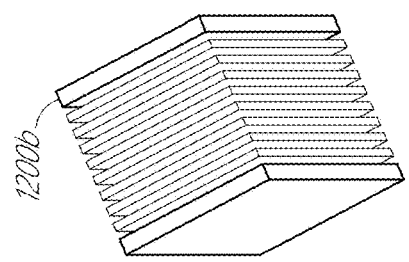
Figure 12A:
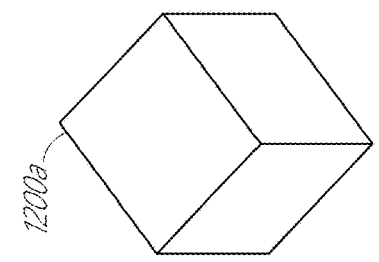

FIGS. 12A-12E illustrate various configurations for using a ferrite core 1200a-1200e coupled to an electromagnetic sensor to increase field sensitivity. FIG. 12A illustrates a solid ferrite core 1200a in a shape of a cube, FIG. 12B shows a ferrite core 1200b configured as a plurality of rectangular disks spaced apart from each other, FIG. 12C shows a ferrite core 1200c having a single axis air core, FIG. 12D shows a ferrite core 1200d having a three-axis air core, and FIG. 12E shows a ferrite core 1200e comprising a plurality of ferrite rods in a housing (which may be made from plastic). The embodiments 1200b-1200e of FIGS. 12B-12E are lighter in weight than the solid core embodiment 1200a of FIG. 12A and may be utilized to save mass. Although shown as a cube in FIGS. 12A-12E, the ferrite core can be shaped differently in other embodiments.

Frequency Division Multiplexing, Time Division Multiplexing, and Gain Control for EM Tracking Systems Conventional EM tracking solutions typically employ either a frequency division multiplexed (FDM) circuit design or a time division multiplexed (TDM) circuit design. However, an FDM design typically uses more current and a TDM design typically supports only a limited number of users. As described further below, a circuit design that merges both the FDM and TDM designs may achieve the benefits of both. Advantages of such a design can include savings on the area of the printed circuit board (PCB), material costs, number of parts used, and/or current drain as compared to conventional designs. The design can also allow for multiple users at improved or optimum performance.

FIG. 13A is a block diagram that schematically illustrates an example of an EM transmitter (TX) circuit 1302 that is frequency division multiplexed. The EM transmitter circuit can drive three tuned orthogonal coils in an EM tracking system. The time-varying EM field generated by the EM TX can be sensed by an EM receiver (e.g., described with reference to FIG. 13B). This circuit uses a master control unit (MCU) to control three different synthesizers at three different radio frequency (RF) frequencies (f1, f2, and f3) whose outputs are filtered (e.g., at bandpass filters (BPF) and optional ferrite beads (FB)) and amplified (e.g., via pre-amplifiers (PA)) and fed to respective X, Y, Z coils. The circuit also employs a current sensing control circuit (R-sense and Current Ctrl) that ensures that the current into each coil remains constant. This circuit also has an RF wireless communication interface (e.g., Bluetooth Low Energy (BLE)) connected to the MCU that communicates with an EM receiver unit described with reference to FIG. 13B.

FIG. 13B is a block diagram that schematically illustrates an example of an EM receiver (RX) circuit 1304 that is frequency division multiplexed. The EM receiver uses three orthogonal coils (X-coil operating at frequency f1, Y-coil operating at frequency f2, and Z-coil operating at frequency f3) to receive the time-varying EM signals generated by the EM TX circuit 1302 (see, e.g., FIG. 13A). The three signals are individually amplified (e.g., via pre-amplifiers (PA)) and filtered (e.g., by bandpass filters (BPF)) in parallel. Optionally, the filter output may be further amplified. The amplified output is then fed into an analog-to-digital (ADC) and the digital signals are processed by a digital signal processor (DSP). The DSP can control the gain of the pre-amplifiers to keep the ADC from saturating. This receiver design also has a radio frequency (RF) communication link connected to the DSP (or an MCU) that communicates with the EM transmitter (e.g., described with reference to FIG. 13B). The RF link can be configured to support any suitable wireless standard, including Bluetooth Low Energy (BLE).

The EM TX and RX circuits 1302, 1304 shown in FIGS. 13A and 13B (as well as the TX and RX circuits described below with reference to FIGS. 13C-13J) can be used for EM tracking. For example, the EM TX circuit 1302 can be used in the EM field emitter 402 and the EM RX circuit 1304 used in the EM field sensor 404 described with reference to FIG. 4. Additional embodiments of EM TX and RX circuits will be described that can provide advantages such as, e.g., reduced part count, reduced PCB area, lower material costs, and which may allow for multiple users at optimum performance.

Figure 13C:
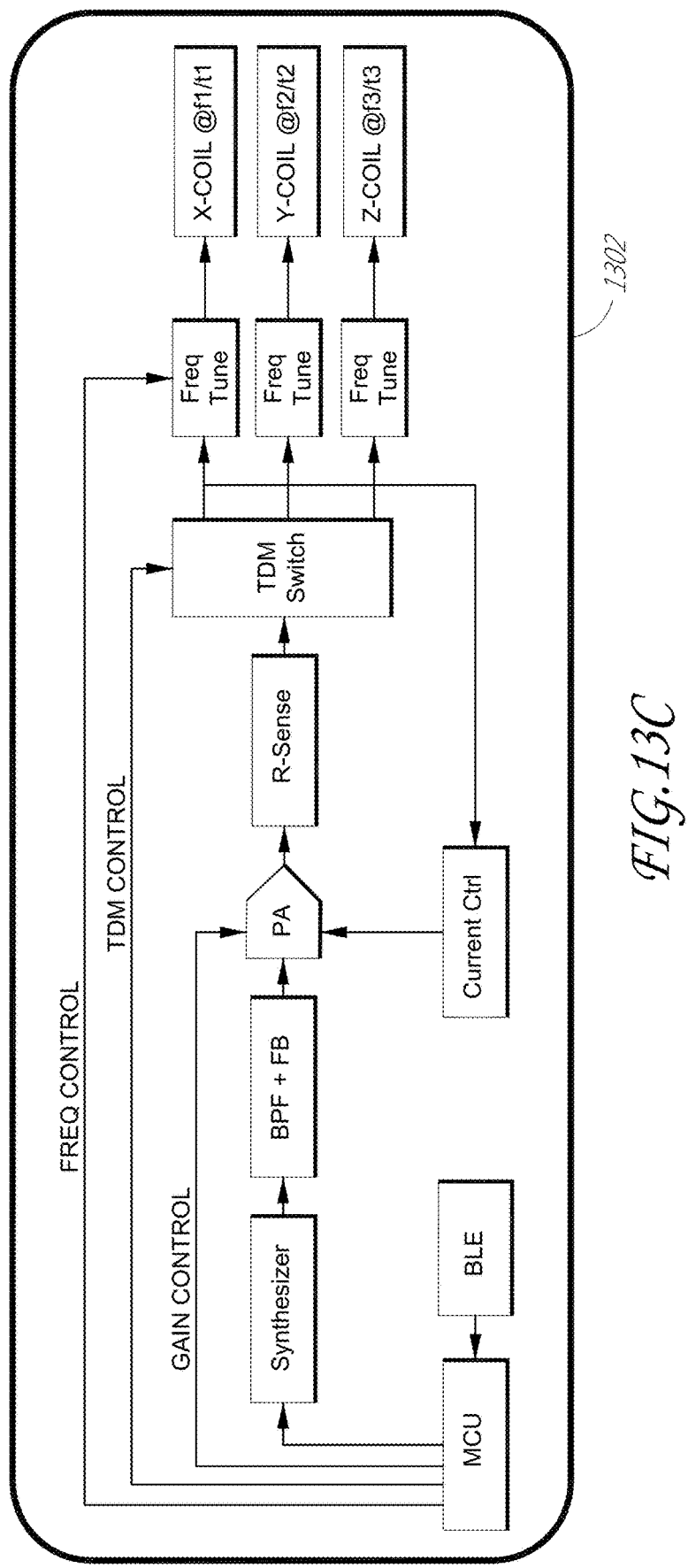
FIG. 13C is a block diagram that schematically illustrates an example of an EM transmitter circuit that is time division multiplexed (TDM).

FIG. 13C is a block diagram that schematically illustrates an example of an EM transmitter circuit 1302 that is time division multiplexed. In this embodiment, the FDM circuit of FIG. 13A has been changed to a time division multiplexed circuit. The TDM circuit uses only one path that is divided into the 3 orthogonal coils. The X, Y, and Z-coils operate, respectively, at frequencies f1, f2, and f3 to generate the time-varying EM fields that are received by an EM receiver circuit. The TDM circuitry can operate these coils at respective times t1, t2, and t3 according to a TDM timing protocol (see, e.g., FIGS. 13F and 13G). Automatic Gain Control (AGC) can be included in the transmitter circuit (further described below with reference to FIGS. 13I and 13J). Each coil can be dynamically frequency tuned to a desired frequency assigned by the MCU.

Dynamic Frequency Tuning

Figure 13D:
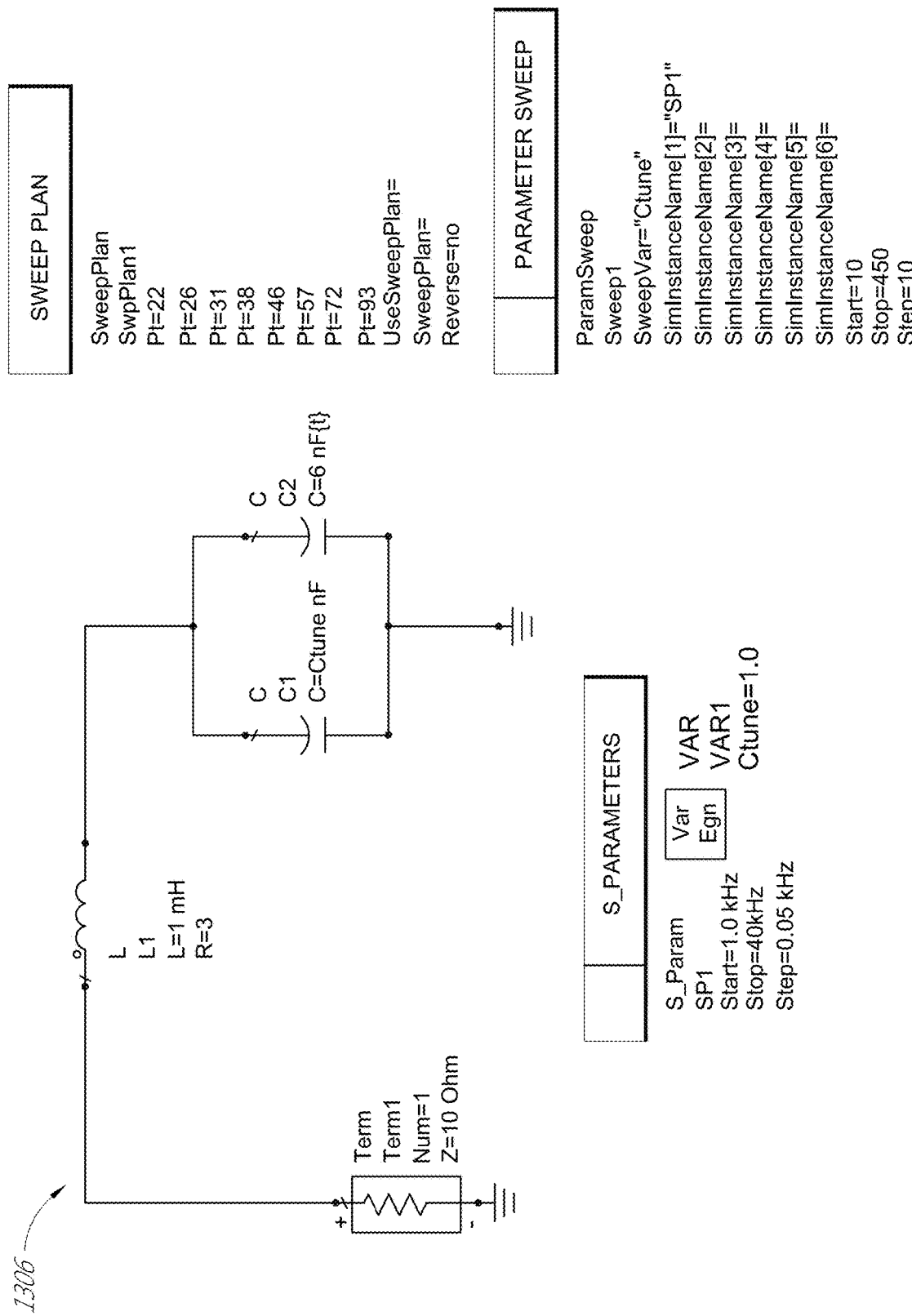
FIG. 13D is a block diagram that schematically illustrates an example of a dynamically tunable circuit for an EM transmitter.
Figure 13E:
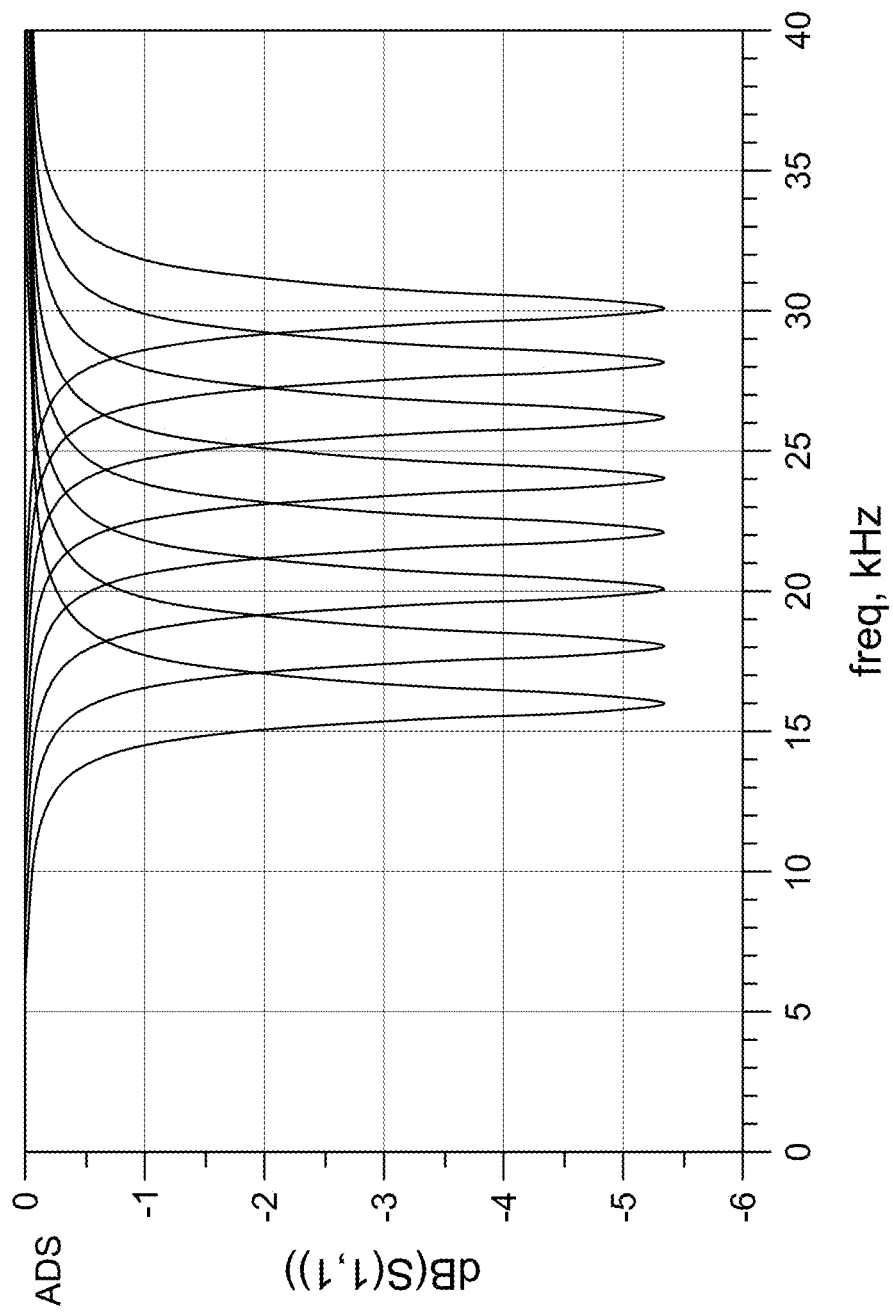
FIG. 13E is a graph showing examples of resonances that can be achieved by dynamically tuning the circuit shown in FIG. 13D.

Dynamic frequency tuning can be used to achieve resonance on each coil to obtain increased or maximum current flow in an EM TX circuit. Dynamic frequency tuning can be used to accommodate multiple users. FIG. 13D is a block diagram that schematically illustrates an example of a dynamically tunable circuit 1306. Other embodiments of dynamically tunable circuits 1306 are described with reference to FIGS. 17D-17G. In the circuit shown in FIG. 13D, a transmit coil is represented by an inductor L1. A static capacitor (C2) is in parallel with a tunable capacitor (C1). In this example, the frequency generated by the coil by tuning the capacitor C1 covers a frequency range from 16 kHz to 30 kHz. FIG. 13E is a graph showing examples of the resonances at various frequencies (from 16 kHz to 30 kHz) that can be achieved by dynamically tuning the circuit 1306 shown in FIG. 13D. In order to accommodate multiple users, the example dynamic frequency tuning circuit can employ one transmit (TX) frequency per user. Examples of the frequency assignments are shown in Table 1.

TABLE 1

Example Frequency Assignments

| | |
|---|---|
| Start Frequency | 16 kHz |
| Stop Frequency | 30 kHz |
| # of Users | 4 |
| # of Frequencies per coil | 1 |
| # of TX Frequencies per user | 2 |
| Frequency Range | 14 kHz |
| Channel Spacing | 2 kHz |
| Total Frequencies Required | 8 |

Time Division Multiplexing

In some embodiments, to achieve time division multiplexing on the transmitter, synchronization between the transmitter and receiver circuits may be utilized. Two possible scenarios for synchronization are discussed below.

A first scenario uses synchronization through the RF wireless interface (e.g., BLE) of both the receiver and the transmitter. The wireless RF link can be used to synchronize the clocks of both the transmitter and the receiver. After synchronization is achieved, time division multiplexing can be referenced to the on-board real-time clock (RTC).

A second scenario uses synchronization through an electromagnetic pulse. The time of flight of the EM pulse will be significantly shorter than tolerances typically used in the TDM circuit and may be ignored. A TX EM pulse is sent by the transmitter to the receiver, which calculates the time difference between the receiver clock and the transmitter clock. This time difference is communicated over the RF wireless link as a known offset or is used to adjust the reference on the wireless interface (e.g., BLE) clock.

Figure 13F:
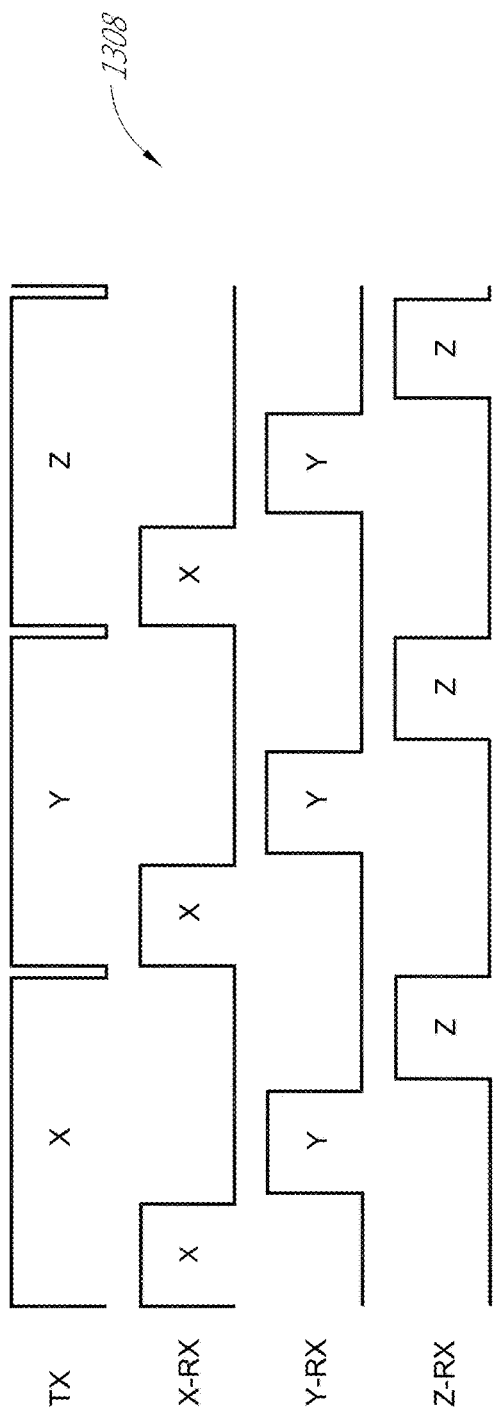
FIG. 13F illustrates an example of a timing diagram for a time division multiplexed EM transmitter and receiver.

In some embodiments, one or both of these synchronization scenarios can be implemented. After synchronization is completed, a time sequence for TDM for the transmitter and receiver can be established. FIG. 13F illustrates an example of a TDM timing diagram 1308. The TX on the X-coil will stay on for a first time period that allows the X, Y, and Z coils of the receiver to receive the magnetic flux generated by the X-coil. During the first time period, the TXs on the Y-coil and the Z-coil are substantially off (e.g., the coils are fully off or operating at a voltage much less (e.g., <10%, <5%, <1%, etc.) than their normal operating voltage). Following the X-coil transmission, the TX on the Y-coil will turn on (and the X-coil will turn substantially off, while the Z-coil remains substantially off), and the X, Y, and Z coils of the receiver will receive the magnetic flux generated by the TX Y-coil. Following the Y-coil transmission, the TX on the Z-coil will turn on (and the Y-coil will turn substantially off, while the X-coil remains substantially off), and the X, Y, and Z coils of the receiver will receive the magnetic flux generated by the TX Z-coil. This timing sequence is then repeated continuously while the EM transmitter is operating.

Figure 13G:
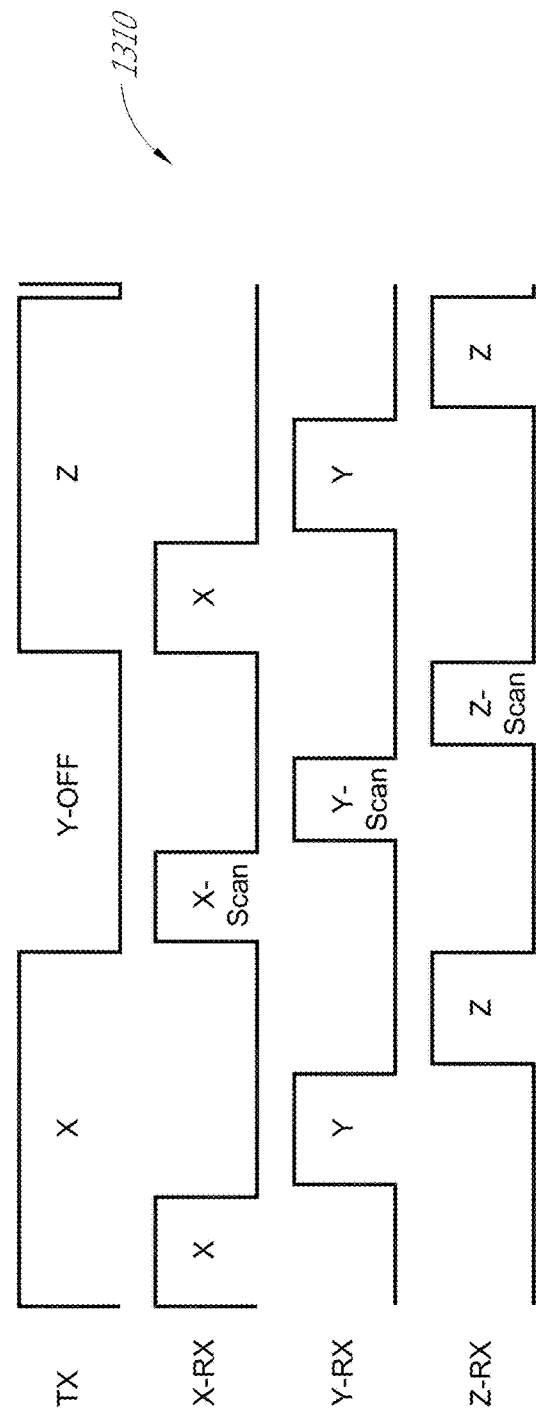
FIG. 13G illustrates an example of scan timing for a time division multiplexed EM transmitter and receiver.

The following describes a non-limiting, illustrative example of accommodating multiple users. For example, to accommodate up to four users with two transmitters each requires eight TX frequencies. It is generally advantageous if these frequencies are not duplicated. In such embodiments, a scan process can be implemented by the EM receiver to determine if a particular frequency is being used in close proximity. FIG. 13G illustrates an example of scan timing 1310. This scan can be done by the EM receiver 1304 at initialization as well as periodically during the user's session. The scan can be performed by intentionally turning off the TX in the transmitter 1302 and cycling through the RX (in the receiver 1304) to measure the existence of unintentional interference. If it is determined that there is energy at that frequency, then an alternate frequency can be selected. This scan can also be shortened by monitoring one or two (rather than all three) of the three orthogonal coils, because Position and Orientation (PnO) is not required in that slot.

Figure 13H:
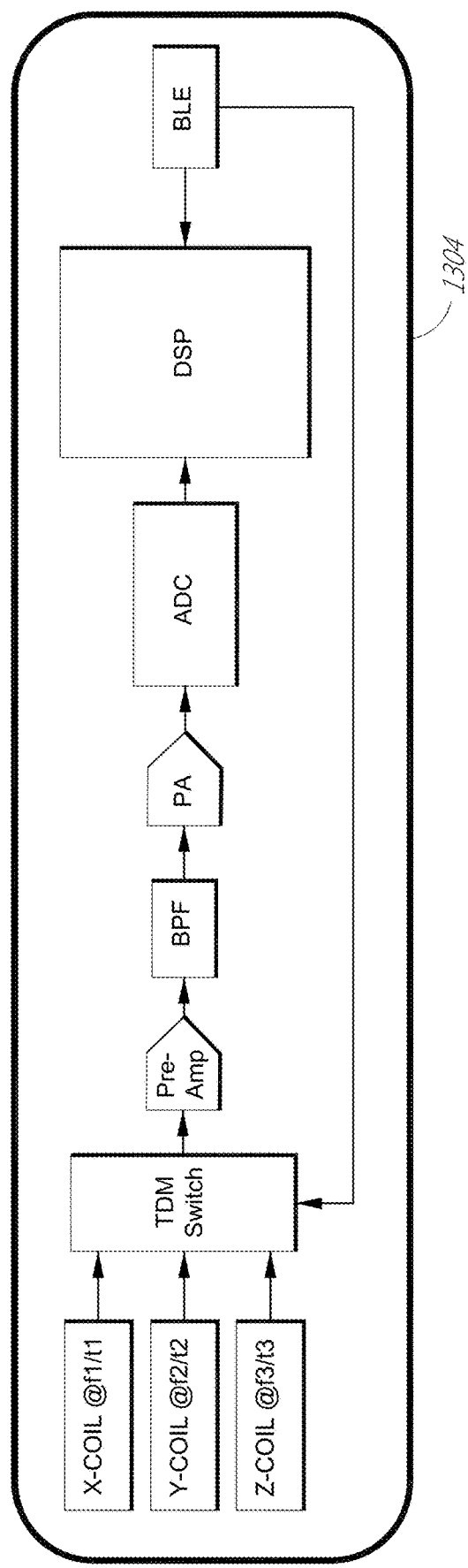
FIG. 13H is a block diagram that schematically illustrates an example of a TDM receiver in EM tracking system.

FIG. 13H is a block diagram that schematically illustrates another example of a receiver 1304 in an EM tracking system. As compared to the example FDM receiver illustrated in FIG. 13B, a TDM switch has replaced the individual paths from the three orthogonal coils. The TDM switch can be controlled by an RF wireless interface (e.g., BLE). The TDM switch can utilize the timing protocol 1308 illustrated in FIG. 13F.

In various embodiments, the time division multiplexed TX and/or RX circuits described with reference to FIGS. 13C-13H may provide one or more of the following advantages. (A) Current Drain and Battery Life. By time multiplexing the transmitter and the receiver, the amount of current used may be lowered. This reduction comes from the fact that the high current circuits, such as the transmitter, are no longer being utilized 100% of the time. The current drain of the system can be reduced to slightly over ⅓ as compared to the FDM circuits shown in FIGS. 13A and 13B. (B) Bill of Materials Cost. The number of components used to achieve the same result has been reduced (compared to the FDM circuits in FIGS. 13A and 13B) in the TDM embodiments described above. Multiplexing the signals through the same path reduces the part count and in this case the cost of the components should also be reduced to slightly over ⅓ compared to the FDM counterparts. (C) PCB Area. Another benefit of the part reduction can be the savings gained in PCB area. The part count has reduced by almost ⅔ and so the required space on the PCB is reduced.

Other possible advantages may be reduced mass of the TX and RX circuits. For example, the FDM TX and RX circuits shown in FIGS. 13A and 13B utilize separate filter and amplifier paths for each of the three orthogonal coils. In contrast, the TDM TX and RX circuits illustrated in FIGS. 13C and 13H share a filter and amplifier path.

In addition to removing sensor housings, and multiplexing to save on hardware overhead, signal-to-noise ratios may be increased by having more than one set of electromagnetic sensors, each set being relatively small relative to a single larger coil set. Also, the low-side frequency limits, which generally are needed to have multiple sensing coils in close proximity, may be improved to facilitate bandwidth requirement improvements. There generally is a tradeoff with TD multiplexing, in that multiplexing generally spreads out the reception of RF signals in time, which results in generally noisier signals; thus larger coil diameters may be used for multiplexed systems. For example, where a multiplexed system may utilize a 9 mm-side dimension cubic coil sensor box, a nonmultiplexed system may only utilize a 7 mm-side dimension cubic coil box for similar performance; thus there may be tradeoffs in minimizing geometry and mass and selecting between embodiments of FDM and TDM circuits.

Example Automatic Gain Control for an Electromagnetic Tracking System

With reference to FIGS. 13A and 13B, the FDM receiver (FIG. 13B) implements a closed-loop gain control while the FDM transmitter (FIG. 13A) does not implement gain control and is left to transmit at its maximum output power, regardless of the received level. The gain of the receiver can be set by the DSP. For example, the received voltages on the receiver coils are fed directly into the first stage, which has gain control. Large voltages can be determined in the DSP, and the DSP can automatically adjust the gain of the first stage. Placing the gain control in the receiver may utilize more power in the transmitter, even when it is not needed. Accordingly, it may be advantageous to employ automatic gain control (AGC, sometimes also referred to as adaptive gain control) on the transmitter side (rather than the receiver side), which may save space in the receiver system (that would otherwise be used for AGC), thereby allowing for a much smaller and more portable receiver.

Figure 13I:
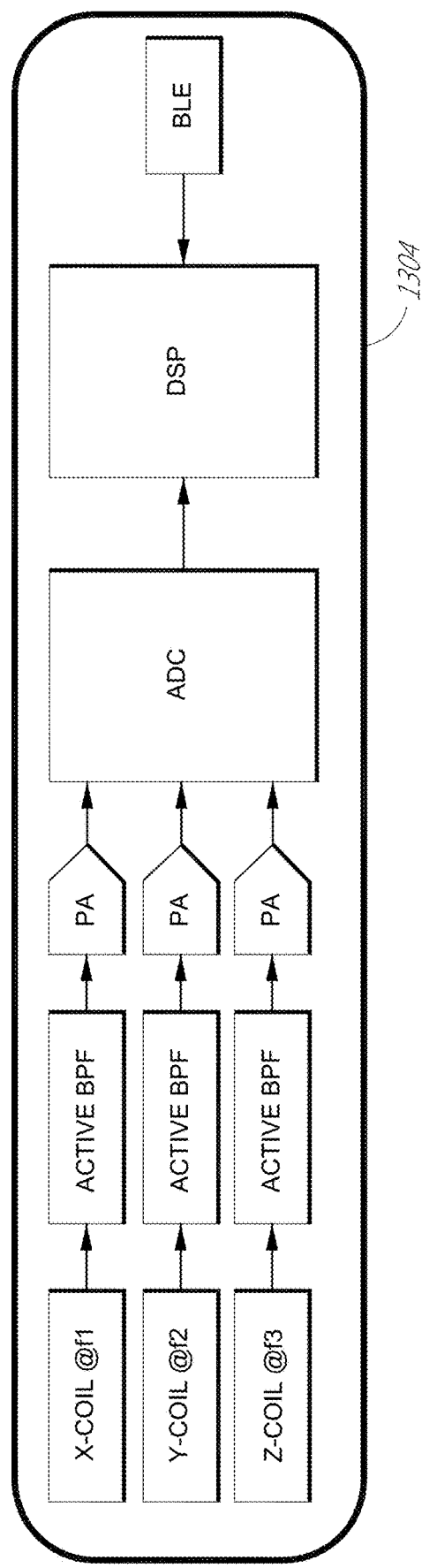
FIG. 13I is a block diagram that schematically illustrates an example of an EM receiver without automatic gain control (AGC).

FIG. 13I is a block diagram that schematically illustrates an example of an EM receiver 1304 that does not utilize automatic gain control (AGC). The first stage is no longer an AGC circuit (compare to FIG. 13B), and the receiver is designed to simply have a constant gain. The level of the received voltage on the coils is determined by the DSP, and the DSP provides that information to the wireless (e.g., BLE) link. This BLE link can provide that information to the transmitter (see FIG. 13J) to control the TX level.

Figure 13J:
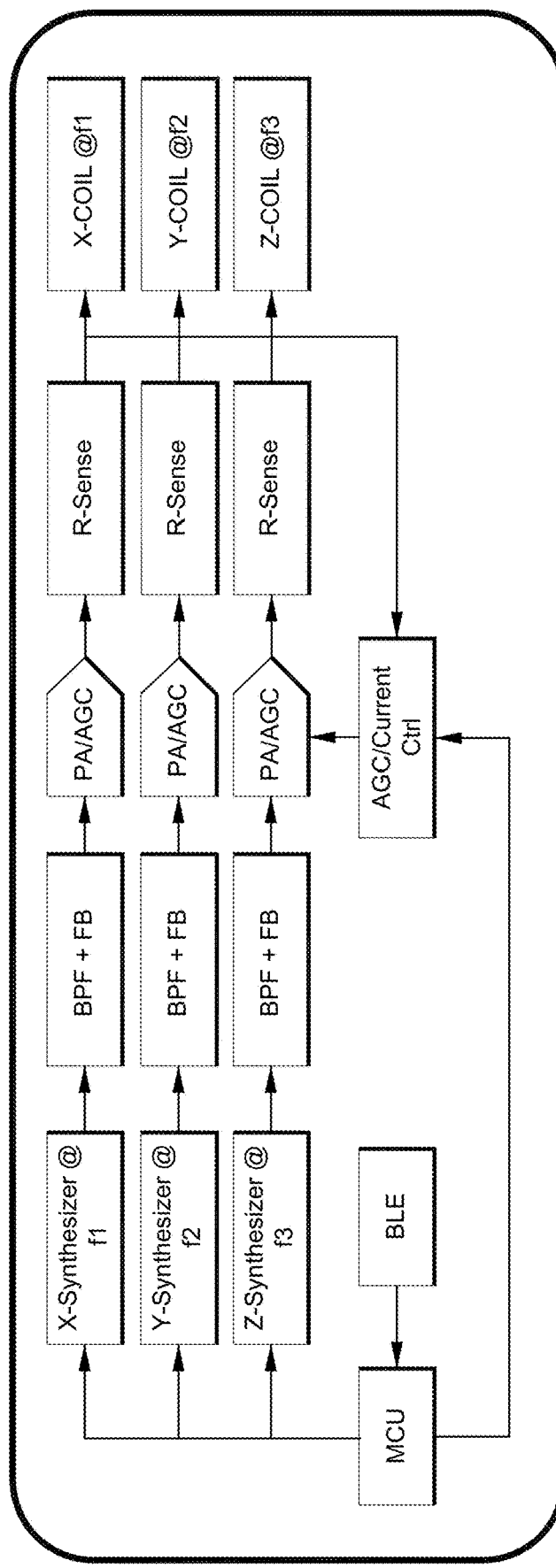
FIG. 13J is a block diagram that schematically illustrates an example of an EM transmitter that employs AGC.

FIG. 13J is a block diagram that schematically illustrates an example of an EM transmitter 1302 that employs AGC. The EM transmitter 1302 of FIG. 13J can communicate with the receiver 1304 of FIG. 13I. The wireless link (e.g., BLE) communicates the received voltage level (from the BLE link on the receiver) to the MCU. The amplification stage can have adjustable gain that is controlled by the MCU. This can allow for current savings on the transmitter when the received voltage required is small.

Accordingly, the RX and TX circuit examples in FIGS. 13I and 13J employ AGC in the EM transmitter 1302 instead of the EM receiver 1304. This change from the RX and TX circuit examples in FIGS. 13A and 13B can allow for a smaller RX design as well as a more power efficient design because the TX power will be allowed to be reduced when necessary.

Examples of EM Tracking of User Head Pose or Hand Pose

Figure 14:
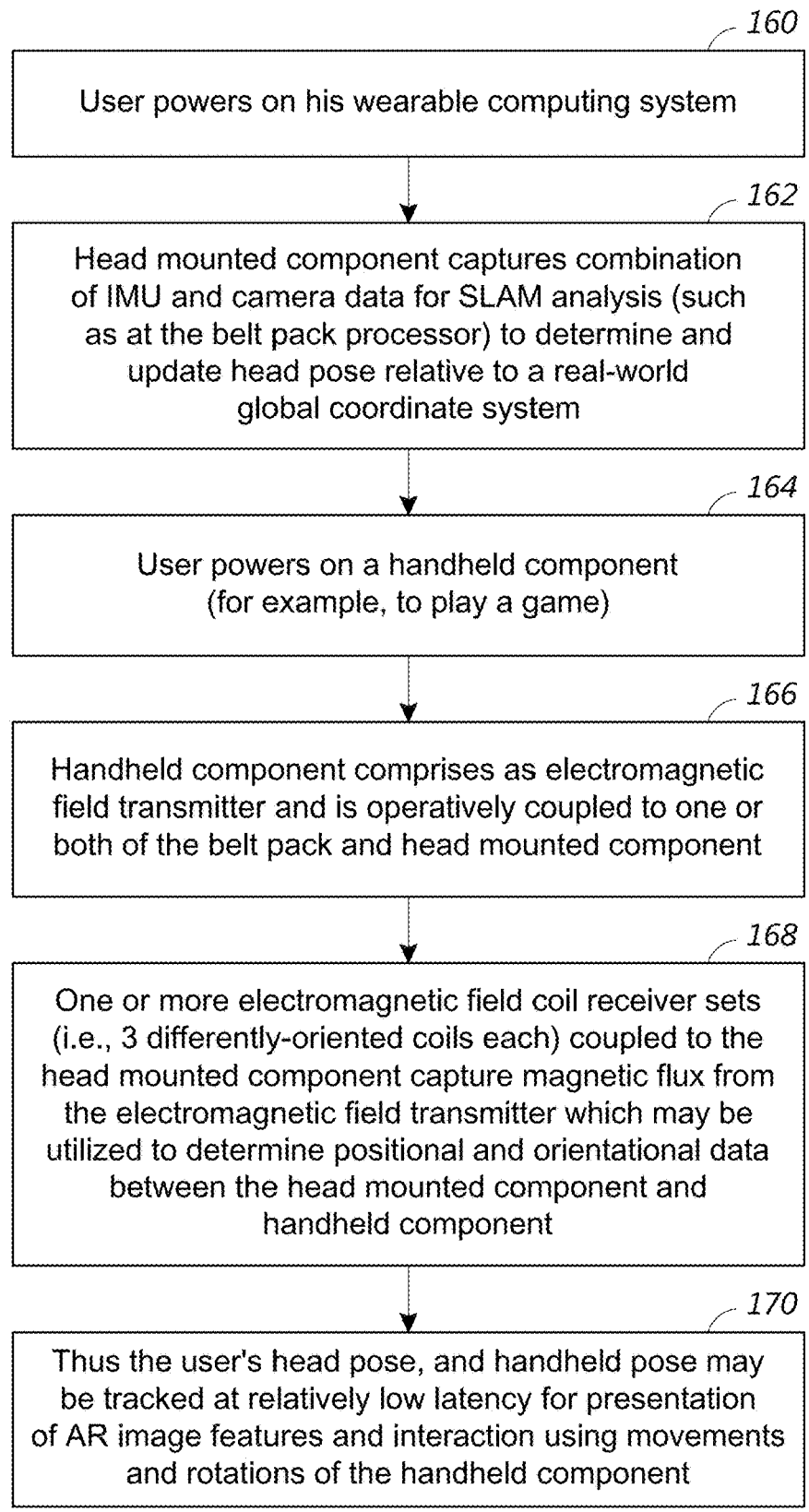
FIGS. 14 and 15 are flowcharts that illustrate examples of pose tracking with an electromagnetic tracking system in a head-mounted AR system.

Referring to FIG. 14, in one embodiment, after a user powers up his or her wearable computing system (160), a head mounted component assembly may capture a combination of IMU and camera data (the camera data being used, for example, for SLAM analysis, such as at the belt pack processor where there may be more raw processing horsepower present) to determine and update head pose (e.g., position or orientation) relative to a real world global coordinate system (162). The user may also activate a handheld component to, for example, play an augmented reality game (164), and the handheld component may comprise an electromagnetic transmitter operatively coupled to one or both of the belt pack and head mounted component (166). One or more electromagnetic field coil receiver sets (e.g., a set being 3 differently-oriented individual coils) coupled to the head mounted component to capture magnetic flux from the transmitter, which may be utilized to determine positional or orientational difference (or "delta"), between the head mounted component and handheld component (168). The combination of the head mounted component assisting in determining pose relative to the global coordinate system, and the hand held assisting in determining relative location and orientation of the handheld relative to the head mounted component, allows the system to generally determine where each component is relative to the global coordinate system, and thus the user's head pose, and handheld pose may be tracked, preferably at relatively low latency, for presentation of augmented reality image features and interaction using movements and rotations of the handheld component (170).

Figure 15:
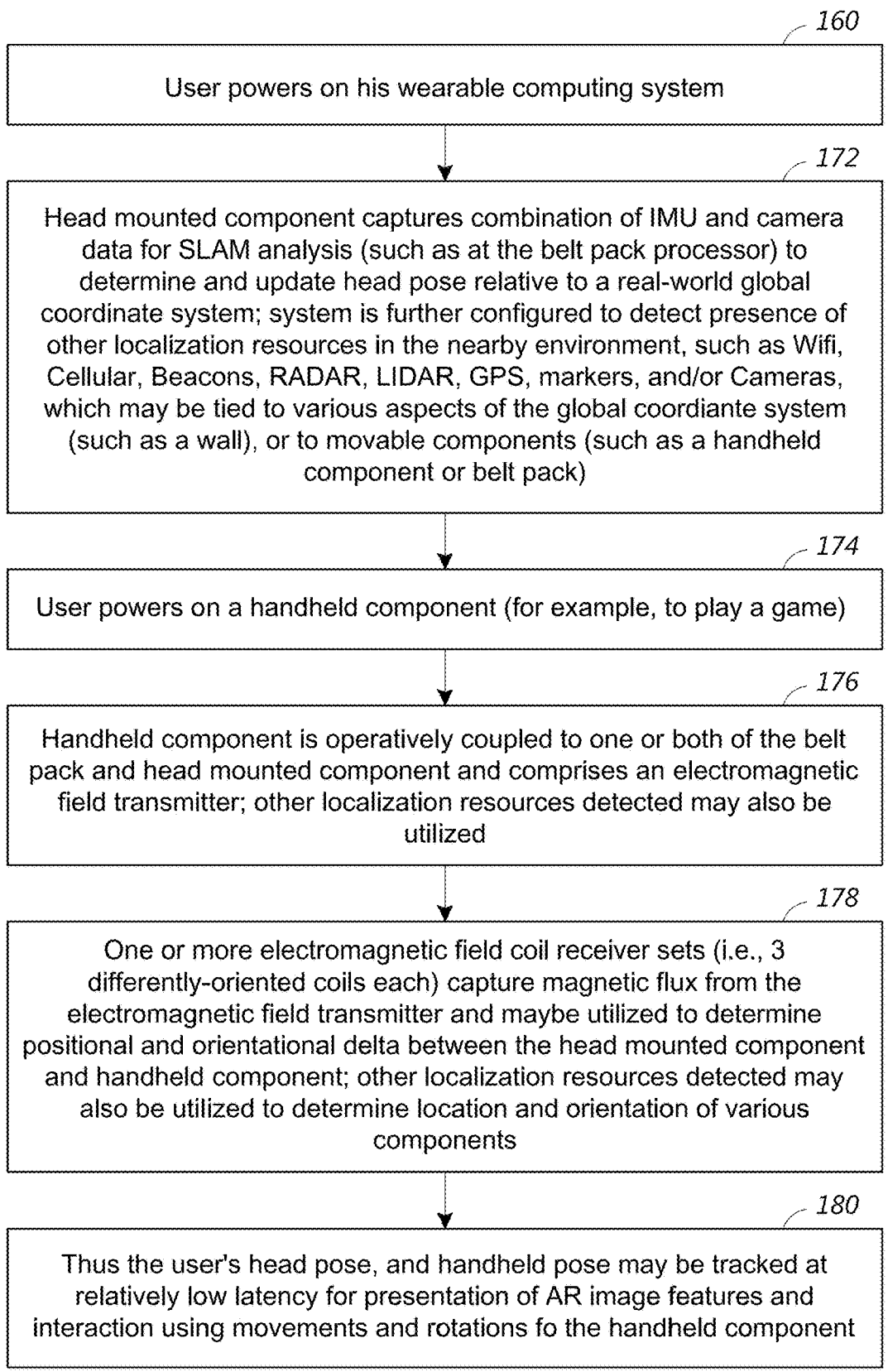

Referring to FIG. 15, an embodiment is illustrated that is somewhat similar to that of FIG. 14, with the exception that the system has many more sensing devices and configurations available to assist in determining pose of both the head mounted component (172) and a hand held component (176, 178), such that the user's head pose, and handheld pose may be tracked, preferably at relatively low latency, for presentation of augmented reality image features and interaction using movements and rotations of the handheld component (180).

Example Stereo and Time-of-Flight Depth Sensing

Figure 16A:
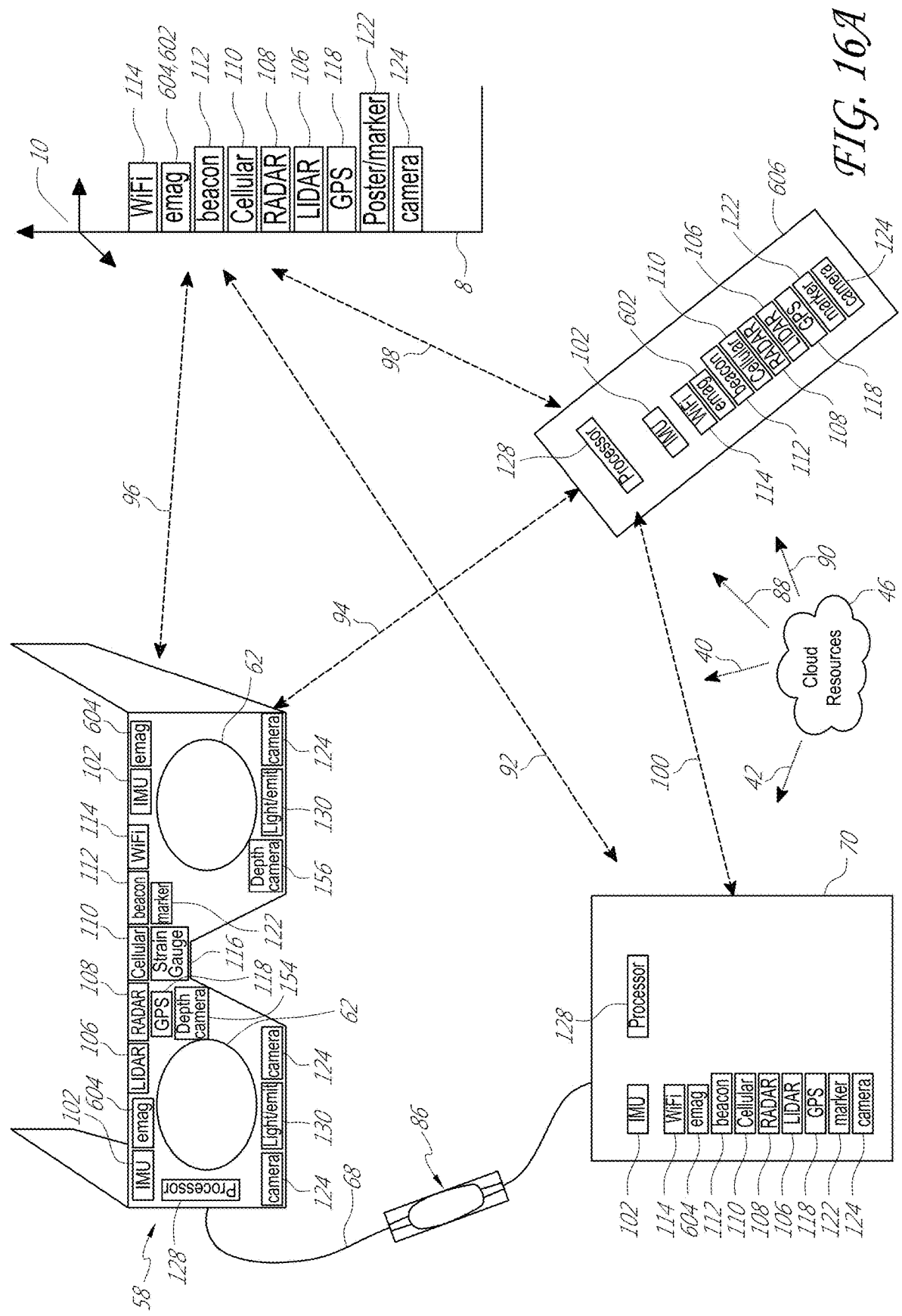

Referring to FIGS. 16A and 16B, various aspects of a configuration similar to that of FIG. 8 are shown. The configuration of FIG. 16A differs from that of FIG. 8 in that in addition to a LIDAR (106) type of depth sensor, the configuration of FIG. 16A features a generic depth camera or depth sensor (154) for illustrative purposes, which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor); further, the configuration of FIG. 16A has an additional forward facing "world" camera (124, which may be a grayscale camera, having a sensor capable of 720p range resolution) as well as a relatively high-resolution "picture camera" (156, which may be a full color camera, having a sensor capable of two megapixel or higher resolution, for example). FIG. 16B shows a partial orthogonal view of the configuration of FIG. 16A for illustrative purposes, as described further below in reference to FIG. 16B.

Referring back to FIG. 16A and the stereo vs. time-of-flight style depth sensors mentioned above, each of these depth sensor types may be employed with a wearable computing solution as disclosed herein, although each has various advantages and disadvantages. For example, many depth sensors have challenges with black surfaces and shiny or reflective surfaces. Passive stereo depth sensing is a relatively simplistic way of getting triangulation for calculating depth with a depth camera or sensor, but it may be challenged if a wide field of view ("FOV") is required, and may require relatively significant computing resource; further, such a sensor type may have challenges with edge detection, which may be important for the particular use case at hand. Passive stereo may have challenges with textureless walls, low light situations, and repeated patterns. Passive stereo depth sensors are available from manufacturers such as Intel and Aquifi. Stereo with texture projection (also known as "active stereo") is similar to passive stereo, but a texture projector broadcasts a projection pattern onto the environment, and the more texture that is broadcasted, the more accuracy is available in triangulating for depth calculation. Active stereo may also require relatively high compute resource, present challenges when wide FOV is required, and be somewhat suboptimal in detecting edges, but it does address some of the challenges of passive stereo in that it is effective with textureless walls, is good in low light, and generally does not have problems with repeating patterns. Active stereo depth sensors are available from manufacturers such as Intel and Aquifi.

Stereo with structured light, such as the systems developed by Primesense, Inc. and available under the tradename Kinect, as well as the systems available from Mantis Vision, Inc., generally utilize a single camera/projector pairing, and the projector is specialized in that it is configured to broadcast a pattern of dots that is known a priori. In essence, the system knows the pattern that is broadcasted, and it knows that the variable to be determined is depth. Such configurations may be relatively efficient on compute load, and may be challenged in wide FOV requirement scenarios as well as scenarios with ambient light and patterns broadcasted from other nearby devices, but can be quite effective and efficient in many scenarios. With modulated time of flight type depth sensors, such as those available from PMD Technologies, A.G. and SoftKinetic Inc., an emitter may be configured to send out a wave, such as a sine wave, of amplitude modulated light; a camera component, which may be positioned nearby or even overlapping in some configurations, receives a returning signal on each of the pixels of the camera component and depth mapping may be determined/calculated. Such configurations may be relatively compact in geometry, high in accuracy, and low in compute load, but may be challenged in terms of image resolution (such as at edges of objects), multi-path errors (such as wherein the sensor is aimed at a reflective or shiny corner and the detector ends up receiving more than one return path, such that there is some depth detection aliasing.

Direct time of flight sensors, which also may be referred to as the aforementioned LIDAR, are available from suppliers such as LuminAR and Advanced Scientific Concepts, Inc. With these time of flight configurations, generally a pulse of light (such as a picosecond, nanosecond, or femtosecond long pulse of light) is sent out to bathe the world oriented around it with this light ping; then each pixel on a camera sensor waits for that pulse to return, and knowing the speed of light, the distance at each pixel may be calculated. Such configurations may have many of the advantages of modulated time of flight sensor configurations (no baseline, relatively wide FOV, high accuracy, relatively low compute load, etc.) and also relatively high framerates, such as into the tens of thousands of Hertz. They may also be relatively expensive, have relatively low resolution, be sensitive to bright light, and susceptible to multi-path errors; they may also be relatively large and heavy.

Referring to FIG. 16B, a partial top view is shown for illustrative purposes featuring a user's eyes (12) as well as cameras (14, such as infrared cameras) with fields of view (28, 30) and light or radiation sources (16, such as infrared) directed toward the eyes (12) to facilitate eye tracking, observation, and/or image capture. The three outward-facing world-capturing cameras (124) are shown with their FOVs (18, 20, 22), as is the depth camera (154) and its FOV (24), and the picture camera (156) and its FOV (26). The depth information garnered from the depth camera (154) may be bolstered by using the overlapping FOVs and data from the other forward-facing cameras. For example, the system may end up with something like a sub-VGA image from the depth sensor (154), a 720p image from the world cameras (124), and occasionally a 2 megapixel color image from the picture camera (156). Such a configuration has four cameras sharing common FOV, two of them with heterogeneous visible spectrum images, one with color, and the third one with relatively low-resolution depth. The system may be configured to do a segmentation in the grayscale and color images, fuse those two and make a relatively high-resolution image from them, get some stereo correspondences, use the depth sensor to provide hypotheses about stereo depth, and use stereo correspondences to get a more refined depth map, which may be significantly better than what was available from the depth sensor only. Such processes may be run on local mobile processing hardware, or can run using cloud computing resources, perhaps along with the data from others in the area (such as two people sitting across a table from each other nearby), and end up with quite a refined mapping. In another embodiment, all of the above sensors may be combined into one integrated sensor to accomplish such functionality.

Example Dynamic Tuning of a Transmission Coil for EM Tracking

Figure 17A:
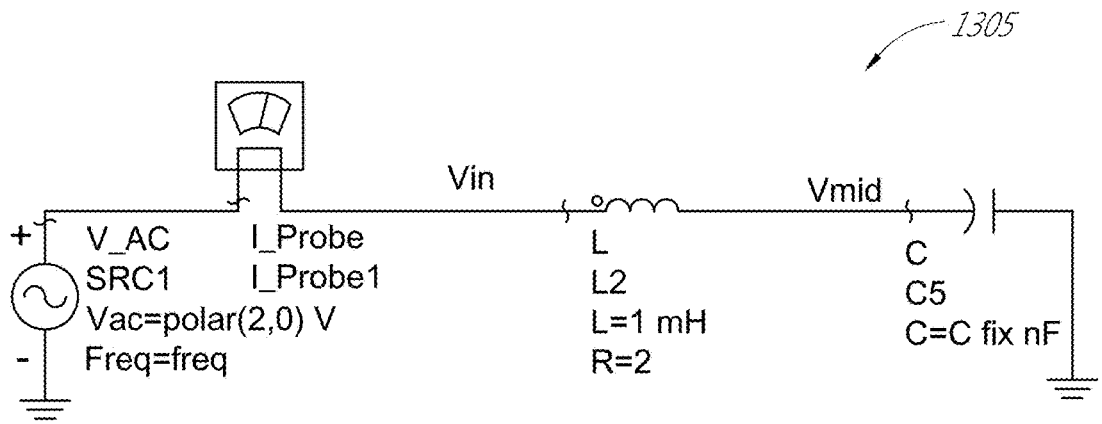
FIG. 17A schematically illustrates an example of a resonant circuit in a transmitter in an electromagnetic tracking system.
Figure 17B:
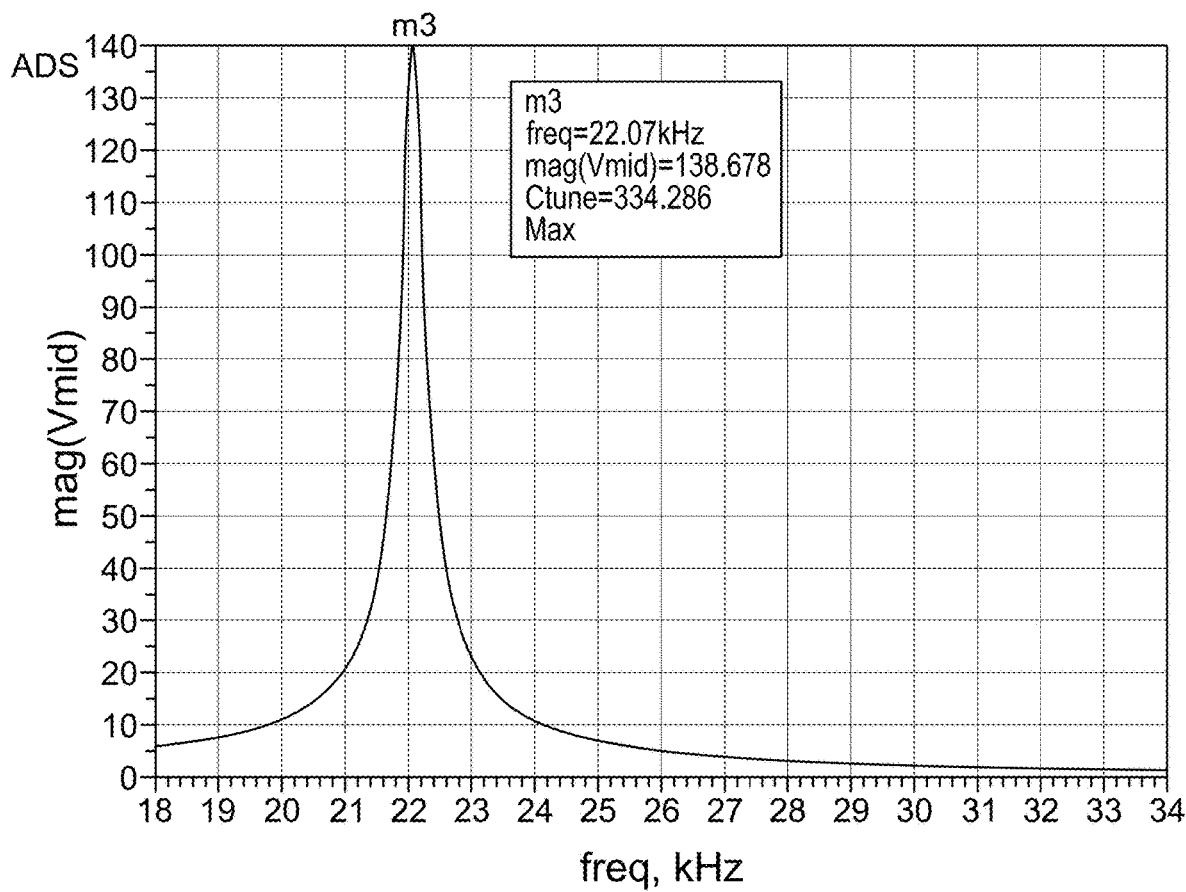
FIG. 17B is a graph that shows an example of a resonance at 22 kHz in the resonant circuit of FIG. 17A.
Figure 17C:
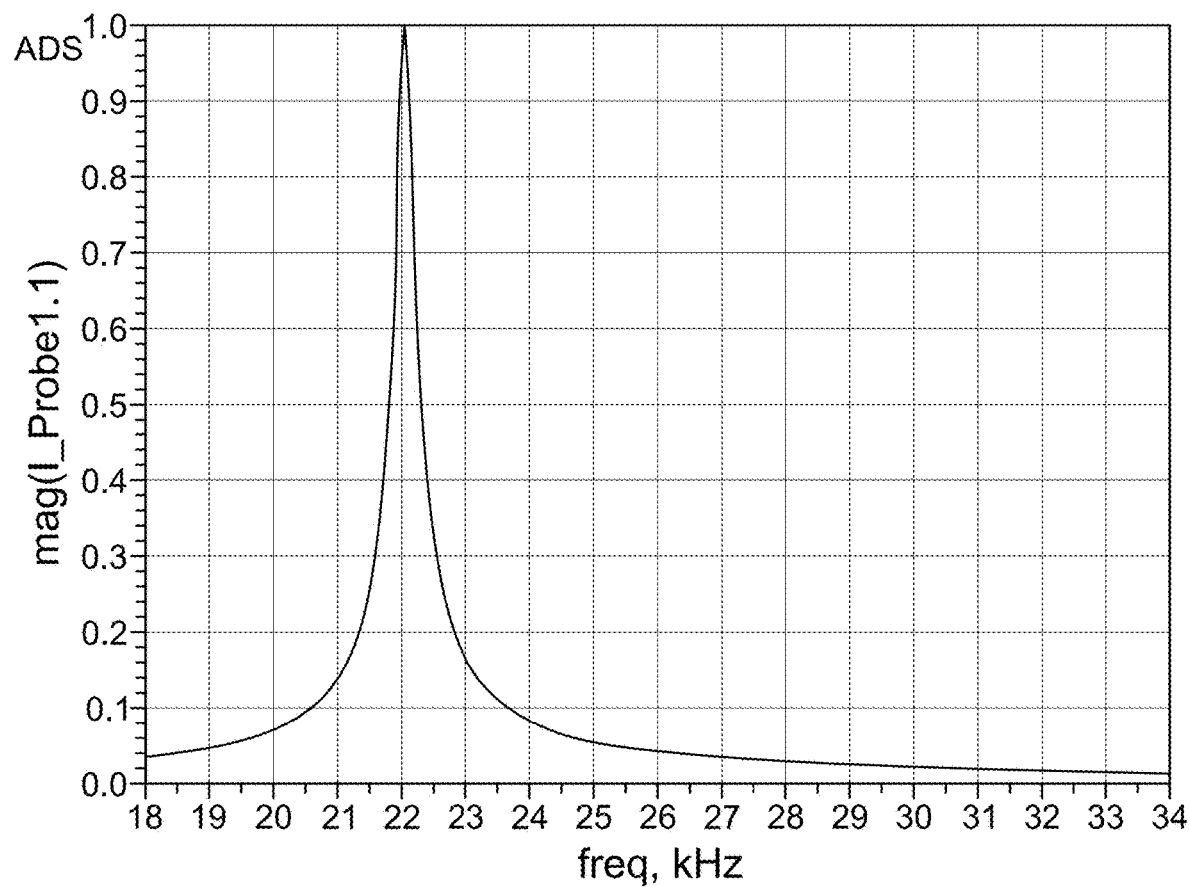
FIG. 17C is a graph that shows an example of current flowing through a resonant circuit.

Referring to FIGS. 17A-17G, aspects of a dynamic transmission coil tuning configuration are shown for electromagnetic tracking, to facilitate the transmission coil to operate optimally at multiple frequencies per orthogonal axis, which allows for multiple users to operate on the same system. Typically an electromagnetic tracking transmitter will be designed to operate at fixed frequencies per orthogonal axis. With such an approach, each transmission coil is tuned with a static series capacitance that creates resonance only at the frequency of operation. Such resonance allows for the maximum possible current flow through the coil which, in turn, maximizes the magnetic flux generated. FIG. 17A illustrates a typical resonant circuit 1305 used to create resonance at a fixed operation frequency. Inductor "L" represents a single axis transmission coil having an inductance of 1 mH, and with a capacitance set to 52 nF, resonance is created at 22 kHz, as shown in FIG. 17B. FIG. 17C shows the current through the circuit 1305 of FIG. 17A plotted versus frequency, and it may be seen that the current is maximum at the resonant frequency. If this system is expected to operate at any other frequency, the operating circuit will not be at the possible maximum current (which occurs at the resonant frequency of 22 kHz).

Figure 17D:
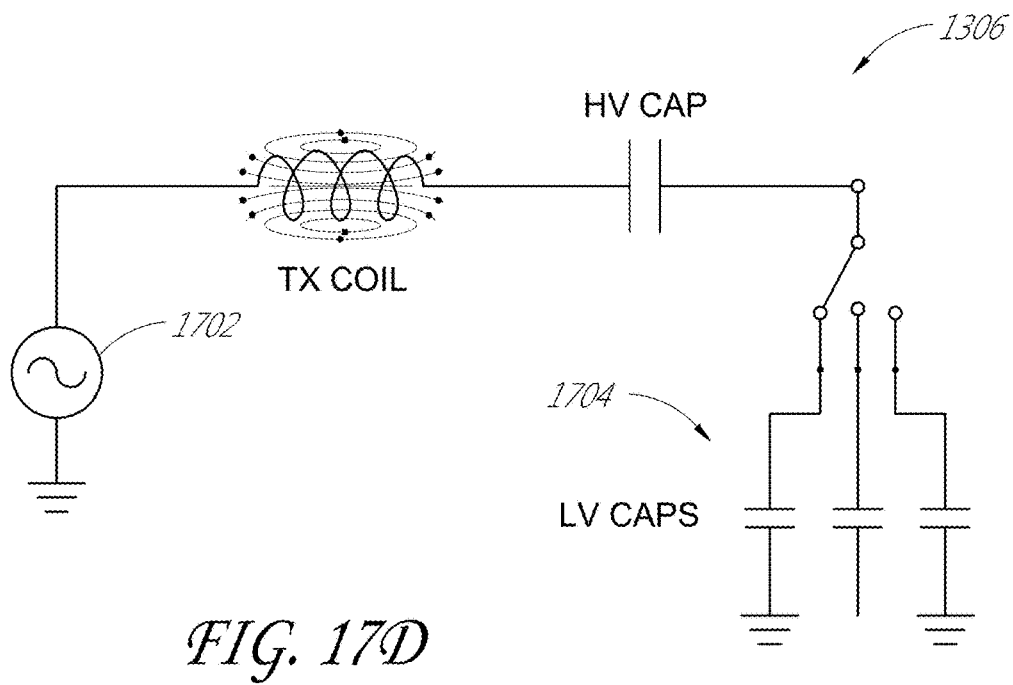
FIGS. 17D and 17E schematically illustrate examples of a dynamically tunable configuration for a resonant circuit in an EM field transmitter of an electromagnetic tracking system.
Figure 17E:
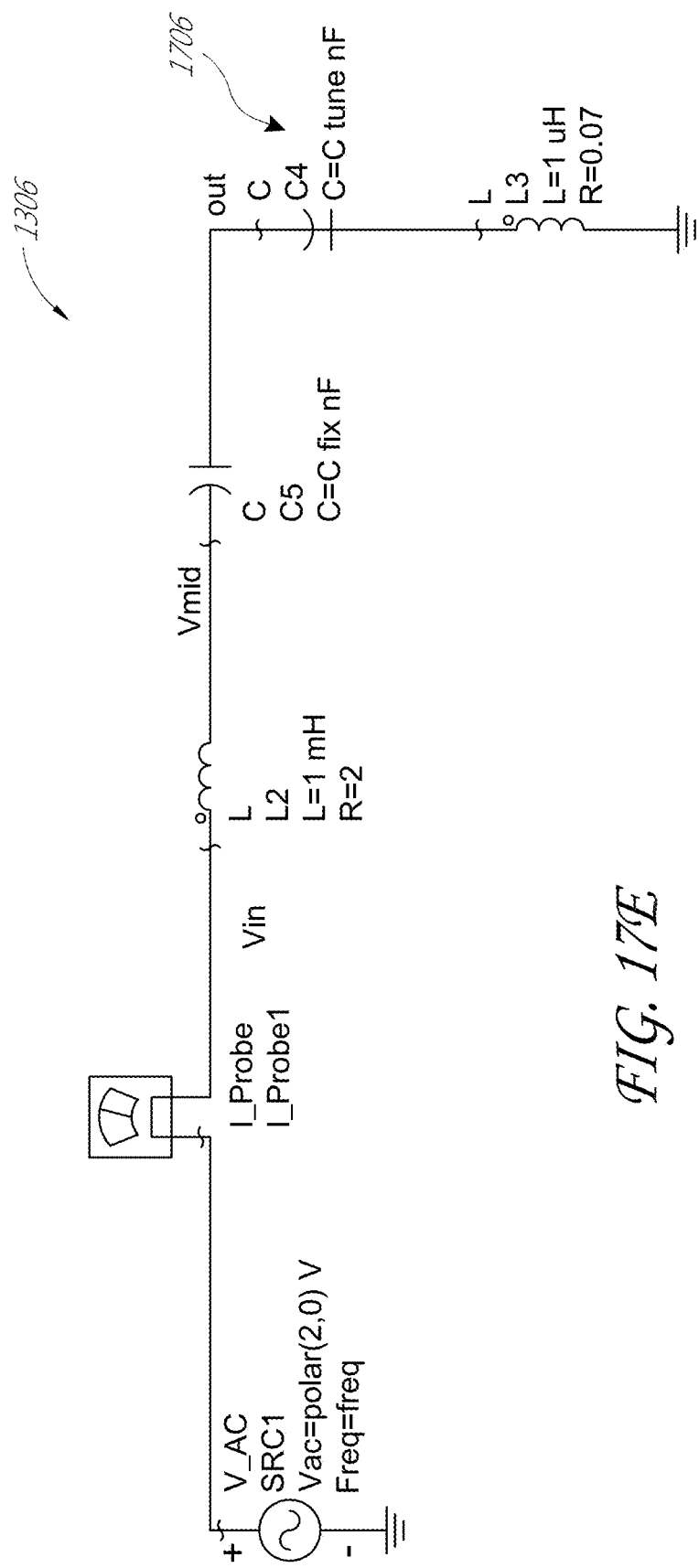

FIG. 17D illustrates an embodiment of a dynamically tunable configuration for the transmitter circuit 1306 of a transmitter 1302 of an electromagnetic tracking system. The example circuit 1306 shown in FIG. 17D may be used in embodiments of the EM field emitter 402, 602, 1302 described herein. The circuit in FIG. 17D includes an oscillating voltage source 1702, a transmit (TX) coil, a high voltage (HV) capacitor, and a plurality of low voltage (LV) capacitors in a capacitor bank 1704 that can be selected to provide the tuning for a desired resonance frequency. The dynamic frequency tuning may be set to achieve resonance on the coil (at desired, dynamically adjustable frequencies) to get maximum current flow. Another example of a dynamically tunable circuit 1306 is shown in FIG. 17E, where a tunable capacitor 1706 ("C4") may be tuned to produce resonance at different frequencies, as shown in the simulated data illustrated in FIG. 17F. Tuning the tunable capacitor can include switching among a plurality of different capacitors as schematically illustrated in the circuit shown in FIG. 17D. As shown in the embodiment of FIG. 17E, one of the orthogonal coils of an electromagnetic tracker is simulated as an inductor "L" and a static capacitor ("C5") is a fixed high voltage capacitor. This high voltage capacitor will see the higher voltages due to the resonance, and so its package size generally will be larger. Capacitor C4 will be the capacitor which is dynamically switched with different values, and can thus see a lower maximum voltage and generally be a smaller geometric package to save placement space. Inductor L3 can also be utilized to fine tune the resonant frequency.

Figure 17F:
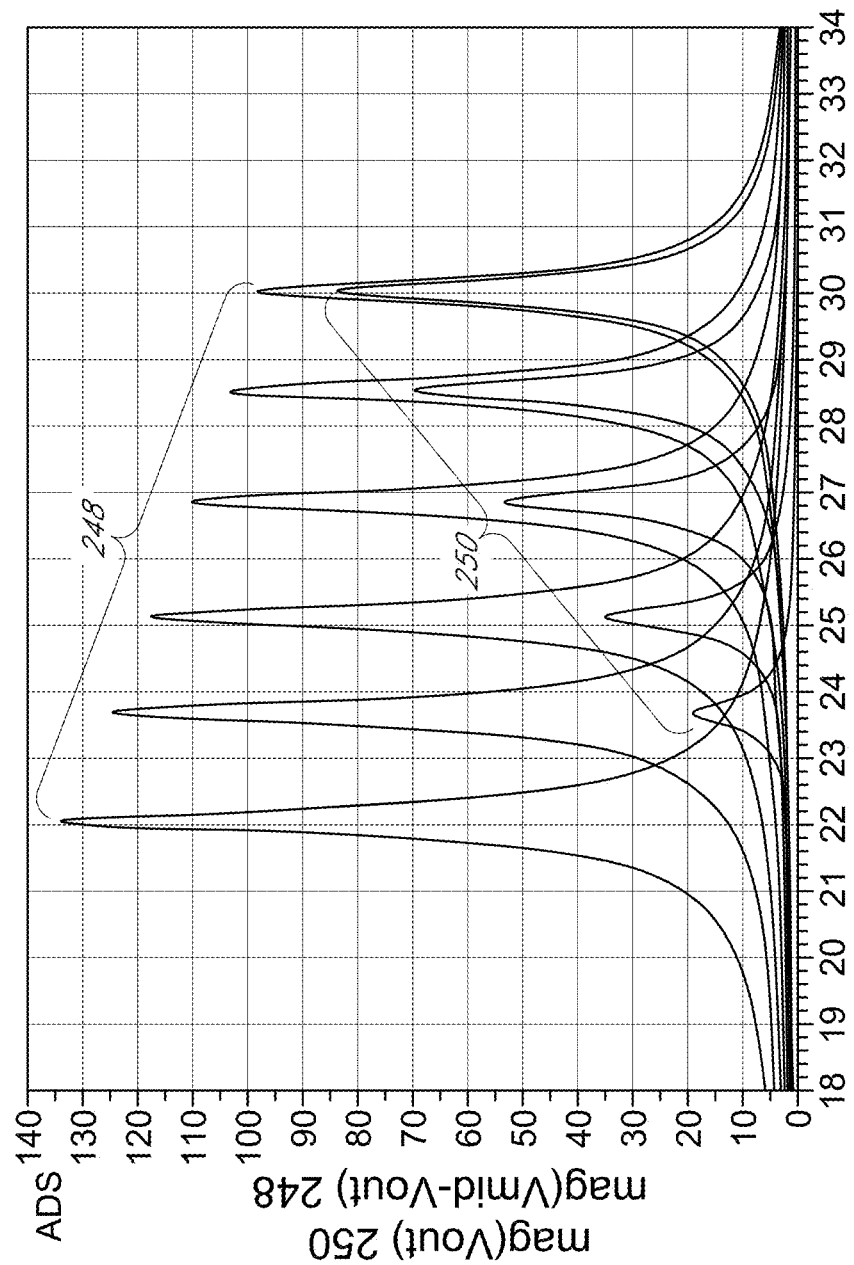
FIG. 17F is a graph that shows examples of dynamically tuned resonances by changing the value of the capacitance of capacitor C4 in the example circuit shown in FIG. 17E.
Figure 17G:
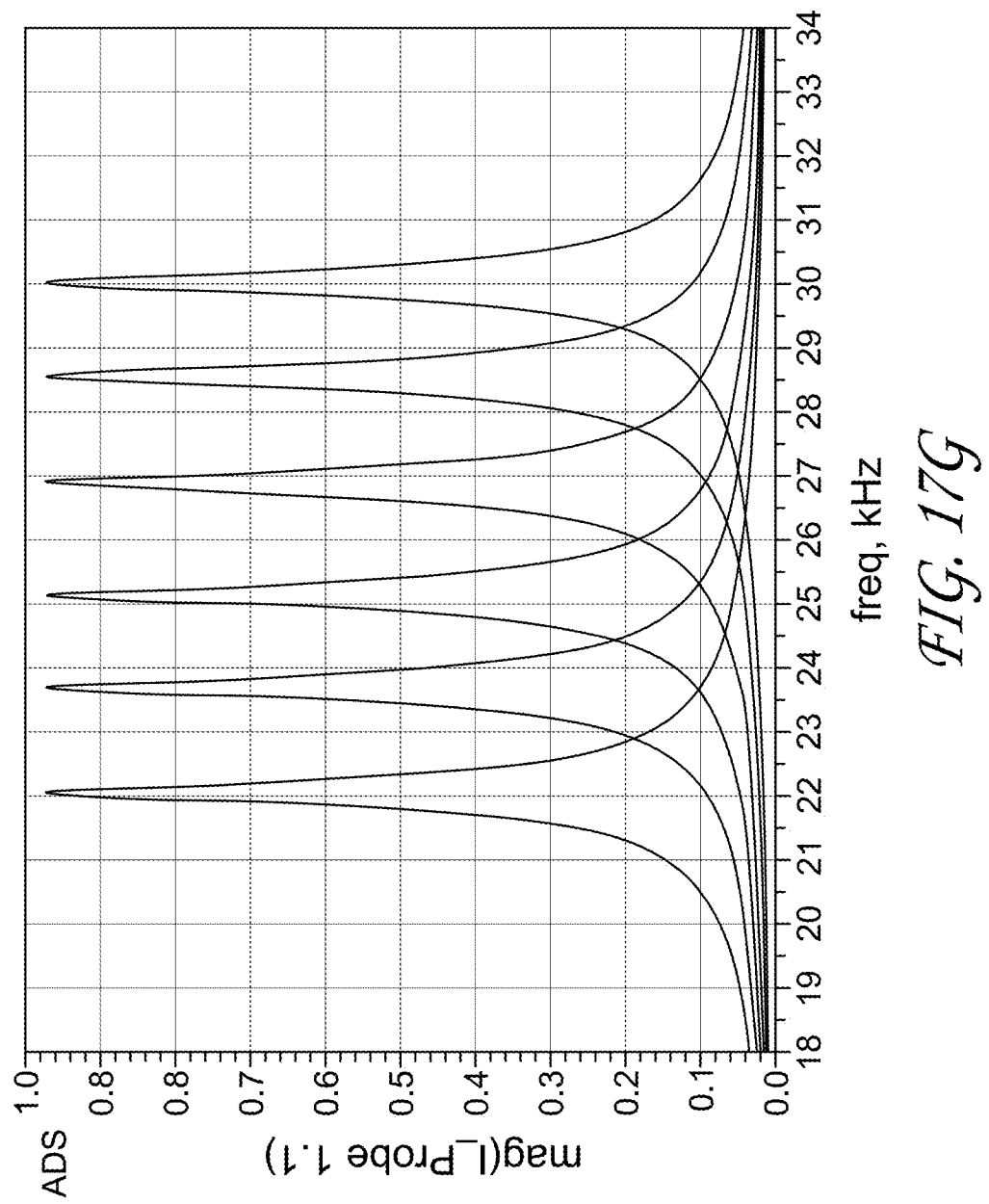
FIG. 17G is a graph that shows examples of the maximum current achieved at various resonant frequencies.

FIG. 17F illustrates examples of the resonances that may be achieved by the circuit 1306 of FIG. 17E. In FIG. 17F, the higher curves (248) show the voltage Vmid-Vout across the capacitor C5, and the lower curves (250) show the voltage Vout across the capacitor C4. As the capacitance of C4 is varied, the resonance frequency is changed (between about 22 kHz and 30 kHz in this example), and it is notable that the voltage across C5 (Vmid-Vout; curves 248) is higher than that across C4 (Vout; curves 250). This generally will allow for a smaller package part on C4 since multiples of this capacitor generally will be used in the system, e.g., one capacitor per resonant frequency of operation (see, e.g., the multiple LV capacitors in the capacitor bank 1704 shown in FIG. 17D). FIG. 17G is a plot of current versus frequency that illustrates that the maximum current achieved follows the resonance regardless of the voltage across the capacitors. Accordingly, embodiments of the dynamically tunable circuit can provide increased or maximum current in the transmitter coil across multiple frequencies allowing for improved or optimized performance for multiple users of a single EM tracking system.

Example Audio Noise Canceling for an EM Tracking System

Audio speakers (or any external magnet) can create a magnetic field that can unintentionally interfere with the magnetic field created by the EM field emitter of an EM tracking system. Such interference can degrade the accuracy or reliability of the location estimation provided by the EM tracking system.

As AR devices evolve, they become more complicated and integrate more technologies that have to coexist and perform independently. EM tracking systems rely on reception (by the EM sensor) of minute changes in a magnetic flux (generated by the EM field emitter) to determine a 3-D position of the EM sensor (and thereby the 3-D position of the object to which the sensor is attached or incorporated). Audio speakers that reside close to the EM tracking sensor coils can emit a magnetic flux that can interfere with the EM tracking system's ability to compute a true position.

Figure 18A:
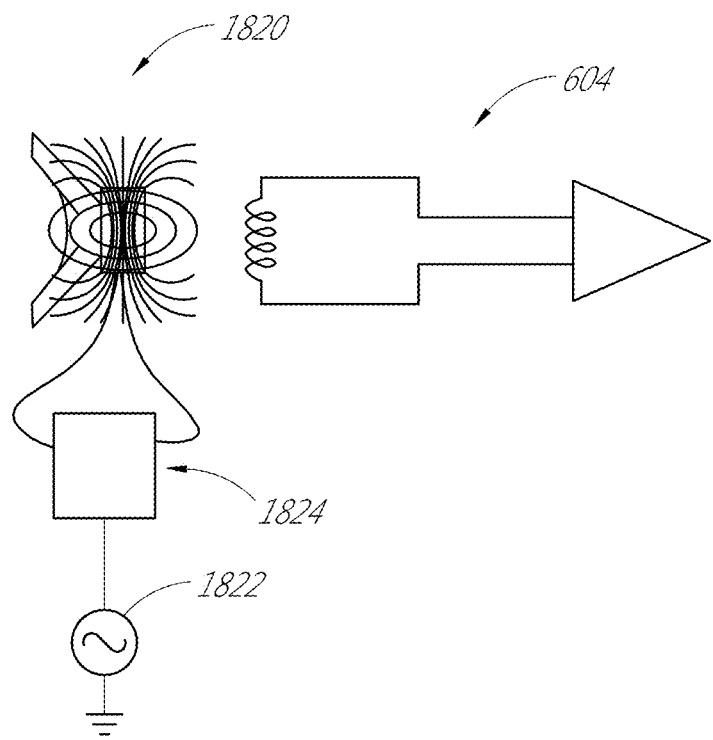
FIG. 18A is a block diagram that schematically shows an example of an electromagnetic field sensor adjacent an audio speaker.
Figure 18B:
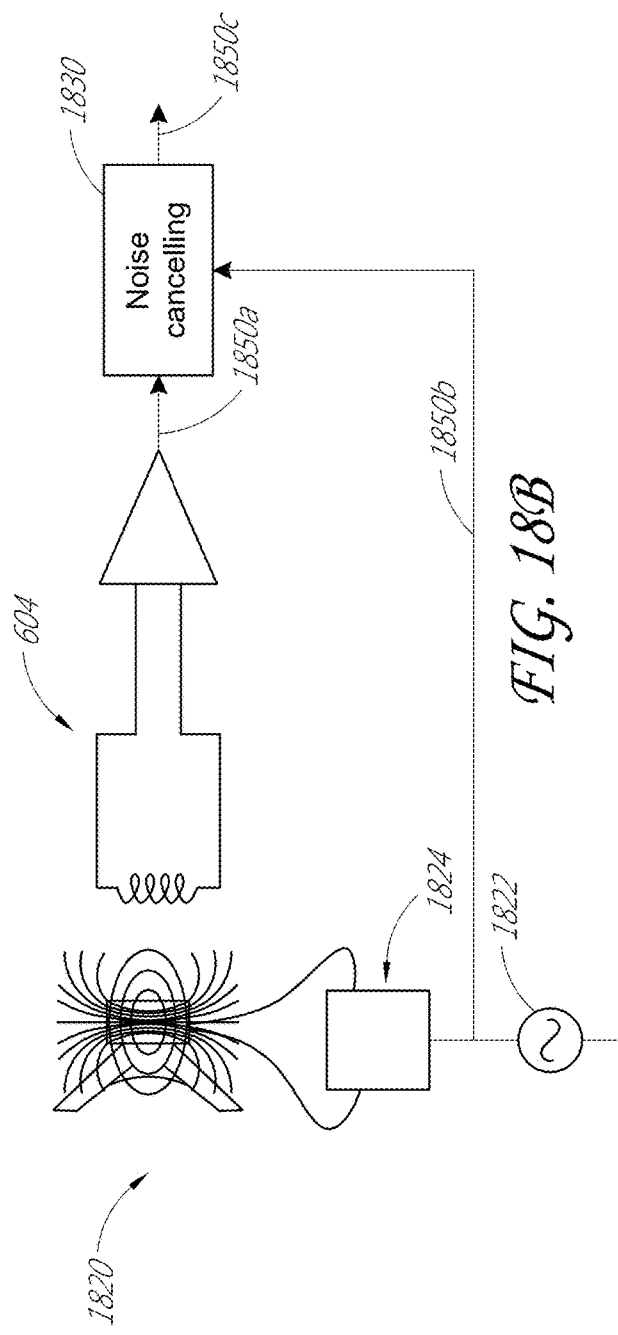
FIG. 18B is a block diagram that schematically shows an example of an electromagnetic field sensor with a noise canceling system that receives input from both the sensor and the external audio speaker.
Figure 18C:
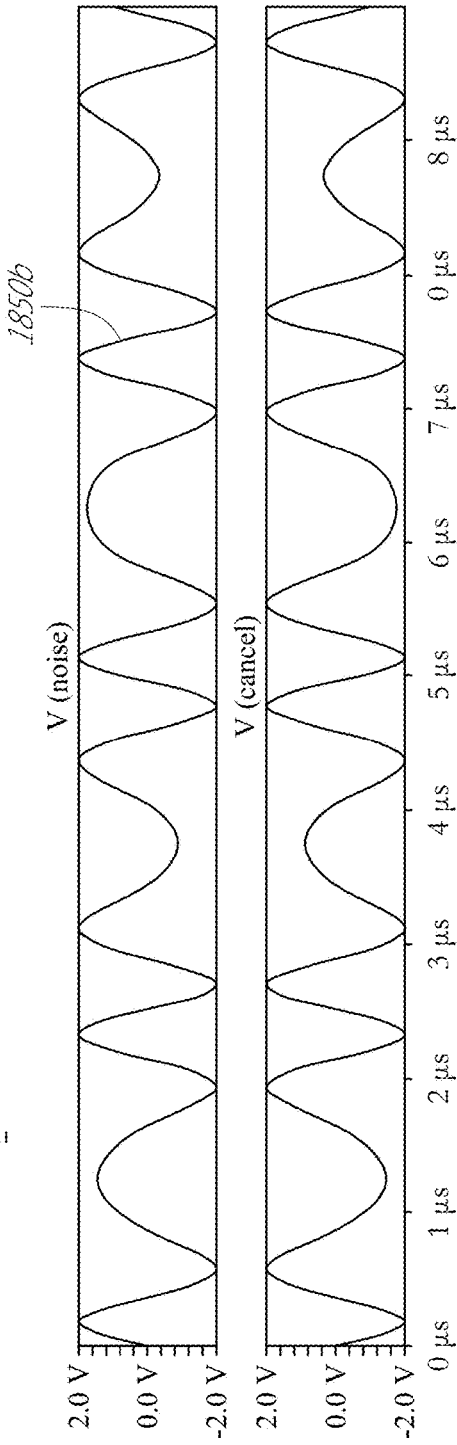
FIG. 18C is a graph that shows an example of how a signal can be inverted and added to cancel the magnetic interference caused by an audio speaker.

Referring to FIGS. 18A-18C, an electromagnetic tracking system may be bounded to work below about 30 kHz, which is slightly higher than the audible range for human hearing.

FIG. 18A shows a configuration where an audio speaker 1820 is in close proximity to an EM sensor 604. The audio speaker 1820 is driven by a time-varying voltage source 1822 and an amplifier 1824. The magnetic field of the speaker 1820 can cause unintentional magnetic interference to the EM tracking system, because the speaker generates noise in the magnetic field sensed by the coils of the EM sensor 604. In some implementations, the distance between the audio speaker 1820 and the EM sensor 604 can be increased to reduce the received interference. But because the magnetic flux from the speaker decays by the cube of the distance from the sensor ($1/r^3$), there will be a point where large distances provide very little decay in the interference. An audio speaker (e.g., speaker 66 shown in FIGS. 2A-2D) will commonly be used in AR devices to provide an audio experience to the wearer of the AR device; therefore, it may be common that an audio speaker is relatively near to an EM sensor also disposed on the AR device (see, e.g., the EM sensor 604 disposed near the speaker 66 in the example wearable display device 58 shown in FIG. 11A). The magnetic field from the audio speaker can interfere with the EM field sensed by the EM sensor of the EM tracking system.

Referring to FIG. 18A, there may be some audio systems which create noise in the usable frequencies for such electromagnetic tracking systems. Further, audio speakers typically have magnetic fields and one or more coils, which also may interfere with electromagnetic tracking systems. Referring to FIG. 18B, a block diagram is shown for an example of a noise cancelling system 1830 for an electromagnetic tracking system. Since the unintentional EM interference is a known entity (because the signal supplied by the voltage source 1822 to the audio speaker 1820 is known or can be measured), this knowledge can be used to cancel the EM interference from the audio speaker 1820 and improve performance of the EM tracking system. In other words, the audio signal generated by the system may be utilized to eliminate the magnetic interference from the speaker that is received by the coil of the EM sensor 604. As schematically shown in FIG. 18B, the noise cancelling circuit 1830 may be configured to accept the corrupted signals 1850*a* from the EM sensor 604 as well as the signal 1850*b* from the audio system. The noise cancelling system can combine the signals 1850*a*, 1850*b* to cancel out the interference received from the audio speaker 1820 and to provide an uncorrupted sensor signal 1850*c*.

FIG. 18C is a plot showing an illustrative, non-limiting example of how the audio signal 1850*b* can be inverted and added to the corrupted sensor signal 1850*a* cancel the interference and to provide the substantially uncorrupted sensor signal 1850*c*. The top plot, V(noise), is the noise signal 1850*b* added to the EM tracking system by the audio speaker 1820. The bottom plot, V(cancel), is the inverted audio signal (e.g., −V(noise)), when these are added together the effect is no noise degradation from the audio. In other words, the noise canceling system receives a corrupted signal 1850*a* that is the sum of the true EM sensor signal, V(sensor) representing the signal from the EM transmitter coils, and the noise signal: V(sensor)+V(noise). By adding the inverted audio signal, −V(noise), to the corrupted signal 1850*a*, the uncorrupted signal, V(sensor) 1850*c*, is recovered. The uncorrupted signal 1850*c* reflects the response of the sensor 604 as if the audio speaker 604 were not present and therefore reflects the EM transmitter fields at the position of the sensor 604. Equivalently, the noise signal 1850*b* can be subtracted from the corrupted signal 1850*a* to recover the uncorrupted signal, V(sensor) 1850*c*. The noise cancellation can result in canceling substantially all (e.g., >80%, >90%, >95%, or more) of the noise signal (e.g., from the audio speaker). This noise cancellation technique is not limited to cancellation of just audio speaker noise but can be applied to other sources of noise interference to the EM sensor signal if a measurement (or estimate) of the noise signal can be determined (so that it can then be removed from the EM sensor signal as described above).

Figure 18D:
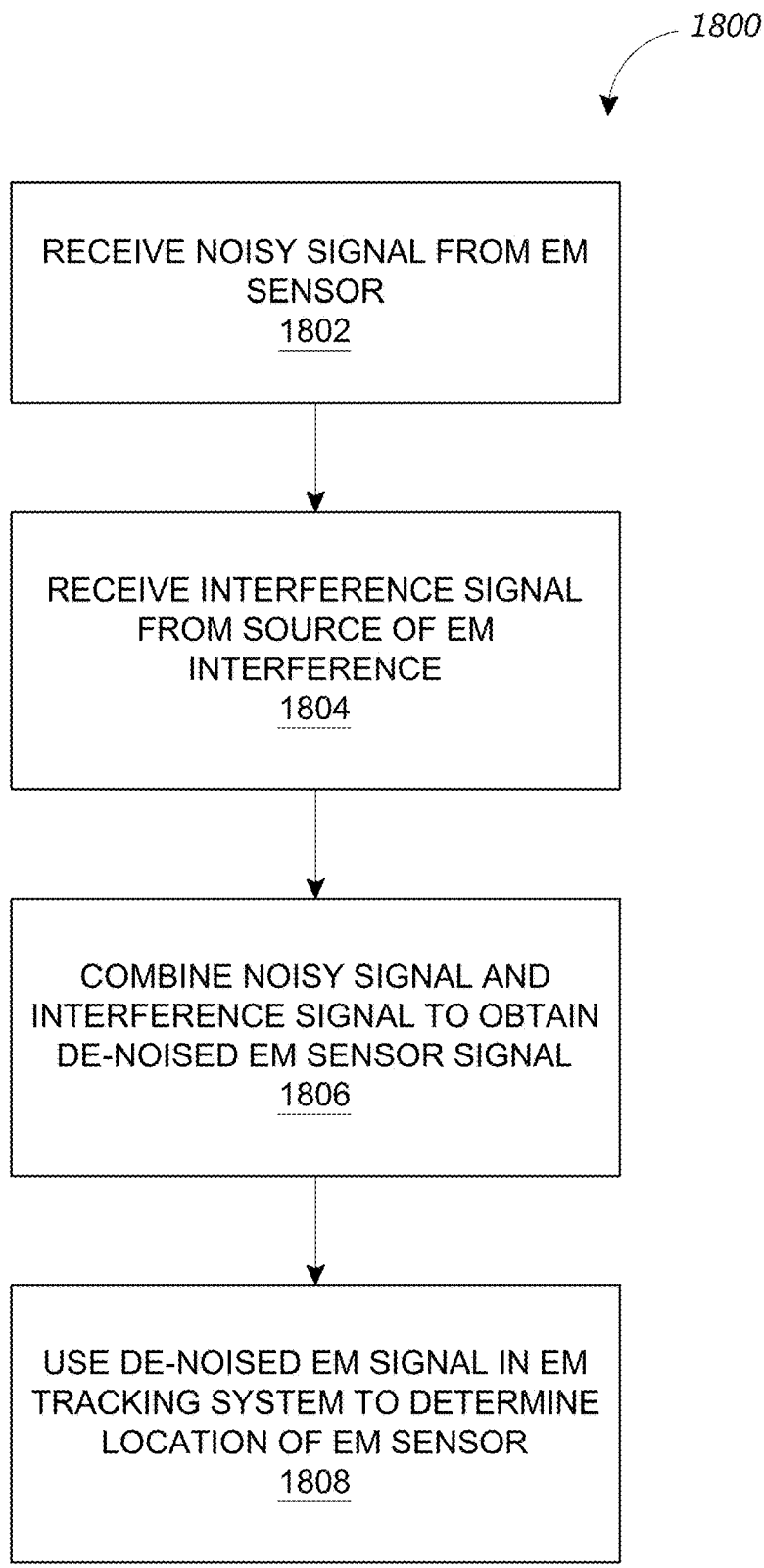
FIG. 18D is a flowchart that shows an example method for canceling interference received by an EM sensor in an EM tracking system.

FIG. 18D is a flowchart that shows an example method 1800 for canceling interference received by an EM sensor in an EM tracking system. The method 1800 can be performed by a hardware processor in the AR device such as, e.g., the local processing and data module 70, or by a hardware processor in the EM tracking system. At block 1802, the method receives a noisy signal from an electromagnetic sensor. As described above, the noisy signal can be caused by interference from a nearby audio speaker that generates electromagnetic interference. At block 1804, the method receives a signal from the source of the EM interference. For example, the signal can be the signal 1850*b* used to drive the audio speaker (see, e.g., FIG. 18B). At block 1806, the noisy signal and the interference signal are combined to obtain a de-noised EM signal. For example, the interference signal can be inverted and added to the noisy signal or the interference signal can be subtracted from the noisy signal. At block 1808, the de-noised signal can be used to determine the location of the EM sensor. The location obtained using the de-noised signal (as compared to using the noisy signal) is more accurate and reliable.

Accordingly, the foregoing provides a method to remove the unintentional noise created by an audio speaker in proximity to an EM tracker sensor. This method employs a noise cancelling method that uses the known information about the audio to remove it from the EM tracking signal. This system may be used when sufficient physical separation of the audio speaker and the EM sensor coil cannot be achieved (so that the interference is sufficiently low). Although in the foregoing, the interference noise has been described as generated by an audio speaker, this is for illustration and is not a limitation. Embodiments of the foregoing can be applied to any interference signal that can be measured, and then subtracted from the corrupted sensor signal.

Example Calibration of Vision Systems

Figure 19:
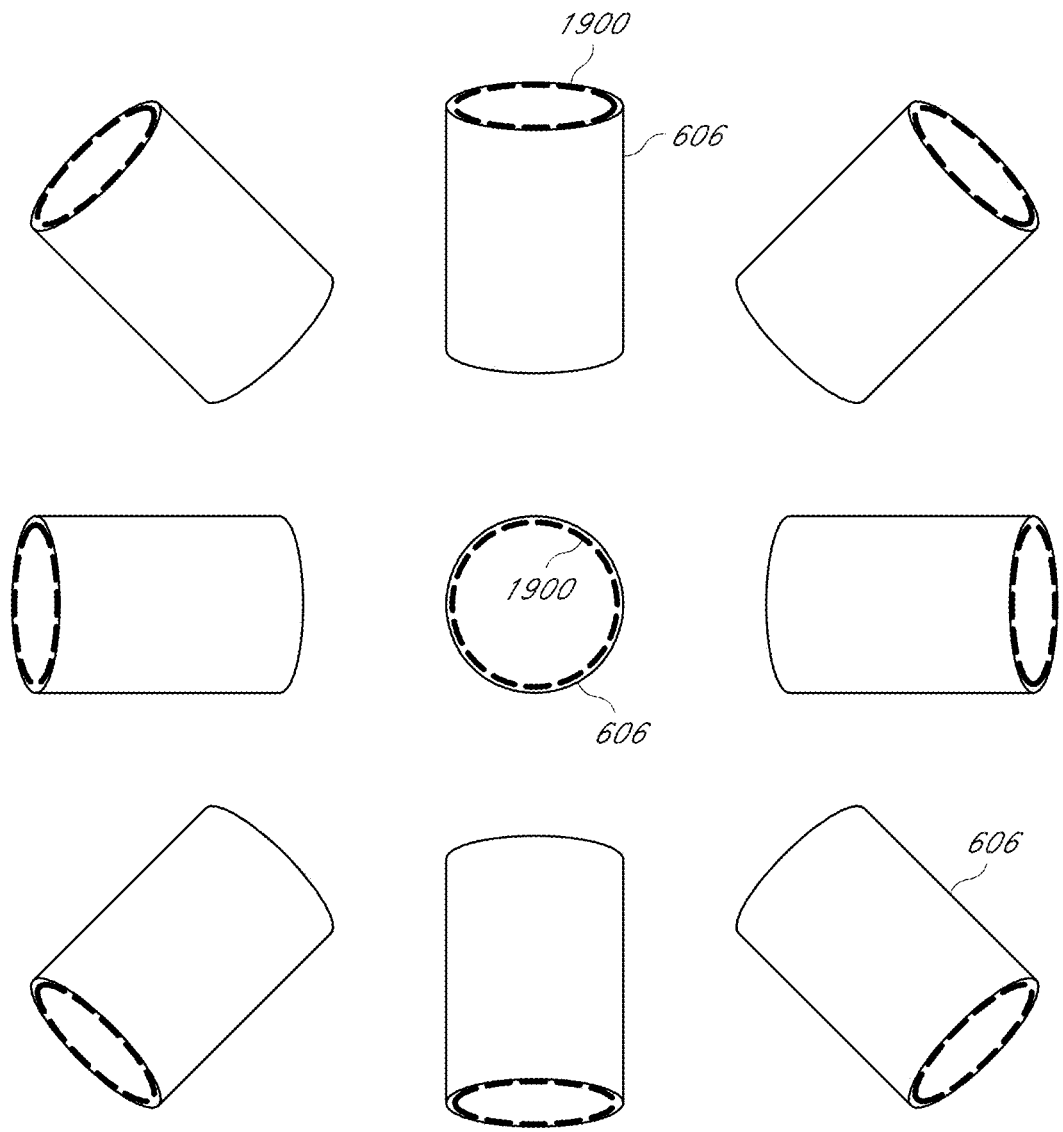
FIG. 19 schematically shows use of a pattern of lights to assist in calibration of the vision system.

Referring to FIG. 19, in one embodiment a known pattern 1900 (such as a circular pattern) of lights or other emitters may be utilized to assist in calibration of vision systems. For example, the circular pattern may be utilized as a fiducial; as a camera or other capture device with known orientation captures the shape of the pattern while the object coupled to the pattern is reoriented, the orientation of the object, such as a hand held totem device 606, may be determined; such orientation may be compared with that which comes from an associated IMU on the object (e.g., the totem) for error determination and use in calibration. With further reference to FIG. 19, the pattern of lights 1900 may be produced by light emitters (e.g., a plurality of LEDs) on a hand-held totem 606 (schematically represented as a cylinder in FIG. 19). As shown in FIG. 19, when the totem is viewed head-on by a camera on the AR headset 58, the pattern of lights 1900 appears circular. When the totem 606 is tilted in other orientations, the pattern 1900 appears elliptical. The pattern of lights 1900 can be identified using computer vision techniques and the orientation of the totem 606 can be determined.

In various implementations, the augmented reality device can include a computer vision system configured to implement one or more computer vision techniques to identify the pattern of lights (or perform other computer vision procedures used or described herein). Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Example Circuits for Subsystems of Wearable Display Devices

Figure 20A:
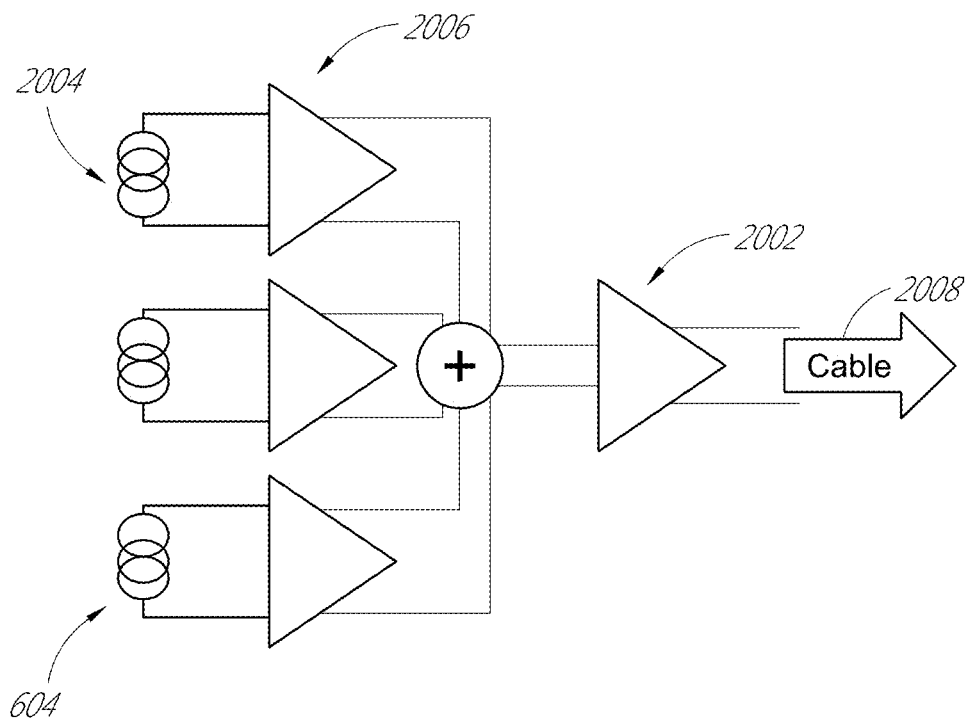
FIGS. 20A-20C are block diagrams of example circuits usable with subsystems or components of a wearable display device.
Figure 20B:
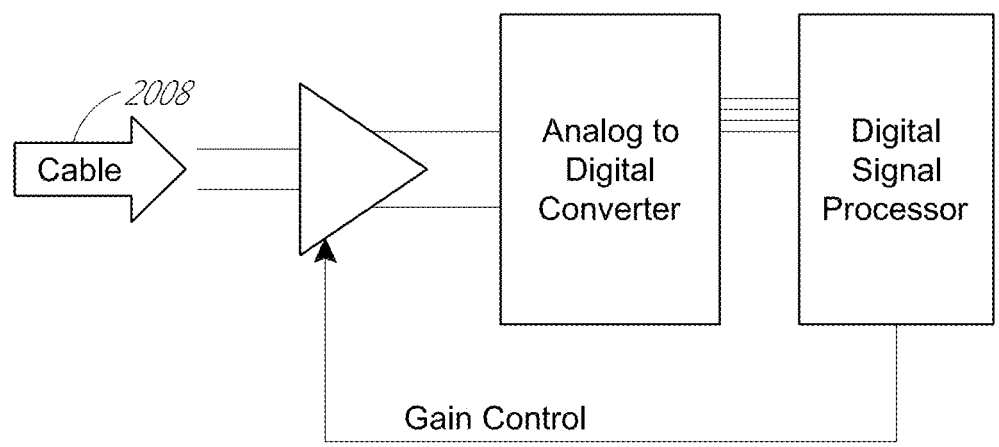
Figure 20C:
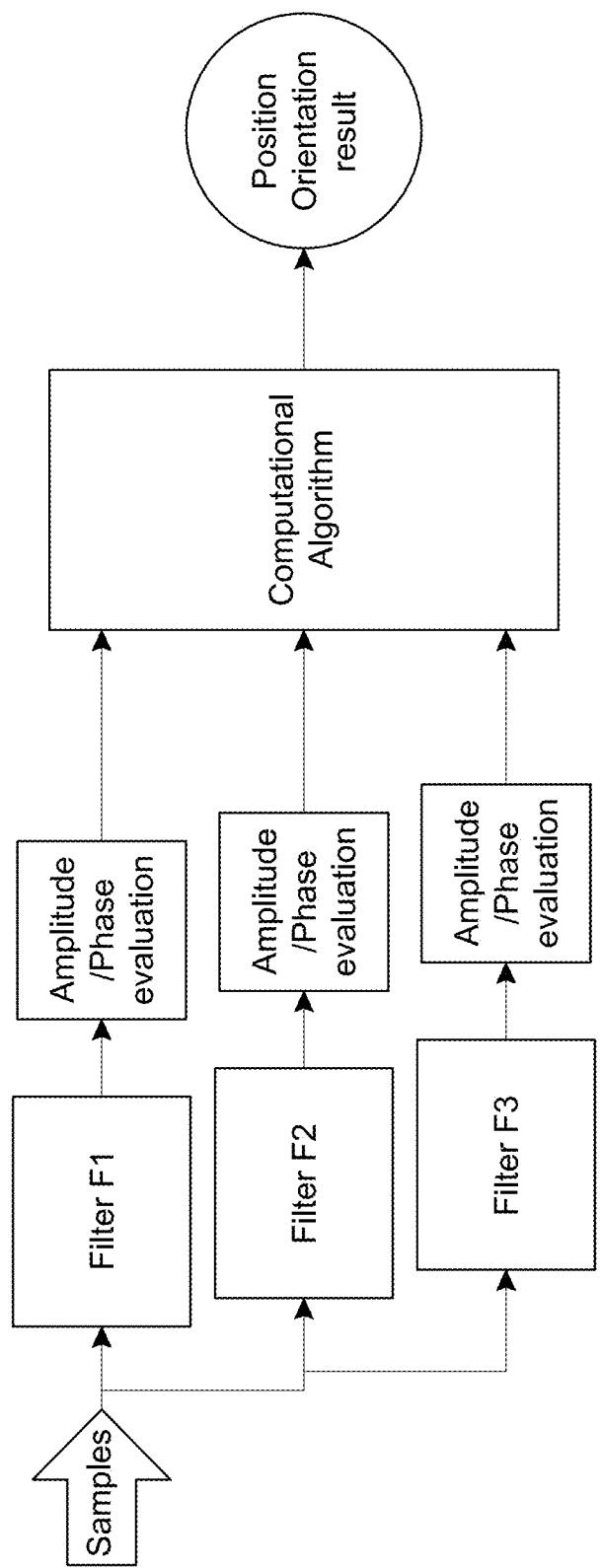

Referring to FIGS. 20A-20C, a configuration is shown with a summing amplifier 2002 to simplify circuitry between two subsystems or components of a wearable computing configuration such as a head mounted component and a belt-pack component. With a conventional configuration, each of the coils 2004 (on the left of FIG. 20A) of an electromagnetic tracking sensor 604 is associated with an amplifier 2006, and three distinct amplified signals can be sent through a summing amplifier 2002 and the cabling to the other component (e.g., processing circuitry as shown in FIG. 20B). In the illustrated embodiment, the three distinct amplified signals may be directed to the summing amplifier 2002, which produces one amplified signal that is directed down an advantageously simplified cable 2008, and each signal may be at a different frequency. The summing amplifier 2002 may be configured to amplify all three signals received by the amplifier; then (as illustrated in FIG. 20B) the receiving digital signal processor, after analog-to-digital conversion, separates the signals at the other end. Gain control may be used. FIG. 20C illustrates a filter for each frequency (F1, F2, and F3)—so the signals may be separated back out at such stage. The three signals may be analyzed by a computational algorithm (e.g., to determine sensor pose) and the position or orientation result can be used by the AR system (e.g., to properly display virtual content to the user based on the user's instantaneous head pose).

Example EM Tracking System Updating

Figure 21:
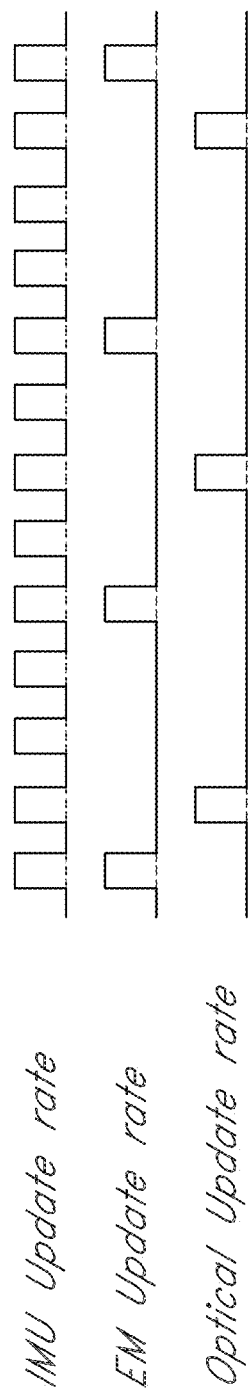
FIG. 21 is a graph that shows an example of fusing output from an IMU, an electromagnetic tracking sensor, and an optical sensor.

Referring to FIG. 21, electromagnetic ("EM") tracking updating can be relatively "expensive" in terms of power for a portable system, and may not be capable of very high frequency updating. In a "sensor fusion" configuration, more frequently updated localization information from another sensor such as an IMU may be combined, along with data from another sensor, such as an optical sensor (e.g., a camera or a depth camera), which may or may not be at a relatively high frequency; the net of fusing all of these inputs places a lower demand upon the EM system and provides for quicker updating.

Figure 22A:
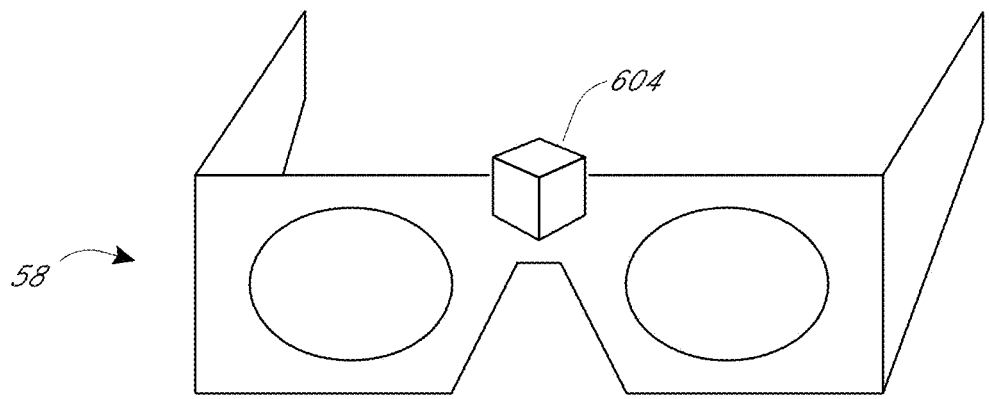
FIGS. 22A-22C schematically illustrate additional examples of electromagnetic sensing coils coupled to a head-mounted display.
Figure 22B:
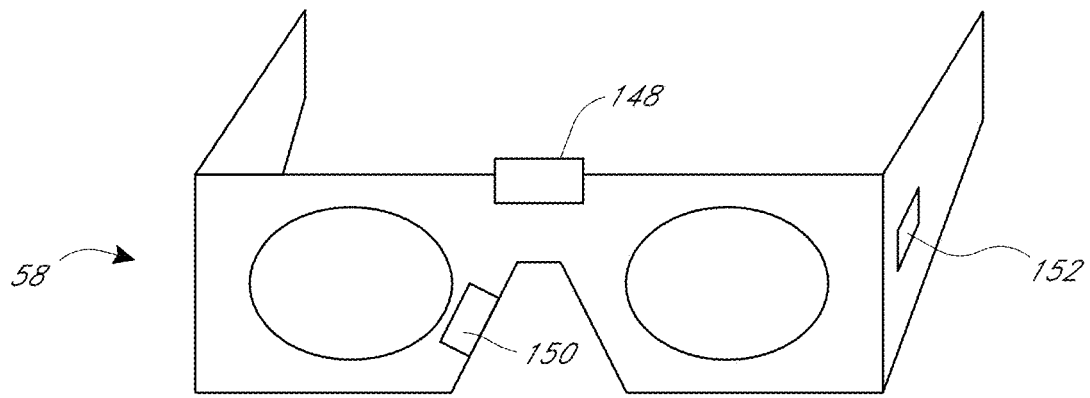
Figure 22C:
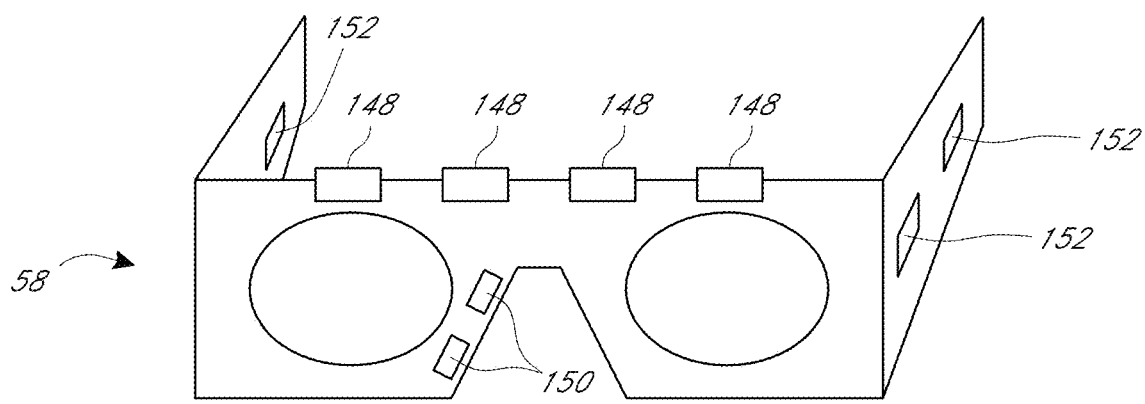

Referring back to FIG. 11B, a distributed sensor coil configuration was shown for the AR device 58. Referring to FIG. 22A, an AR device 58 with a single electromagnetic sensor device (604), such as a housing containing three orthogonal sensing coils, one for each direction of X, Y, Z, may be coupled to the wearable component (58) for 6 degree of freedom tracking, as described above. Also as noted above, such a device may be dis-integrated, with the three sub-portions (e.g., coils) attached at different locations of the wearable component (58), as shown in FIGS. 22B and 22C. Referring to FIG. 22C, to provide further design alternatives, each individual sensor coil may be replaced with a group of similarly oriented coils, such that the overall magnetic flux for any given orthogonal direction is captured by the group (148, 150, 152) rather than by a single coil for each orthogonal direction. In other words, rather than one coil for each orthogonal direction, a group of smaller coils may be utilized and their signals aggregated to form the signal for that orthogonal direction. In another embodiment wherein a particular system component, such as a head mounted component (58) features two or more electromagnetic coil sensor sets, the system may be configured to selectively utilize the sensor and emitter pairing that are closest to each other (e.g., within 1 cm, 2 cm, 3 cm, 4 cm, 5 cm, or 10 cm) to improve or optimize the performance of the system.

Examples of Recalibrating a Wearable Display System

Figure 23A:
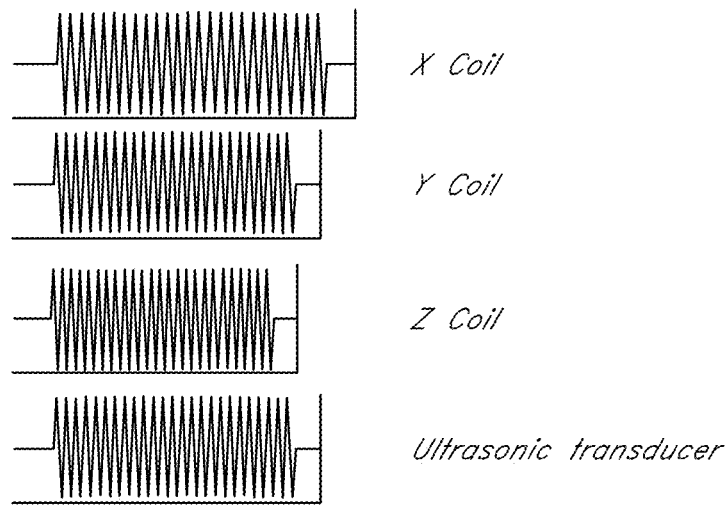
FIGS. 23A-23C schematically illustrate an example of recalibrating a head-mounted display using electromagnetic signals and an acoustic signal.
Figure 23B:
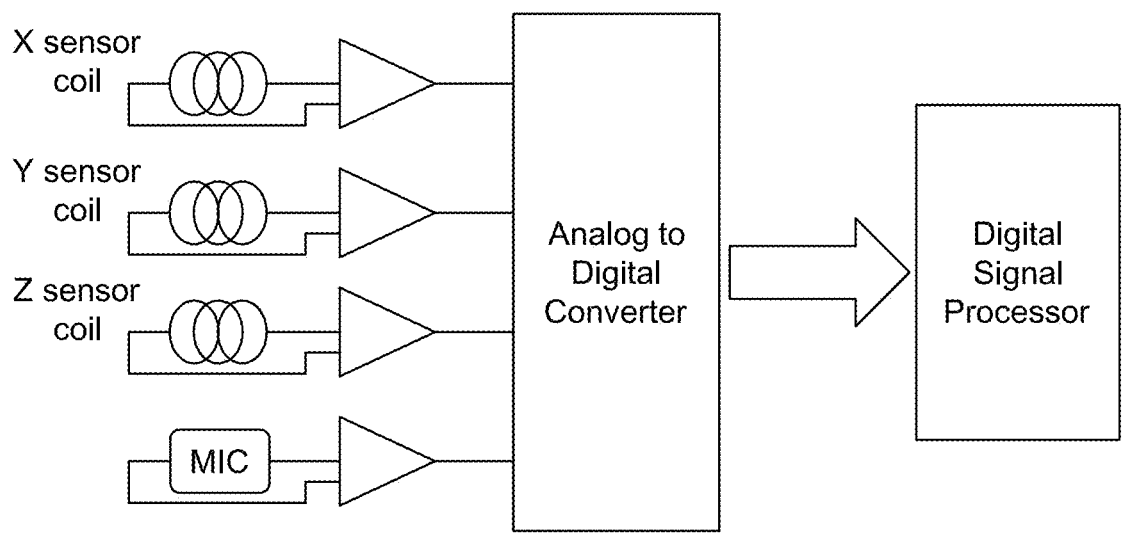
Figure 23C:
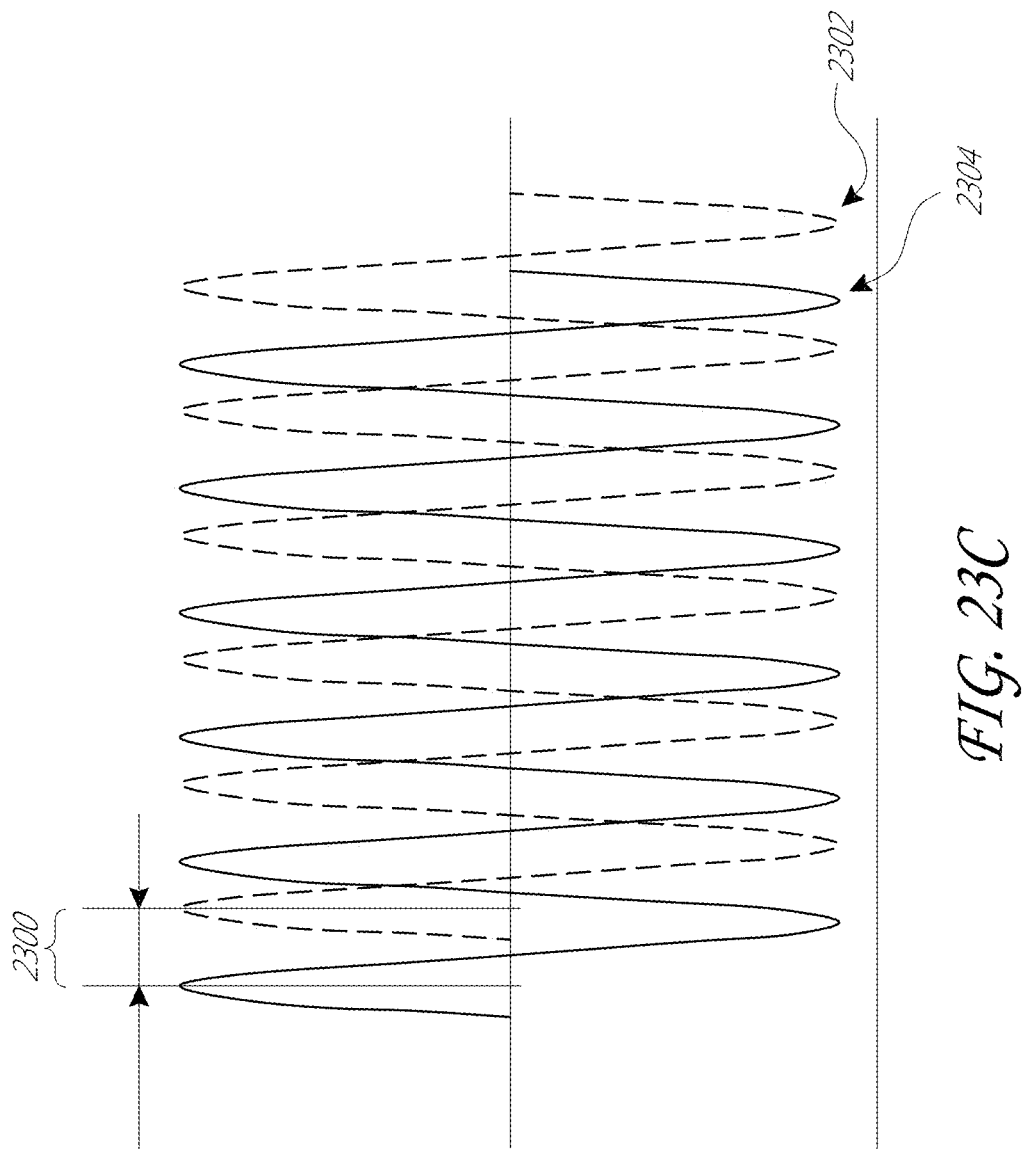

Referring to FIGS. 23A-23C, it may be useful to recalibrate a wearable computing system such as those discussed herein, and in one embodiment, acoustic (e.g., ultrasonic) signals generated at the transmitter, along with an acoustic sensor (e.g., microphone) at the receiver and acoustic time of flight calculation, may be utilized to determine sound propagation delay between the transmitter and receiver and thereby distance between the transmitter and receiver (since the speed of sound is known). FIG. 23A shows that in one embodiment, three coils on the transmitter are energized with a burst of sinewaves, and at the same time an ultrasonic transducer may be energized with a burst of sinewaves, preferably of the same frequency as one of the coils. FIG. 23B illustrates that an EM receiver may be configured to receive the three EM waves using X, Y, Z sensor coils, and the acoustic, ultrasonic wave using a microphone (MIC). Total distance may be calculated from the amplitude of the three EM signals. Time of flight (sound propagation delay time 2300) may be calculated by comparing the timing of the acoustic (microphone) response 2302 with the response of the EM coils 2304 (see, e.g., FIG. 23C). This may be used to also calculate distance. Comparing the electromagnetically calculated distance with the acoustic delay time 2300 can be used to calibrate the EM TX or RX circuits (e.g., by correction factors).

Figure 24A:
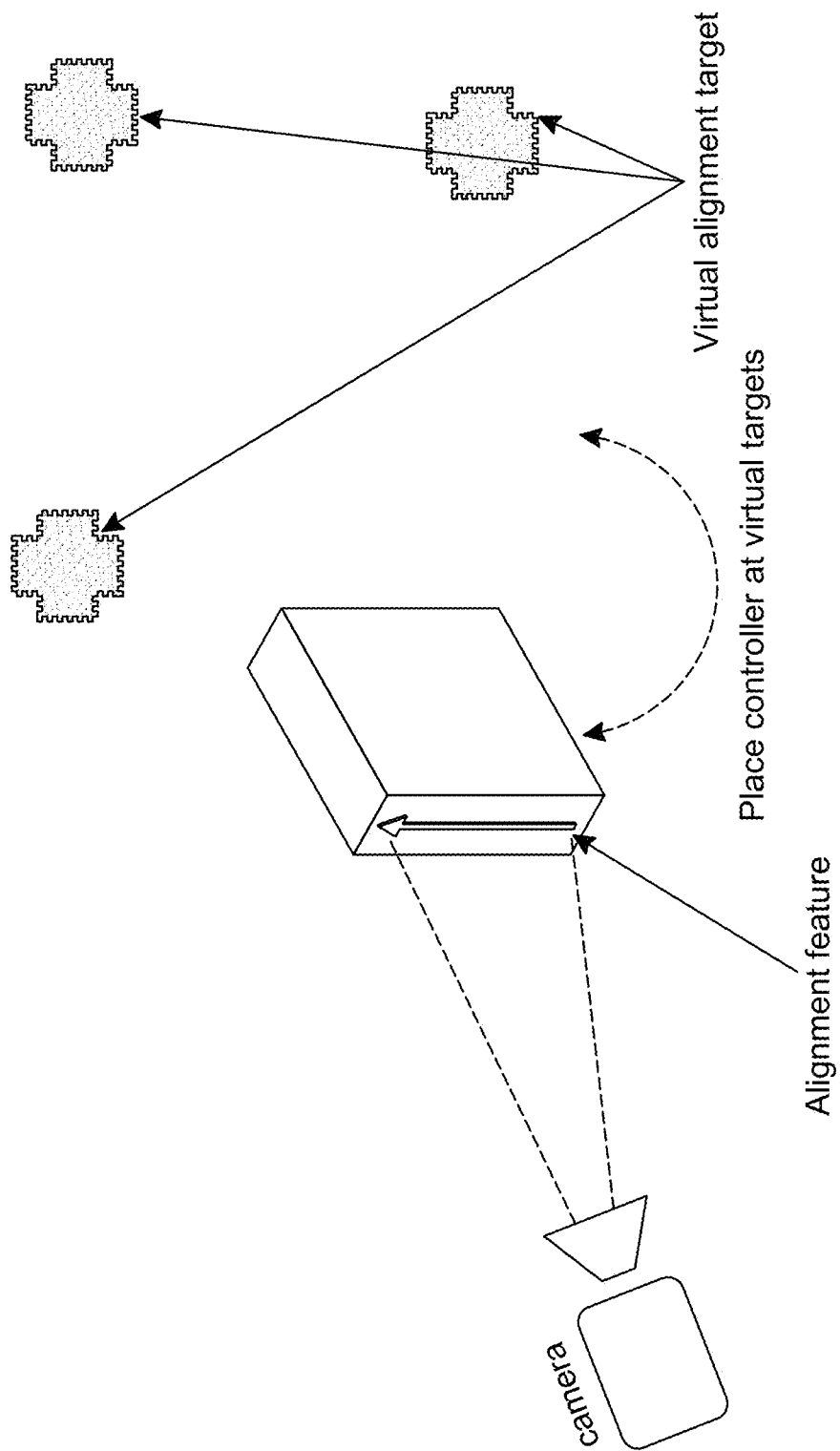
FIGS. 24A-24D schematically illustrate additional examples of recalibrating a head-mounted display using a camera or a depth sensor.

Referring to FIG. 24A, in another embodiment, in an augmented reality system featuring a camera, the distance may be calculated by measuring the size in pixels of a known-size alignment feature (depicted as an arrow in FIG. 24A) on another device such as a handheld controller (e.g., the controller 606).

Figure 24B:
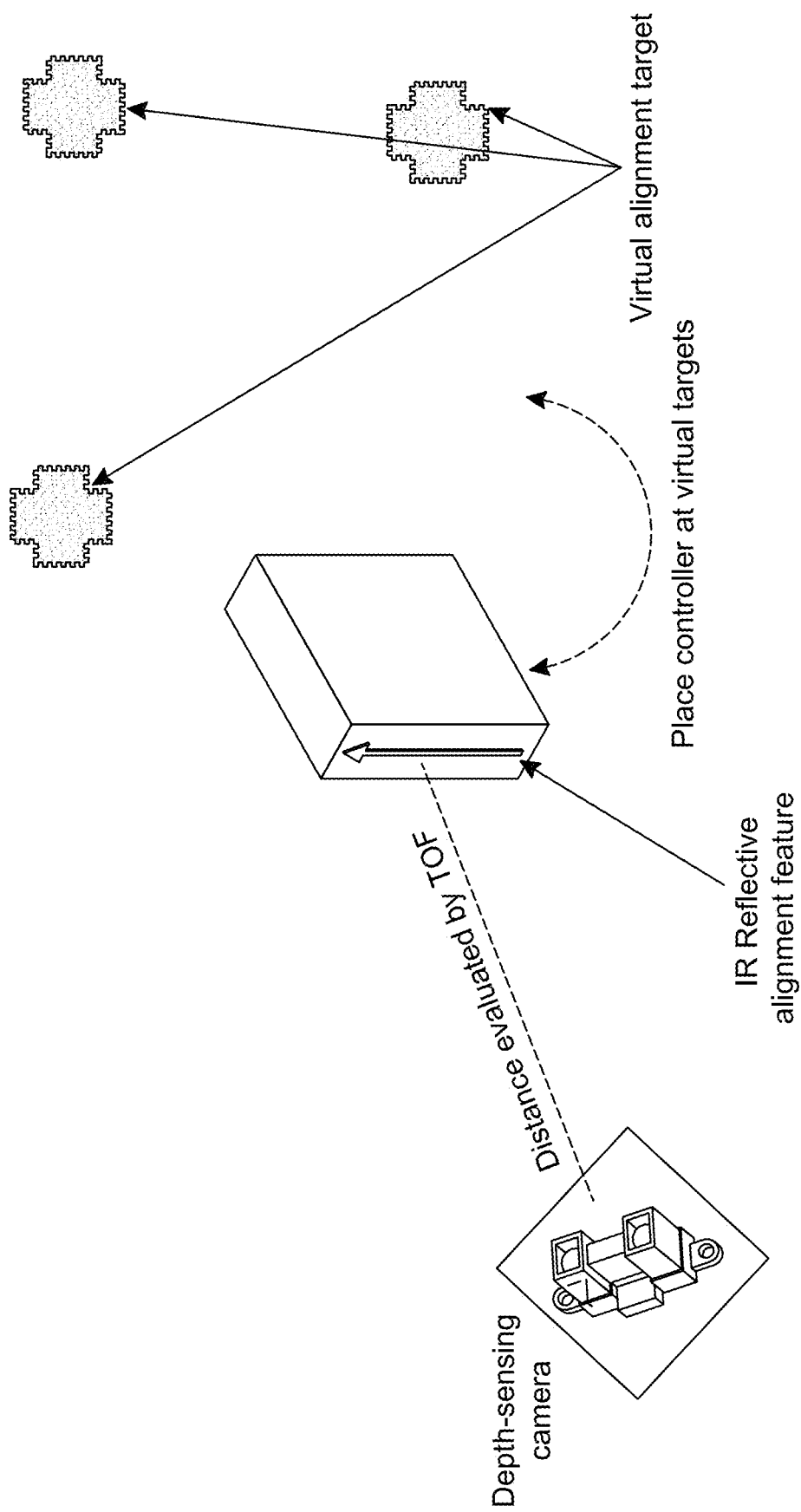

Referring to FIG. 24B, in another embodiment, in an augmented reality system featuring a depth sensor, such as an infrared ("IR") depth sensor, the distance may be calculated by such depth sensor and reported directly to the controller.

Figure 24C:
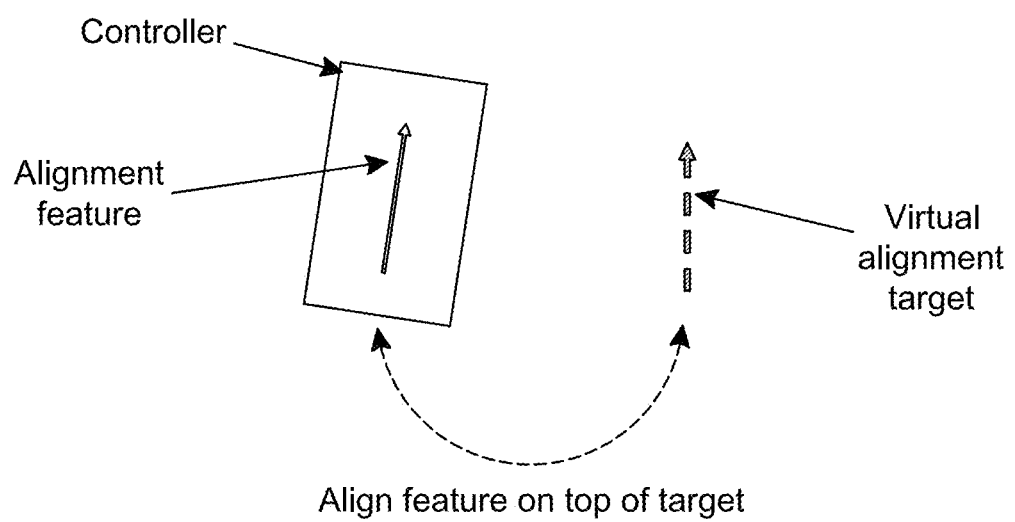
Figure 24D:
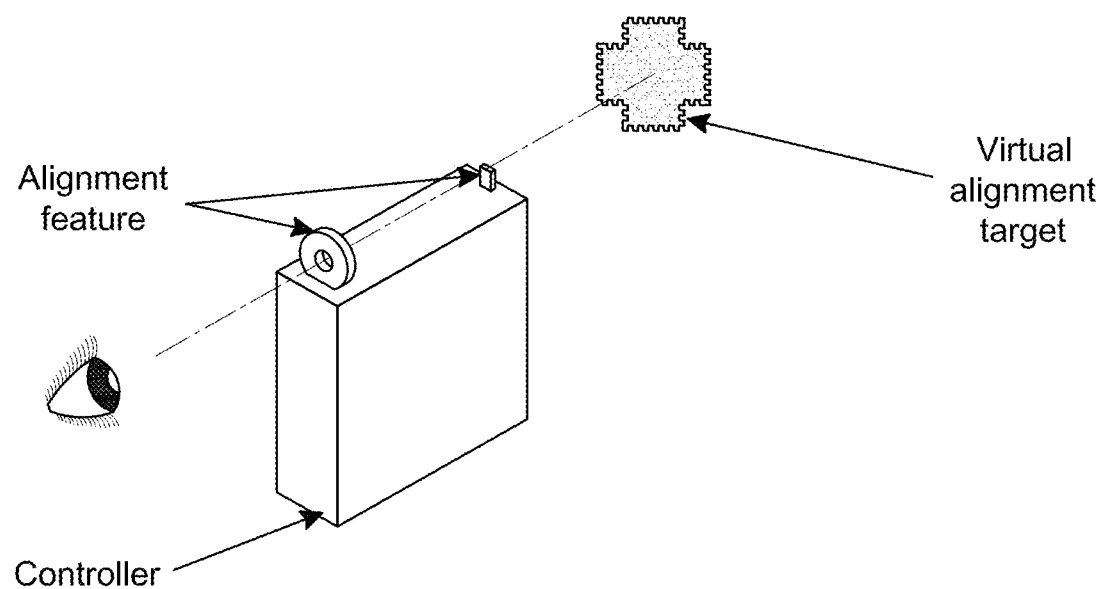

Referring to FIGS. 24C and 24D, once the total distance is known, either the camera or the depth sensor can be used to determine position in space. The augmented reality system may be configured to project one or more virtual alignment targets to the user. The user may align the controller to the targets, and the system can calculate position from both the EM response, and from the direction of the virtual targets plus the previously calculated distance. Roll angle calibration may be done by aligning a known feature on the controller with a virtual target projected to the user; yaw and pitch angle may be calibrated by presenting a virtual target to the user and having the user align two features on the controller with the target (much like sighting a rifle).

Figure 25A:
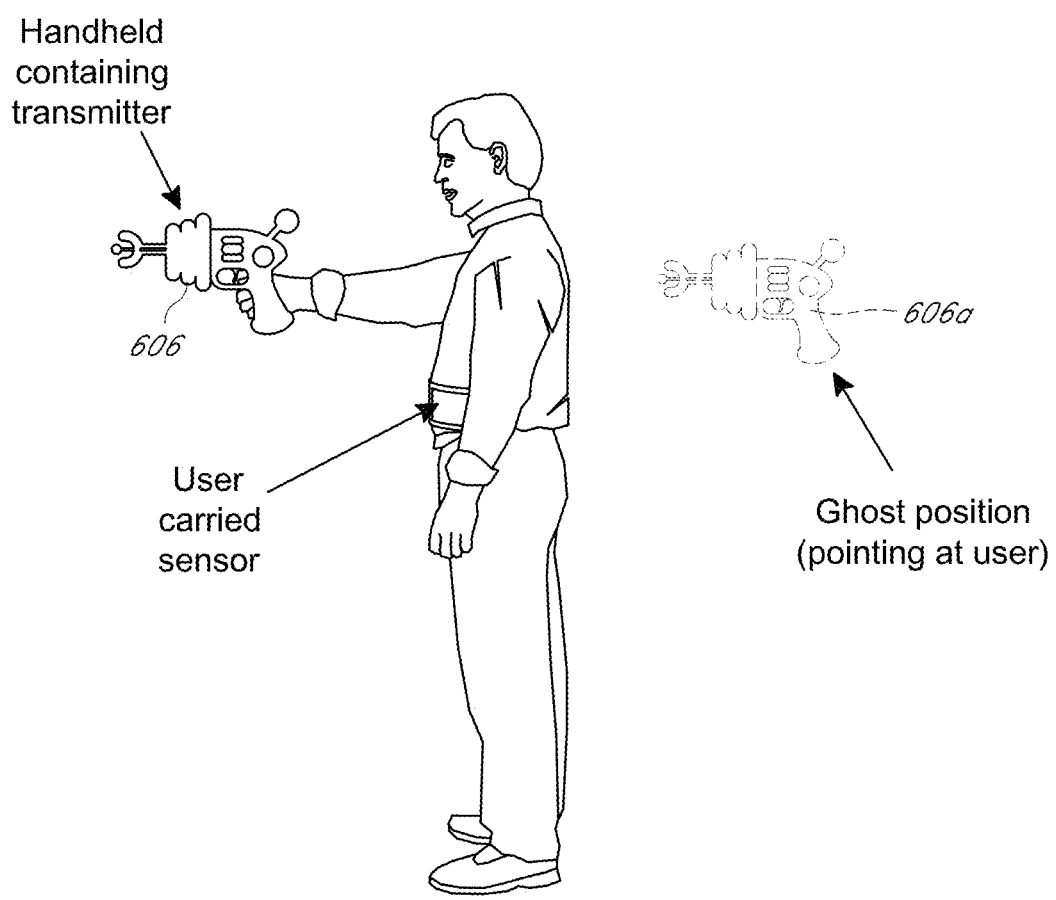
FIGS. 25A and 25B schematically illustrate techniques for resolving position ambiguity that may be associated with an electromagnetic tracking system.
Figure 25B:
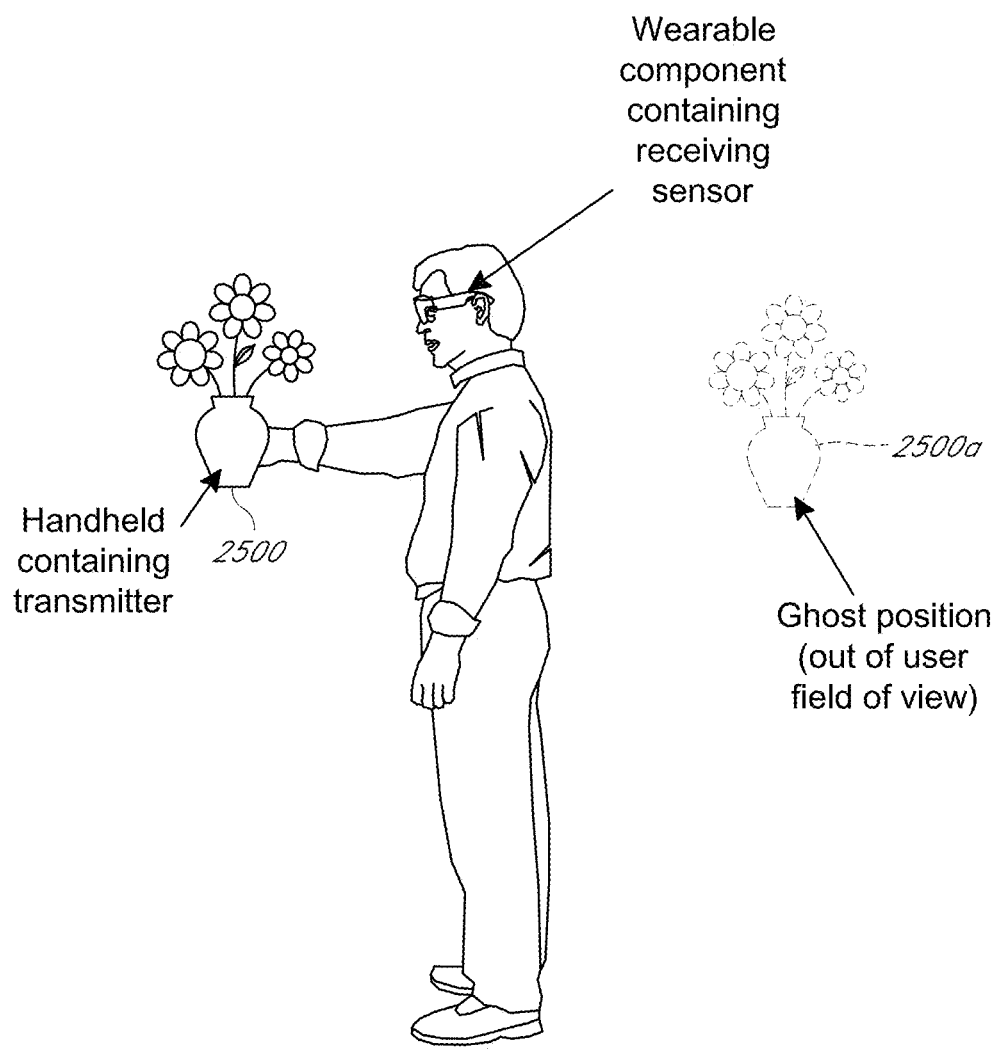

Referring to FIGS. 25A and 25B, there may be an inherent ambiguity associated with EM tracking systems: a receiver would generate a similar response in two diagonally opposed locations around the transmitter. For example, FIG. 25A shows a handheld device 606 and a ghost device 606a that generates a similar response. Such a challenge is particularly relevant in systems wherein both the transmitter and receiver may be mobile relative to each other.

In one embodiment, the system may use an IMU sensor to determine if the user is on the plus or the negative side of a reference (e.g., symmetry) axis. In an embodiment such as those described above which feature world cameras and a depth camera, the system can use that information to detect whether a handheld component (e.g., handheld 2500 in FIG. 25B) is in the positive side or negative side of the reference axis; if the handheld 2500 is outside of the field of view of the camera and/or depth sensor, the system may be configured to decide (or the user may decide) that the handheld component 2500 is in the 180-degree zone directly in back of the user, for example, at the ghost position 2500a as shown in FIG. 25B.

Additional Aspects and Advantages

In a first aspect, a head-mounted display system comprises a display positionable in front of eyes of a wearer; an electromagnetic (EM) field emitter configured to generate a magnetic field having a frequency; an EM sensor configured to sense the magnetic field at the frequency; and a processor programmed to: receive signals from the EM sensor indicative of a sensed magnetic field; and analyze the received signals to determine a position or an orientation of the EM sensor.

In a second aspect, the head-mounted display system of aspect 1, wherein the display comprises a light field display.

In a third aspect, the head-mounted display system of aspect 1 or aspect 2, wherein the EM field emitter comprises a time division multiplexed (TDM) circuit.

In a fourth aspect, the head-mounted display system of aspect 3, wherein the TDM circuit comprises a single amplifier circuit that is TDM switched to each of a plurality of radio frequency (RF) transmitter coils.

In a fifth aspect, the head-mounted display system of aspect 3 or aspect 4, wherein the EM field emitter is configured to dynamically tune the frequency.

In a sixth aspect, the head-mounted display system of aspect 5, wherein to dynamically tune the frequency, the EM field emitter is configured to change a capacitance of a capacitor or to select among a plurality of capacitors in a capacitor bank.

In a seventh aspect, the head-mounted display system of any one of aspects 3 to 6, wherein the EM field emitter comprises a first wireless interface, the EM sensor comprises a second wireless interface and a TDM circuit, and the EM field emitter and the EM sensor are configured to: establish a wireless link between the first wireless interface and the second wireless interface; and synchronize over the wireless link.

In an eighth aspect, the head-mounted display system of any one of aspects 3 to 7, wherein the EM field emitter is configured to transmit an EM pulse to the EM sensor, and the EM field emitter or the EM sensor is configured to determine a timing difference between an EM field emitter clock and an EM sensor clock.

In a ninth aspect, the head-mounted display system of aspect 7 or aspect 8, wherein the EM field emitter comprises a first coil and a second coil, and the EM field emitter is configured to apply a TDM timing protocol in which: the first coil transmits during a first time period, while the second coil does not substantially transmit during the first time period; and the second coil transmits during a second time period that is different from the first time period, while the first coil does not substantially transmit during the second time period.

In a 10th aspect, the head-mounted display system of any one of aspects 7 to 9, wherein the EM sensor is configured to: scan for unintentional RF interference at the frequency during a third time period; and in response to a determination of the presence of unintentional RF interference at the frequency, switch to an alternate frequency that is different from the frequency.

In an 11th aspect, the head-mounted display system of aspect 10, wherein the EM field emitter is configured to substantially stop transmitting during the third time period.

In a 12th aspect, the head-mounted display system of any one of aspects 1 to 11, wherein the EM field emitter comprises an automatic gain control (AGC) circuit.

In a 13th aspect, the head-mounted display system of aspect 12, wherein the EM sensor does not include an AGC circuit.

In a 14th aspect, the head-mounted display system of aspect 12 or aspect 13, wherein the AGC circuit of the EM field emitter is configured to: receive a voltage level for a coil in the EM sensor; and adjust a gain for an amplification stage of the EM field emitter based at least partly on the received voltage level.

In a 15th aspect, the head-mounted display system of any one of aspects 1 to 14, wherein the head-mounted display system further comprises an audio speaker and the EM sensor comprises a noise canceling circuit.

In a 16th aspect, the head-mounted display system of aspect 15, wherein the noise canceling circuit is configured to: receive a first signal from the EM sensor; receive a second signal from the audio speaker; combine the first signal and the second signal to provide a noise-canceled signal.

In a 17th aspect, the head-mounted display system of aspect 16, wherein to combine the first signal and the second signal, the noise canceling circuit is configured to: (a) invert the second signal and add the inverted second signal to the first signal or (b) subtract the second signal from the first signal.

In an 18th aspect, the head-mounted display system of any one of aspects 1 to 17, further comprising a user-input totem, the user-input totem comprising the EM field emitter.

In a 19th aspect, the electromagnetic (EM) tracking system comprises: an EM field emitter comprising a first transmitter coil configured to generate a first magnetic field having a first frequency, a second transmitter coil configured to generate a second magnetic field having a second frequency, and a third transmitter coil configured to generate a third magnetic field having a third frequency, the EM field emitter comprising a first time division multiplexed (TDM) circuit configured to switch power among the first transmitter coil, the second transmitter coil, and the third transmitter coil.

In a 20th aspect, the EM tracking system of aspect 19, wherein the first transmitter coil, the second transmitter coil, and the third transmitter coil are disposed along with mutually orthogonal axes.

In a 21st aspect, the EM tracking system of aspect 19 or aspect 20, wherein the EM field emitter is configured to dynamically tune the first frequency, the second frequency, or the third frequency.

In a 22nd aspect, the EM tracking system of any one of aspects 19 to 21, wherein to dynamically tune the first, the second, or the third frequency, the EM field emitter is configured to change a capacitance of a capacitor or to select among a plurality of capacitors in a capacitor bank.

In a 23rd aspect, the EM tracking system of any one of aspects 19 to 22, wherein the EM field emitter is configured with an automatic gain control (AGC) circuit.

In a 24th aspect, the EM tracking system of aspect 23, wherein the AGC circuit comprises a control loop between a digital signal processor (DSP) and an amplification stage.

In the 25th aspect, the EM tracking system of aspect 23 or aspect 24, wherein the EM field emitter is configured to: receive a voltage level for a coil in an EM sensor; and adjust a gain for an amplification stage of the EM field emitter based at least partly on the received voltage level.

In the 26th aspect, the EM tracking system of any one of aspects 19 to 25, further comprising an EM sensor comprising: a first receiver coil configured to sense the first magnetic field having the first frequency, a second receiver coil configured to sense the second magnetic field having the second frequency, and a third receiver coil configured to sense the third magnetic field having the third frequency, the EM field sensor comprising a second time division multiplexed (TDM) circuit configured to switch power among the first receiver coil, the second receiver coil, and the third receiver coil.

In the 27th aspect, the EM tracking system of aspect 26, wherein the EM tracking system is configured to synchronize the EM field emitter and the EM sensor via a wireless link between the EM field emitter and the EM sensor.

In the 28th aspect, the EM tracking system of aspect 27, wherein: the EM field emitter is configured to transmit an EM pulse to the EM sensor; and the EM field emitter or the EM sensor is configured to determine a timing difference between an EM field emitter clock and an EM sensor clock.

In a 29th aspect, the EM tracking system of any one of aspects 26 to 28, wherein during a first time period: the first transmitter coil is configured to generate the first magnetic field having the first frequency during which the second transmitter coil and the third transmitter coil do not substantially transmit the respective second magnetic field and third magnetic field; and the first receiver coil, the second receiver coil, and the third receiver coil of the EM sensor are configured to be sequentially activated.

In a 30th aspect, the EM tracking system of aspect 29, wherein during a second time period following the first time period: the second transmitter coil is configured to generate the second magnetic field having the second frequency during which the first transmitter coil and the third transmitter coil are configured to not substantially transmit the respective first magnetic field and third magnetic field; and the first receiver coil, the second receiver coil, and the third receiver coil of the EM sensor are configured to be sequentially activated.

The 31st aspect, the EM tracking system of any one of aspects 26 to 30, wherein the EM sensor is configured to scan for frequencies in use.

In a 32nd aspect, the EM tracking system of aspect 31, wherein during a third time period: the first transmitter coil is configured to not substantially transmit the first magnetic field; and the first receiver coil is configured to be activated to measure presence of interference at the first frequency.

In a 33rd aspect, the EM tracking system of aspect 32, wherein in response to detection of interference at the first frequency, the EM tracking system is configured to change the first frequency to a different frequency.

In a 34th aspect, the EM tracking system of any one of aspects 26 to 33, wherein the EM sensor is configured to: receive an interference signal representative of a source of magnetic interference; at least partially cancel the interference signal to output a sensor signal that is substantially free from the source of magnetic interference.

In a 35th aspect, an electromagnetic (EM) tracking system comprises: an EM field emitter comprising an automatic gain control (AGC) circuit and a transmitter coil; and an EM sensor without an AGC circuit, the EM sensor comprising a sensor coil.

In a 36th aspect, the EM tracking system of aspect 35, wherein: the EM sensor is configured to wirelessly communicate a sensor coil signal level to the EM field emitter; and the EM field emitter is configured to adjust a gain of the transmitter coil based at least in part on the sensor coil signal level.

In a 37th aspect, the EM tracking system of aspect 35 or aspect 36, wherein the EM field emitter is configured to dynamically adjust a radio frequency emitted by the transmitter coil.

In a 38th aspect, the EM tracking system of any one of aspects 35 to 37, wherein the EM field emitter and the EM sensor are configured to operate using time division multiplexing.

In a 39th aspect, the EM tracking system of any one of aspects 35 to 38, wherein the EM sensor is configured to: receive an interference signal representative of a source of magnetic interference; at least partially cancel the interference signal to output a sensor signal that is substantially free from the source of magnetic interference.

In a 40th aspect, a head-mounted augmented reality (AR) display device comprising the EM tracking system of any one of aspects 35 to 39.

In a 41st aspect, the head-mounted AR display device of aspect 40, wherein the EM sensor is disposed on a frame of the AR display device.

In a 42nd aspect, the head-mounted AR display device of aspect 40 or aspect 41, wherein the EM field emitter is disposed in a handheld, user-input totem.

In a 43rd aspect, an augmented reality display system comprises a display configured to project virtual images to eyes of a wearer; a frame configured to mount the display in front of the eyes of the wearer; an electromagnetic (EM) field emitter configured to generate a magnetic field; an EM sensor configured to sense the magnetic field, wherein one of the EM field emitter or the EM sensor is mechanically coupled to the frame and the other of the EM field emitter or the EM sensor is mechanically coupled to a component of the augmented reality display system that is independently movable relative to the frame; and a hardware processor programmed to: receive signals from the EM sensor indicative of a sensed magnetic field; and analyze the received signals to determine a position or an orientation of the EM sensor.

In a 44th aspect, the augmented reality display system of aspect 43, wherein the display comprises a light field display.

In a 45th aspect, the augmented reality display system of aspect 43 or aspect 44, wherein: the component comprises a user-input totem or a belt pack, the EM sensor is mechanically coupled to the frame, and the EM field emitter is mechanically coupled to the user-input totem or the belt pack.

In a 46th aspect, the augmented reality display system of any one of aspects 43 to 45, further comprising: an audio speaker, wherein the augmented reality display system comprises a noise canceling circuit configured to cancel magnetic interference in the sensed magnetic field generated by the audio speaker. The audio speaker may be mechanically coupled to the frame.

In a 47th aspect, the augmented reality display system of aspect 46, wherein the noise canceling circuit is configured to: receive a first signal from the EM sensor; receive a second signal from the audio speaker; combine the first signal and the second signal to provide a noise-canceled signal.

In a 48th aspect, the augmented reality display system of aspect 47, wherein to combine the first signal and the second signal, the noise canceling circuit is configured to: (a) invert the second signal and add the inverted second signal to the first signal or (b) subtract the second signal from the first signal.

In a 49th aspect, the augmented reality display system of any one of aspects 43 to 48, wherein the EM field emitter comprises: a first transmitter coil configured to generate a first magnetic field having a first frequency; and a second transmitter coil configured to generate a second magnetic field having a second frequency; and a time division multiplexed (TDM) circuit configured to switch power respectively between the first transmitter coil and the second transmitter coil.

In a 50th aspect, the augmented reality display system of aspect 49, wherein the TDM circuit comprises a single amplifier circuit that is TDM switched to each of the first and the second transmitter coils.

In a 51st aspect, the augmented reality display system of aspect 49 or aspect 50, wherein the first transmitter coil and the second transmitter coil are disposed along mutually orthogonal axes.

In a 52nd aspect, the augmented reality display system of any one of aspects 43 to 51, wherein the EM field emitter is configured to dynamically tune the first frequency or the second frequency.

In a 53rd aspect, the augmented reality display system of aspect 52, wherein to dynamically tune the first frequency or the second frequency, the EM field emitter is configured to change a capacitance of a capacitor or to select among a plurality of capacitors in a capacitor bank.

In a 54th aspect, the augmented reality display system of any one of aspects 43 to 53, wherein the EM field emitter comprises a first wireless interface, the EM sensor comprises a second wireless interface and a second TDM circuit, and the EM field emitter and the EM sensor are configured to: establish a wireless link between the first wireless interface and the second wireless interface; and synchronize timing of an EM field emitter clock with an EM sensor clock over the wireless link.

In a 55th aspect, the augmented reality display system of any one of aspects 43 to 54, wherein the EM field emitter is configured to transmit an EM pulse to the EM sensor, and the EM field emitter or the EM sensor is configured to determine a timing difference between an EM field emitter clock and an EM sensor clock. In another aspect, the AR display system of any one of aspects 43 to 54 may be configured such that the EM field emitter comprises an acoustic generator and the EM sensor comprises an acoustic sensor. The AR display system may be configured to determine a time of flight of a first distance between the emitter and the sensor based at least in part on a measured delay between an acoustic signal and an electromagnetic signal. The AR display system may be further configured to determine a second distance between the emitter and the sensor based at least in part on an amplitude of the electromagnetic signals. The AR display system may be further configured to calibrate the system based at least in part on a comparison of the first distance and the second distance.

In a 56th aspect, the augmented reality display system of any one of aspects 49 to 55, wherein the EM field emitter is configured to apply a TDM timing protocol in which: the first transmitter coil transmits during a first time period, while the second transmitter coil does not substantially transmit during the first time period; and the second transmitter coil transmits during a second time period that is different from the first time period, while the first transmitter coil does not substantially transmit during the second time period.

In a 57th aspect, the augmented reality display system of any one of aspects 43 to 56, wherein the EM field emitter is configured to generate the magnetic field at a first frequency, and the EM sensor is configured to: scan for unintentional radio frequency (RF) interference at the first frequency; and in response to a determination of the presence of unintentional RF interference at the first frequency, switch to a second frequency that is different from the first frequency.

In a 58th aspect, the augmented reality display system of any one of aspects 43 to 57, wherein the EM field emitter comprises an automatic gain control (AGC) circuit that is configured to: receive a voltage level for a coil in the EM sensor; and adjust a gain for an amplification stage of the EM field emitter based at least partly on the received voltage level.

In a 59th aspect, a method of operating an electromagnetic (EM) tracking system for an augmented reality (AR) display system, the AR display system comprising a head-mounted AR display, an EM emitter, and a portable user-input device that comprises an EM sensor is provided. The method comprises emitting, by the EM emitter in the portable user-input device, a time-varying magnetic field; detecting, by the EM sensor, the time-varying magnetic field; determining, based at least in part on the detected magnetic field, a pose of the EM sensor; determining, based at least in part on the determined pose, virtual content to display to a user of the AR display system; and displaying, by the head-mounted AR display, the virtual content. The head-mounted AR display may comprise a light field display.

In a 60th aspect, the method of aspect 59, further comprising time-synchronizing the EM emitter and the EM sensor.

In a 61st aspect, the method of aspect 59 or aspect 60, further comprising canceling magnetic interference from the detected magnetic field.

In a 62nd aspect, the method of any one of aspects 59 to 61, further comprising correlating real world coordinates associated with the pose of the EM sensor with virtual world coordinates associated with the virtual content.

In a 63rd aspect, an AR display system operated according to any one of the methods of aspects 59 to 62. The AR display system may comprise a light field display.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head-mounted display system comprising:
   a display positionable in front of eyes of a wearer;
   an electromagnetic (EM) field emitter configured to generate a magnetic field having a frequency wherein the EM field emitter is configured to change a capacitance of a capacitor or to select among a plurality of capacitors in a capacitor bank to dynamically tune the frequency;
   an EM sensor configured to sense the magnetic field at the frequency; and
   a processor programmed to:
   receive signals from the EM sensor indicative of a sensed magnetic field; and
   analyze the received signals to determine a position or an orientation of the EM sensor.

2. The head-mounted display system of claim 1, wherein the EM field emitter comprises:
   a first transmitter coil configured to generate a first magnetic field having a first frequency,
   a second transmitter coil configured to generate a second magnetic field having a second frequency, and
   a third transmitter coil configured to generate a third magnetic field having a third frequency.

3. The head-mounted display system of claim 2, wherein the EM field emitter comprises a first time division multiplexed (TDM) circuit configured to switch power among the first transmitter coil, the second transmitter coil, and the third transmitter coil.

4. The head-mounted display system of claim 2, wherein the first transmitter coil, the second transmitter coil, and the third transmitter coil are disposed along with mutually orthogonal axes.

5. The head-mounted display system of claim 2, wherein the EM field emitter is configured to dynamically tune the first frequency, the second frequency, or the third frequency.

6. The head-mounted display system of claim 3, wherein the TDM circuit comprises a single amplifier circuit that is TDM switched to each of a plurality of radio frequency (RF) transmitter coils.

7. The head-mounted display system of claim 1, wherein the EM field emitter is configured to dynamically tune the frequency.

8. The head-mounted display system of claim 1, wherein the EM field emitter is positioned in a handheld controller.

9. The head-mounted display system of claim 8, wherein the EM sensor is positioned in the head-mounted display or in a beltpack.

10. The head-mounted display system of claim 1, wherein the EM field emitter is positioned in the head-mounted display or in a beltpack.

11. The head-mounted display system of claim 10, wherein the EM sensor is positioned in a first handheld controller.

12. The head-mounted display system of claim 10, further comprising:
    a second EM sensor configured to sense the magnetic field at a second frequency, wherein the EM field emitter is configured to generate the magnetic field at the second frequency.

13. The head-mounted display system of claim 12, wherein the second frequency is generated by selection of a second capacitor in the capacitor bank.

14. The head-mounted display system of claim 12, wherein the second EM sensor is positioned in a second handheld controller.

15. The head-mounted display system of claim 14, further comprising:
    a third EM sensor configured to sense the magnetic field at a third frequency, wherein the EM field emitter is configured to generate the magnetic field at the third frequency.

16. The head-mounted display system of claim 15, wherein the third EM sensor is positioned in a third handheld controller.

17. The head-mounted display system of claim 16, wherein the EM field emitter is configured to dynamically switch between the first frequency, the second frequency, and the third frequency.

18. The head-mounted display system of claim 16, wherein the first handheld controller is operated by a first user, the second handheld controller is operated by a second user, and the third handheld controller is operated by a third user.

19. The head-mounted display system of claim 1, wherein the processor is further programmed to:
   receive images of an environment in front of the wearer from one or more cameras.

20. The head-mounted display system of claim 19, wherein the processor is further programmed to:
   analyze the received images to determine whether the EM sensor is outside of a field of view (FOV) of the one or more cameras; and
   determine the position or the orientation of the EM sensor based on the sensed magnetic field and whether the EM sensor is determined to be outside of the FOV of the one or more cameras.

\* \* \* \* \*